US005527387A

United States Patent [19]
Andersen et al.

[11] Patent Number: 5,527,387
[45] Date of Patent: Jun. 18, 1996

[54] DESIGN OPTIMIZED COMPOSITIONS AND COMPUTER IMPLEMENTED PROCESSES FOR MICROSTRUCTURALLY ENGINEERING CEMENTITIOUS MIXTURES

[75] Inventors: Per J. Andersen; Simon K. Hodson, both of Santa Barbara, Calif.

[73] Assignee: E. Khashoggi Industries, Santa Barbara, Calif.

[21] Appl. No.: 379,883

[22] Filed: Jan. 26, 1995

Related U.S. Application Data

[63] Continuation of Ser. No. 109,100, Aug. 18, 1993, abandoned, which is a continuation-in-part of Ser. No. 19,151, Feb. 17, 1993, Pat. No. 5,453,310, and Ser. No. 95,662, Jul. 20, 1993, Pat. No. 5,385,764, which is a continuation-in-part of Ser. No. 929,898, Aug. 11, 1992, abandoned.

[51] Int. Cl.$^6$ .................................. C04B 7/36; C04B 7/38
[52] U.S. Cl. .......................... 106/693; 106/713; 106/739; 106/743; 106/772; 264/DIG. 43
[58] Field of Search ..................................... 106/743, 713, 106/705, 693, 692, 714, 715, 721, 739, 756, 772, 771, 789, 792, DIG. 1, 685, 724, 823; 264/DIG. 49, DIG. 43

[56] References Cited

U.S. PATENT DOCUMENTS

| | | |
|---|---|---|
| 2,250,107 | 7/1941 | Nelles . |
| 3,233,973 | 2/1966 | Veo .......................................... 106/743 |
| 3,602,488 | 8/1971 | Romig ...................................... 106/743 |
| 3,754,954 | 8/1973 | Gabriel et al. . |
| 3,917,781 | 11/1975 | Gabriel et al. . |
| 3,927,163 | 12/1975 | Gabriel et al. . |
| 4,026,717 | 5/1977 | Harris et al. ............................. 106/743 |
| 4,353,748 | 10/1982 | Birchall et al. . |
| 4,395,290 | 7/1983 | Oller et al. .............................. 106/743 |
| 4,410,366 | 10/1983 | Birchall et al. . |
| 4,522,772 | 6/1985 | Bevan . |
| 4,588,443 | 5/1986 | Bache . |

FOREIGN PATENT DOCUMENTS

| | | | |
|---|---|---|---|
| 0624894 | 8/1978 | U.S.S.R. ............................. 106/743 |
| 0842073 | 6/1981 | U.S.S.R. ............................. 106/743 |
| WO87/00828 | 2/1987 | WIPO . | |

OTHER PUBLICATIONS

Engineered Materials Handbook, vol. 1, Composites, "Software for Composite Materials Analysis", Kibler, Nov. 1987.
"Computer masterminds Raw materials blending" Rock Products, Torgerson, Sep. 1959.
Andersen, *Control and Monitoring of Concrete Production: A Study of Particle Packing and Rheology*, Thesis for degree from the Danish Academy of Technical Sciences (1990).
Andersen, *Effects of W/C–Ration and Dispersion on the Pore Size Distribution of Cement Paste and Concrete*, Prepared for MRL (Aug. 1988).
Andersen, et al., *Tailoring of Cement–Bound Materials By the Use of Packing and Rheological Models*, American Ceramic Society (1988).
Andersen, *Tailoring of Concrete Materials*, R&H Annual Review (1988).

(List continued on next page.)

*Primary Examiner*—Paul Marcantoni
*Attorney, Agent, or Firm*—Workman, Nydegger & Seeley

[57] ABSTRACT

A design optimization process used to determine the proportions of sand, cement, coarse aggregate, water, fly ash, water reducers, air entraining agents and fillers needed to produce a concrete mixture that has desired strength and slump properties and a minimal cost. The optimization process comprises a combination of models that accurately reflect the properties of a concrete mixture based on the properties of its individual components. The process is further capable of optimizing the durability of the cementitious mixture and of accurately calculating the expected yield of the mixture.

73 Claims, 34 Drawing Sheets

Microfiche Appendix Included
(1 Microfiche, 22 Pages)

OTHER PUBLICATIONS

Arioglu, *Analysis of the Concrete Strength versus Water–Cement Ratio Relationship*, ACI Materials Journal (Sep.–Oct. 1991).

Ashby, *Materials Selection in Engineering Design*, Indian Journal of Technology, vol. 28, (Jun.–Aug. 1990).

Ashby, *Overview No. 80: On the Engineering Properties of Materials*, Acta Metall, vol. 3, No. 5 1273–1293 (1989).

Bach, et al., *Development of Structure in Hydrating Particulate Systems and Influence on Rheology and Final Properties*, Paper presented at a conference on Advances in Cementitious Materials, Gaithersburg, MA (Jul. 22–26 1990).

Bache, *Densified Cement/Ultra–Fine Particle–Based Materials*, Presented a the Second International Conference on Superplasticizers in Concrete, in Ottawa, Canada (Jun. 10–12, 1981).

Bailey, et al., *Flexural Strength of Cements*, Nature, vol. 292, 2 (Jul. 1981).

Fedors, et al., *An Empirical Method of Estimating the Void Fraction in Mixtures of Uniform Particles of Different Size*, Powder Technology, vol. 23, 225–231 (1979).

Furnas, *Grading Aggregates, 1–Mathematical Relations for Beds of Broken Solids of Maximum Density*, Industrial and Engineering Chemistry (Sep. 1931).

Garboczi, et al., *Computational Materials Science of Cement–Based Materials*, MRS Bulletin, 50–54 (Mar. 1993).

Gebler, *The Effects of High–Range Water Reducer on the Properties of Freshly Mixed and Hardened Flowing Concrete*, Portland Cement Association Research and Development Bulletin RD081.01T (1982).

Hewlett, *Physico–Chemical Mechanisms of Admixtures* Lecture, OCGLI Advanced Concrete Technology Course, Cement and Concrete Association Training Centre (1975).

Idorn, et al., *State of the Art for Fly Ash Uses in Concrete*, Cement and Concrete Research, vol. 14, 463–470 (1984).

Klieger, *Studies of the Effect of Entrained Air on the Strength and Durability of Concretes Made with Various Maximum Sizes of Aggregate*, Research and Development Laboratories of the Portland Cement Association, Oct. (1952).

Knudsen. *Modelling Hydration of Portland Cement: The Effect of Particle Size Distribution*, Paper presented at the Engineering Foundation Conference, Henniker, N.H. (Jul. 25–30, 1982).

Knudsen, *On Particule Size Distribution in Cement Hydration*, Presented to the 7th International Congress on the Chemistry of Cement, Paris (1980).

Knudsen, *The Dispersion Model for Hydration of Portland Cement, 1. General Concepts*, Cement and Concrete Research, vol. 14, 622–630 (1984).

Kosmatka, et al., *Design and Control of Concrete Mixtures*, 12, 16–20, 30–32, 34–36, 64–65, 77–93 (13th ed. 1988).

Lewis, et al., *Microstructure–Property Relationships in Macro–Defect–Free Cement*, MRS Bulletin (Mar. 1993).

Litvan, et al., *Particulate Admixture for Enhanced Freeze–Thaw Resistance of Concrete*, Cement and Concrete Research, vol. 8, 53–60 (Pergamon Press, Inc. 1978).

McGeary, *Mechanical Packing of Spherical Particles*, Journal of the American Ceramic Society, vol. 44, No. 10 (Oct. 1961).

Murata, *Flow and Deformation of Fresh Concrete*, Materials and Structures, 117–129 (Mar.–Apr. 1984).

Olson, *Materials Design: An Undergraduate Course*, The Minerals, Metals and Materials Society (1991).

Osbaeck, et al., *Particle Size Distribution and Rate of Strength Development*, Paper for the 89th Annual Meeting of the American Ceramic Society, Inc., Pittsburgh, PA (Apr. 26–30, 1987).

Patankar, et al., *The Packing of Some Non–Spherical Solid Particles*, Trans. J. Brit. Ceram. Soc., vol. 79, 59–66 (1980).

Purton, *The Effect of Sand Grading on the Calcium Silicate Brick Reaction*, Cement and Concrete Research, vol. 4, 13–29 (1974).

Ridgway, et al., *Particulate Mixture Bulk Densities*, Chemical and Process Engineering (Feb. 1968).

Roy, *New Strong Cement Materials: Chemically Bonded Ceramics*, Science, vol. 235, 6 (Feb. 1987).

Roy, et al., *Processing of Optimized Cements and concretes via Particle Packing*, MRS Bulletin (Mar. 1993).

Shilstone, *A Hard Look At Concrete*, Civil Engineering (Jan. 1989).

Shilstone, Jr., *Concrete–Year 2000+*(1987).

Shilstone, Sr., *Concrete Mixture Optimization by Coarseness Factor, Mortar Factor & Particle Distribution*, Concrete International (Dec. 1989).

Shilstone, Sr., *Interpreting the Slump Test* (1988).

Shilstone, Sr., *Mix Temperature and $$$$$*, Concrete Producer News (Oct. 1989).

Stovall et al., *Linear Packing Density Model of Grain Mixtures*, Powder Technology, vol. 48, 1–12 (1986).

*English Translation:* Strabo, et al., *Extrusion of Fiber Concrete*, Danish Technological Institute, Dept. of Building Technology (pp. 11–23 are the most relevant portion), TR–Project 1985–133/177–85,538 (Oct. 1987).

*English Translation:* Strabo, et al., *New Design Methods for Fiber Concrete*, Danish Technological Institute, Dept. of Building Technology, TR–Project 1984–133/117–84.028 (Apr. 1987).

Studt, *New Advances Revive Interest In Cement–Based Materials*, R&D Magazine (Nov. 1992).

5,527,387

DESIGN OPTIMIZED COMPOSITIONS AND COMPUTER IMPLEMENTED PROCESSES FOR MICROSTRUCTURALLY ENGINEERING CEMENTITIOUS MIXTURES

RELATED APPLICATIONS

This application is a continuation-in-part of application Ser. No. 08/109,100, filed Aug. 18, 1993, now abandoned, which is a continuation-in-part of application Ser. No. 08/095,662, filed Jul. 20, 1993, now U.S. Pat. No. 5,385,764, which is a continuation-in-part of application Ser. No. 07/929,898, filed Aug. 11, 1992, now abandoned; and is also a continuation-in-part of application Ser. No. 08/019,151, filed Feb. 17, 1993, now U.S. Pat. No. 5,453,310.

BACKGROUND

1. The Field of the Invention

The present invention relates to hydraulic cementitious compositions, products made from such compositions, and the methods for processing such hydraulic cementitious compositions and products. More particularly, the present invention is directed to systems and processes for optimizing the performance and design properties of cementitious materials, while minimizing manufacturing costs, through a materials science approach of microstructurally engineering the materials. Further, the present invention is directed to systems and processes capable of determining the appropriate modifications to the processing parameters in a specific method of manufacture in response to variations in the feedstock materials, thereby reproducibly producing a material with consistent performance characteristics and design properties.

2. Microfiche Appendix

Submitted herewith is one (1) microfiche having a total of twenty-two (22) frames. The microfiche contains the source code for the computer-implemented design optimization process as described in the specification and drawings, and which is submitted as one example for implementing a computer program for the described process. The microfiche portion of the disclosure of this patent document contains material that is subject to copyright protection. The copyright owner has no objection to the facsimile reproduction by anyone of the disclosure contained herein, including any material in the disclosure that is subject to copyright protection, as it appears in the Patent and Trademark Office patent file or records, but otherwise reserves all copyright rights whatsoever.

3. Technology Review

Hydraulic cementitious materials were first used about two thousand years ago by the Romans as the binding agent in mortars (i.e., now typically a combination of cement, water, and sand) and concretes (i.e., now typically a combination of cement, water, and aggregates such as sand and/or rock). This knowledge of hydraulic cementitious materials was later lost and then rediscovered in 1829 by J. Aspin in England. Since 1829, concrete has had a variety of uses because it is relatively inexpensive and can be easily worked under a wide range of conditions. Importantly, the versatility of concrete is enhanced because very little training or specialized equipment is needed to manufacture traditional concrete products. As well as having been used for more than a century as the primary material for building structures, concrete is employed in the infrastructure of every major component of modern society, e.g., pipes, sidewalks, curbs, bridges, highways, supports, foundations, and dams.

Hydraulic cement-based materials are formed by mixing cement with water to form a cement paste. Typical cement paste will have a water to cement ratio in the range from about 0.1 to about 1. As used in the specification and claims, the term "cement paste" includes a fluid mixture of cement and water. Generally, in a cement paste, the hydration reaction commences with the addition of the water, but is not completed. When water is added to the hydraulic cements, the synthesized clinker minerals in the cement reacts chemically with the water to form a new complex phase structure described as "CSH"-gel or calcium-silicate-hydrate. As a result of this reaction, the water-cement mixture sets and cures to bind the aggregates together to form mortar or concrete.

One of the most important uses of hydraulic cement compositions is in concrete. As used in the specification and claims, the term "concrete" is broadly defined as an inorganic composite material including cement paste as a primary binder that develops its properties under "near" ambient conditions. (Concrete is distinguished from inorganic ceramic materials in that it is not heated to several hundreds of degrees to develop bonding through a sintering process, rather it is a hydrated bonding material.) Concrete is a hard, strong building material made by mixing a water-cement mixture with one or more aggregates including sand, gravel, other geologic materials, metals, and/or metallic alloys.

For modern high technology concrete (for example, in the French-British tunnel or the Great Belt Link Connection in Denmark), there can be as many as 12–15 different components in the concrete mixture. Such components, as an example, may include three types of sand, three types of coarse aggregate, one specially designed cement, fly ash, silica fume, two types of plasticizing/water reducing admixtures, air entraining agents, accelerators, retarders, and water. In addition to all of these components, other variables which affect the properties of the resulting product include the processing techniques and equipment.

Typically, the two most important design criteria for cementitious materials are (a) the rheological flow properties of the fresh concrete, and (b) the compressive strength of the concrete as measured 28 days after the beginning of the hardening process. Flow properties of concrete are typically measured by filling a 30 cm high conical cylinder with freshly mixed concrete. The conical cylinder is then removed, leaving the now conically shaped freshly mixed concrete, freestanding. The vertical distance that the concrete then drops or slumps corresponds to the flow property of the concrete. The compressive strength of concrete is typically ascertained by the load failure of concrete cylinders cured for 28 days. Strength is measured in psi (pounds/square inch) or MPa (Megapascals).

Other design criteria such as permeability, chloride diffusion (of importance to rebar corrosion and hence the durability of the whole structure), thermal cracking, drying shrinkage, plastic shrinkage, sulfate resistance, alkali silica reactions, and the number of microdefects also have a direct influence on the strength and durability performance of the concrete. Many of the above criteria are a function of the porosity of the concrete. Microdefects are normally caused by bleeding and segregation phenomena and are associated with badly designed concrete. ("Bleeding" is the phenomena where water migrates towards the surface of the concrete and collects on the surface or underneath coarse aggregates. "Segregation" is a phenomenon where the concrete has no internal cohesion, and the mortar therefore separates from the coarse aggregates.)

The same attributes that make concrete ubiquitous in application (i.e., low cost, ease of use, and wide availability of raw materials) have also kept it from being fully researched and its full potential developed and exploited. In the past, it has simply been easier to overdesign a mixture rather than try to understand and define the interrelationship and effects of the different components. As a result, the engineering properties of cement-based materials have also been limited.

After decades of experience, the craftsmanship of concrete production has developed into a system of guidelines, rules, and codes based on the empirical results of varying cement mixtures. These guidelines are an attempt to promote uniformity of concrete with desirable qualities. In the United States, the generally accepted standards for concrete design are empirically derived formulas, created by the American Concrete Institute ("ACI") Committee 211 and set forth in "Recommended Practice for Selecting Proportions for Normal, Heavyweight and Mass Concrete," ACI 211 1-81 While other countries utilize slightly different standards, the resulting formulations are substantively similar and suffer from the same deficiencies.

These empirical standards provide the concrete manufacturer at the "ready-mix plant," the "pre-mix plant," or the "construction site" with recommended amounts of cement, sand (of a particular type), coarse aggregate (of a particular type), and water to use in a concrete mixture to achieve the predetermined desired performance characteristics—mainly the flow and strength characteristics. Unfortunately, the complexity and variability of materials, environments, and applications has continued to keep cement-based materials a local trade industry based upon trial and error, rather than one based on technology and science.

The typical approach for designing a concrete mixture following ACI 211 standards is to first select a recommended mix design with a desired theoretical slump and strength. The concrete is then mixed and the actual slump determined. As a result of variables such as the size, shape, type, and range of sand, coarse aggregate, and cement, along with the mixing procedure and environment, the actual slump usually does not correspond to the theoretical slump. Accordingly, additional mixes are produced with varying amounts of water until a mix with a desired slump is obtained.

The resulting concrete is then placed in cylinders and allowed to cure for 28 days. The resulting concrete cylinders are then loaded to determine their actual compressive strength. Should the actual strength not correspond to the desired strength, the process is repeated with a new recommended mix design having a lower or higher theoretical strength, depending on the actual strength of the previous mixture. As can be readily appreciated, such a process can be very time consuming and often very costly.

This prior art process has several drawbacks. Most notably, since the process does not take into account variabilities in the components, test mixtures must be made to ensure the required slump and strength are obtained. The test mixtures cause considerable delay since at least 28 days for curing is required. Moreover, there can be a substantial expense both in terms of preparing and testing the mixture and as a result of the delay for testing. Furthermore, even when a mixture is obtained that satisfies the slump and strength requirement, there is no assurance that it is the lowest cost mixture. Additional testing may reveal that by varying the size, range, and proportions of sand, coarse aggregate, and cement, a less expensive mixture might be obtained that possesses the same or even closer desired properties of slump and strength. Finally, once an acceptable mix design for a given set of materials is obtained, it is very difficult, if not impossible, to maintain consistency of performance (i.e., the slump and strength) due to the natural variation in the raw materials.

Another design approach is to initially produce a variety of concrete mixtures by adding and varying different components including admixtures. The admixtures can include fly ash, silica fume, water reducers, pozzolans, fillers, and air entraining agents which affect the slump and strength of the concrete. The mixtures are selected from those surrounding a recommended mix design having a desired theoretical slump and strength. However, varying a concrete mixture having 13 components on 10 different experimental levels would result in $10^{13}$ total number of combinations. A laborious task!

Computer programs have been written, such as that from Shieldstone & Associate, Inc. of Dallas, Tex., which recognize these challenges and attempt to amass and sort large databases of mix designs for ascertaining an optimal mix design given a certain feedstock. In general, the Shieldstone system attempts to match particle size distributions of known concrete mixes with available feedstock so as to design mixes having similar properties. Such programs, however, have had minimal success and applicability as a result of the almost infinite types of components for a given location that can be used in a mix design.

For example, although typically not more than three types of coarse aggregate are used in a mixture, the actual size and surface texture of the types of coarse aggregate, which in turn affect the properties of the mixture, can be of almost infinite variety. Accordingly, it is extremely difficult for one having an available feedstock to match the empirical results of mixtures made from a different feedstock. The problem is compounded as the number of available components increases. Furthermore, basing a new mixture on the empirical results of a previous mixture does not improve the new mixture nor does it insure that the new mixture will be the most optimal or economical.

It is thus virtually impossible, if not utterly impractical, to use conventional testing or empirical table of past results to ascertain with confidence and accuracy what types and proportions of a multi-component mixture result in a mix design that yields a desired strength and slump and having a minimal cost for each specific batch of concrete produced. Even when a mixture is obtained that has desired strength and slump properties, there is still a question as to durability. Almost any combination of aggregate can obtain a desired strength and slump if sufficient water and cement are added. However, as the amount of water is increased, the durability of the resulting concrete structure decreases. Accordingly, use of the above processes gives no assurance that the selected mixture will be the most durable.

Attempts have also been made to model certain aspects or properties of concrete mixtures. For example, the Bolomey and Feret equations attempt to model the resulting 28-day strength of concrete and mortars, respectively. Likewise, the Larrard eguation attempts to correlate the affect of particle packing on the strength of mixtures containing cement, fly ash, and silica fume, while Popovic's formula attempts to correlate water content of a mixture to the resulting slump or workability of the mixture.

For several reasons, however, such equations have found minimal acceptance and use in the concrete industry. First, and most important, no interrelationship between the equations has been established. Thus, although the equations might be useful in estimating a specific property, independently they are of little use in designing a mixture that will accurately optimize all properties. Second, empirical studies have found that there is a deviation between the theoretical results from the above equations and the actual experimental values obtained. Finally, the equations are typically designed only for use with standard mixtures using sand, cement, and coarse aggregate and do not take into consideration the affects of air voids in a mixture or the addition of modern admixtures such as fillers, fly ash, silica fume, and other pozzolans.

The problems associated with concrete mixtures are compounded in ready mix plants where the luxury of testing a mixture before use is often not available. Due to the difficulties associated with controlling the flow behavior and loss of flow of fresh "unset" concrete over prolonged periods of time before casting (sometimes up to 10 hours after mixing), most concrete is produced in ready-mix plants located relatively close to the project site. Hence, the actual operators of the plants are trained more in evaluating the "look and feel" of the concrete material, than in designing the concrete through scientific procedures.

The prevailing practice in ready-mix plants has been to use fixed proportioning (that is, established design mixes) in a computer control system to combine these variable materials in order to obtain a cured concrete having predetermined characteristics. One of the main historical difficulties, however, in producing consistent, predictable concrete has been that the component materials used will vary from day to day and even from batch to batch or site to site. The result has been inconsistent concrete materials with high standard deviations in properties.

The concrete industry has, therefore, had to resort to a practice of overdesigning to compensate for the inability to control production consistency. A standard concrete mixture is given a theoretical design strength based on the minimum 28-day strength of test cylinders. Depending on the number of cylinders tested and the standard deviation between test results, the actual and theoretical design strength can substantially vary. In contrast, the more consistent the concrete can be produced, the less the concrete needs to be overdesigned.

The practice of overdesigning in combination with bad initial designing turns out to be more costly than might be initially apparent, both for the manufacturer and for society as a whole. When design and performance criteria are established for a specific concrete batch, the manufacturer cannot simply prepare a product that on the average meets each of those criteria. The manufacturer must design a product that will meet the minimum criteria assuming that all of the materials are simultaneously at the worst end of their range of variability.

For example, the quality and gradation of the available cement may vary in a range from A (worse) to B (best). Similarly, the quality and gradation of each type of aggregate will also vary in a range from C to D. Also, the sand quality will vary in a range from E to F. Even the quality of the water and other admixtures will vary within a given range; however, typically these will be of less importance than the cement, sand, and coarse aggregate variations.

The range for any given cement, sand, or aggregate material can be quite large since it is relatively expensive to obtain feedstock materials having a narrow range of consistent quality and size. It has been typically found to be more economical to significantly overdesign the concrete material rather than start with quality-controlled, guaranteed, consistent feedstocks.

Hence, when processing the concrete, the manufacturer must assume that at any given time, the quality of the sand is at "A" (its worst), the quality of the aggregates is at "C" (its worst), and the quality of the cement is at "E" (its worst). It becomes immediately apparent that the types and amounts of the materials actually used must be significantly different than those necessary to achieve the desired result.

The result is that a more costly product having an overdesign of upwards of several thousand psi in compressive strength may have to be produced. Nevertheless, at any given time, the product which is produced may be anywhere from just barely adequate to being overdesigned by upwards of 50%. In a highly competitive market, the results are at best a narrow, if not nonexistent, profit margin, or at worst an incentive to "cut corners" and produce an inferior product which may fail at a later date.

The process of overdesigning is also reflected in the proportions of the various components. That is, preestablished mixes typically have an excess of sand in the mixture to insure a cohesive mixture that will not bleed or segregate. The addition of excess sand, however, results in a more porous mixture that is less durable. Mixtures also typically include more cement than necessary, thereby increasing the price, in order to insure that the mixture has sufficient strength.

Furthermore, even though the ready-mix plant operator will significantly overdesign his product, the operator can never be sure that the material will meet the desired performance criteria. This is not only because of the variability in materials, but because the operators use standard mix designs (or recipes) to achieve a given set of performance parameters. These recipes are empirical and are based upon average, historical experience, but they still leave doubt as to the capabilities of any given product. The operator can never be sure whether the materials being used are precisely the same or will give the same performance as those used in developing the standard mix designs.

A further problem encountered in the day-to-day practice of the concrete industry is that, because of the above mentioned variations in the materials' properties, the truck drivers frequently take some action to symptomatically modify or "correct" the workability or flow characteristics of the concrete from those existing at the time the concrete was placed in the truck at the ready-mix plant. It has been estimated that in approximately 70% of the deliveries of concrete in the United States the truck driver will modify the concrete specification, typically by adding water to the concrete mixture to make it "pour" or "look" better. The result is that the water to cement ratio is increased and the compressive strength is decreased. In other countries, it has been determined that this practice has such serious consequences, it is not permitted. Hence, ready-mix plant production is at a further disadvantage because what happens to the concrete mix after it leaves the ready-mix plant cannot be controlled because the product is not sufficiently predictable.

From the foregoing, it will be appreciated that what is needed in the art are processes and manufacturing techniques for consistently and predictably producing uniform cementitious compositions and products which can be assured to meet predetermined quality characteristics and to meet predetermined performance criteria.

It would be another significant advancement in the art to produce consistently and predictably cementitious compositions and products which would meet the predetermined design and performance criteria, while minimizing the need to overdesign the cementitious materials and thereby minimize the cost of manufacturing.

Additionally, it would be a significant advancement in the art to produce consistently and predictably such uniform cementitious compositions and products even though feedstocks (e.g., cement, sand, gravel, aggregates, water, and admixtures) having variable qualities and attributes are utilized.

It would be yet another significant advancement in the art to provide novel compositions and processes for producing cementitious compositions and products with such predictable properties that the resultant product would not need to be modified by the truck driver or at the delivery site.

Another significant advancement in the art would be to provide novel processes for designing concrete such that the cementitious compositions predictably meet the required strength, slump, and durability characteristics.

It would be a further advancement in the art to provide novel compositions and processes for designing concrete such that trial and error approximation is eliminated.

It would be yet another advancement in the art to provide novel compositions and processes for designing concrete such that the mix design for a certain concrete having a variety of components and admixtures will be known to be optimal and at the same time be the most cost effective.

Further, it would be an advancement to provide novel processes for modifying in "real time" the manufacturing processes of cementitious compositions and products in response to changes on site of the feedstock materials.

Such cement compositions, products, and methods are disclosed and claimed herein.

BRIEF SUMMARY AND OBJECTS OF THE INVENTION

The present invention relates to hydraulic cementitious compositions, products, and systems for manufacturing and processing such hydraulic cementitious compositions and concrete products which optimize the performance and design properties of cementitious materials, while minimizing manufacturing costs. Rather than relying upon the trial and error empirical approach historically used to design concrete mixes, a materials science approach is utilized which offers the opportunity of microstructurally engineering the desired quality characteristics and performance properties into the cementitious materials.

The design optimization process of the present invention includes twelve different steps.

Step 1 is ascertaining the maximum packing density of a dry concrete mixture including cement and at least one or more types of aggregate ("types" corresponds to aggregates within a certain range of sizes. Conventional mixtures will usually have one type of fine aggregate, e.g., sand, and one type of coarse aggregate, e.g., gravel). The proper combination of different types of aggregate will result in a concrete mixture of increased packing density and can result in a mixture having maximum packing density.

Studies have found that mixtures close to maximum packing density optimize both the wet and dry properties of concrete. That is, as a concrete mixture approaches maximum packing density, properties such as workability, strength, permeability, chloride diffusion resistance, and durability are optimized. This is because only a minimal amount of water needs to be added to a mixture at maximum packing density to obtain a desired workability. Furthermore, the amount of cement needed to produce a cohesive concrete that will prevent bleeding and segregation is minimized at the point of maximum packing density, thereby decreasing the cost of the mixture.

The proportions of cement and the different types of fine and coarse aggregates needed to obtain maximum packing density are determined by theoretically calculating the packing densities for all combinations of the feedstock. By comparing the packing densities, one can then determine the maximum packing density and the corresponding percent volume of the components.

Step 2 is determining the initial optimal concrete mixture that is as close to the maximum packing density as possible but has sufficient cohesion not to bleed or segregate and also has the desired strength and slump. The underlying approach behind the optimization process is to first determine the unit cost of the initial mixture closest to the maximum packing density that has the desired strength, slump, and cohesion properties and then to compare it to the unit cost of mixtures with the same properties but at varied fine-to-coarse aggregate ratios. By comparing the unit cost of each of the optimal mixtures at the varying fine-to-coarse aggregate ratios, one can determine the most economical mixture with the desired properties.

The initial optimal mixture is determined by first selecting a mixture that is close to having maximum packing density so as to provide optimal properties but has sufficient sand to produce a cohesive matrix that will prevent bleeding and segregation of the concrete. The packing density of the mixture and the required amount of water needed for the mixture to obtain a desired slump are then determined. With this information, the resulting strength of the mixture is calculated and compared to the desired strength. If the calculated strength is too low or too high, the percent volume of cement is increased or decreased, respectively, keeping the fine-to-coarse aggregate ratio constant. The above process is now repeated for the new mixture and the process continues until a mixture with the desired strength and slump is determined for the set fine-to-coarse aggregate ratio. The resulting mixture is defined as the initial optimal mixture.

Step 3 compares the unit cost for the optimal mixtures at each defined fine-to-coarse aggregate ratio so as to determine the overall optimal mixture that has desired properties and minimal cost. The process is most logically accomplished by determining the fine-to-coarse-aggregate ratio at the initial mixture defined in Step 2. The volume of fine aggregate is then incrementally increased as the volume of coarse aggregate is decreased, respectively, thereby defining a new fine-to-coarse-aggregate ratio. The composition and cost of the optimal mixture at the new fine-to-coarse-aggregate ratio is then determined and compared to the previous optimal mixture. If the new optimal mixture is less expensive, then the fine-to-coarse-aggregate ratio is again varied and an optimal composition and cost is determined and compared. This process continues until the new mixture becomes more expensive than the previous mixture (or until the maximum amount of fine aggregate is reached) at which point the previous mixture is the best mixture.

Steps 4–7 calculate the effects of combining the admixtures including fly ash, silica fume, water reducers, and fillers, respectively, to the standard concrete mixture. Water reducers are added to decrease the amount of water required to produce a mixture with a desired slump. Fly ash and fillers are added as a replacement of cement, especially in low strength concrete, to decrease the materials costs and to decrease the amount of water required to produce a mixture with a desired slump.

Fly ash, silica fume, and pozzolans also have cementitious properties that independently contribute to the strength of concrete. Silica fume usually increase the amount of water required to produce a mixture with a desired slump, while other pozzolans will either decrease or increase the amount of water required depending on the chemical composition and morphology of the pozzolan.

Step 8 combines the previous processes into a set of embedded "do loops" that incrementally vary the components and calculate the proportions of fine aggregate, cement, coarse aggregate, mixing water, fly ash, silica fume, and water reducers that will produce a concrete mixture with desired properties and minimum cost.

Step 9 discusses air-entraining agents and how they are accounted for and corrected for in the optimization process so as to insure that the resulting concrete structure has a sufficient specified air content. Air entraining agents are added to introduce freeze/thaw durability into the concrete.

Step 10 determines a correction factor to be applied to the optimization process so as to obtain improved estimates of the slump results. In general, this is accomplished by plotting theoretical water results versus actual water results for the same slump. The correlation between the results is then defined and incorporated into the process so as to produce improved results.

Step 11 determines durability or porosity of concrete which can be incorporated as a property into the optimization process. Selecting a mixture based on durability insures that the selected mix has sufficient durability for its intended use.

Finally, Step 12 discloses how to accurately determine what volume or weight of the components of a mixture are required to obtain a precise desired yield or volume of the final mixture. This process takes into account particle packing and the interstitial spaces between the particles.

Further, the present invention is directed to systems capable of determining the appropriate modifications to the processing parameters in response to variations in the feedstock materials, thereby reproducibly producing a material with consistent performance and design properties. The hydrated cement compositions of the present invention may be prepared having high density and strength. It has been observed that the processing parameters according to the present invention can be controlled so that there is little or no measurable bleeding or segregation of the fresh concrete.

Hence, a whole new field of concretes of improved quality and durability may now be prepared by the processing techniques of the present invention.

It is, therefore, an object of the present invention to provide novel processes and manufacturing techniques for consistently and predictably producing uniform cementitious compositions and products which can be assured to meet predetermined quality characteristics and to meet predetermined performance criteria.

Another important object of the present invention is to provide consistent and predictable novel cementitious composition and products which would meet the predetermined design and performance criteria while minimizing the need to overdesign the cementitious materials for strength or volume (i.e. yield) and, thereby minimizing the cost of manufacture.

Yet another important object of the present invention is to produce consistently and predictably such uniform cementitious compositions and products even though feedstocks (e.g., cement, sand, gravel, aggregates, water, and admixtures) having variable qualities and attributes are utilized.

An additional object of the present invention is to provide novel compositions and processes for producing cementitious compositions and products being assured that the resultant product is such that no post-processing modifications would be needed to modify the mix characteristics.

Still yet another object of the present invention is to produce cementitious compositions and products that have sufficient durability for their intended use.

Another object of the present invention is to provide novel processes for designing concrete such that the cementitious compositions meet the required strength, slump, and durability characteristics.

It is another object of the present invention to provide novel compositions and processes for designing concrete such that trial and error approximation is eliminated.

It is yet another object of the present invention to provide novel compositions and processes for designing concrete such that the mix design for a certain concrete having a variety of components and admixtures will be known to be the optimal and at the same time the most cost effective.

A further important object of the present invention is to provide novel processes for modifying in "real time" the manufacturing processes of cementitious compositions and products in response to changes on site of the feedstock materials.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1:
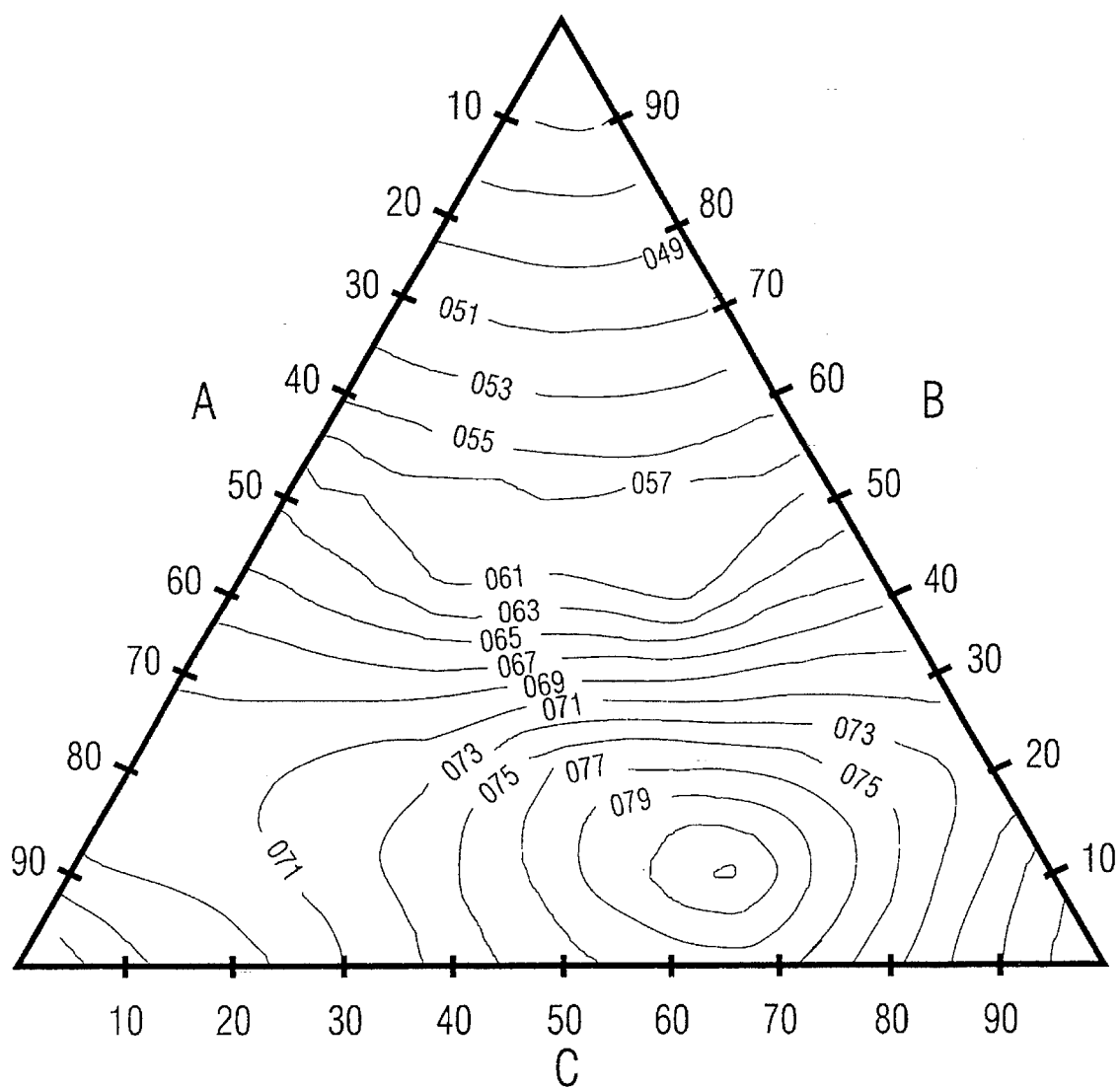
FIG. 1 is a packing density chart for the ternary mixture of cement, quartz sand (0–2 mm), and crushed granite (8–16 mm).

The present invention relates to hydraulic cementitious compositions, products, and the methods for manufacturing and processing such hydraulic cement and concrete products. More particularly, the present invention is directed to creating systems to optimize the performance and design properties of cementitious mixtures, while minimizing manufacturing and compositional costs, through a materials science approach of microstructurally engineering the materials. Further, the present invention is directed to systems capable of determining the appropriate modifications to the processing parameters in response to variations in the feedstock materials, thereby reproducible producing a material with consistent performance and design properties.

I. General Discussion

A. Microstructural Engineering Design

As mentioned above, the guidelines, rules, and codes used today for the conventional production of cement and concrete materials are based on the average of empirical results obtained over decades. To compensate for the variance in properties obtained by following such standards, concrete materials are overdesigned to insure that the resulting cement-based products will possess the desired properties.

In contrast, the current invention uses a materials science approach to microstructurally engineer concrete so that it possesses the desired characteristics and qualities. Under this approach, models have been developed and combined with those known in the art to produce new models that accurately determine the strength, slump, and durability of a concrete mixture based on the composition of the mix design. Using such models, one is able to accurately define the mix design that will optimize desired characteristics and properties while minimizing materials cost. Furthermore, the models can also be used to determine whether admixtures such as fillers, water reducers, air entraining agents, silica fume, fly ash, and other pozzolans should be added and, if so, in what quantity to optimize the design mixture.

Microstructural engineering is the process of building into the microstructure of cementitious compositions certain desired, predetermined properties such that the properties are reflected in the final product. The microstructural engineering approach is also cognizant of costs and manufacturing variations and complications. In other words, the microstructural engineering analysis approach, in contrast to the traditional trial-and-error mix and test approach, allows one to design and predict desired properties such as strength, weight, slump/workability, porosity, permeability, durability, cost, environmental concerns, and manufacturing problems.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have high moduli, while polymers have low moduli; metals can be shaped by casting and forging, while composites require lay-up or special molding techniques.

Compartmentalizing materials, however, has its dangers; it can lead to specialization (the metallurgist who knows nothing of ceramics) and to conservative thinking ("we use steel because that is what we have always used"). It is this specialization and conservative thinking that has limited the consideration of using cementitious materials for a variety of products. Nevertheless, once it is realized that cementitious materials have such a wide utility and can be designed and microstructurally engineered, then their applicability to a variety of possible products becomes innumerable.

The present invention uses the strategy of microstructurally engineering concrete to develop raw cementitious materials with highly-controlled properties. The approach is based on materials science which is a discipline, or a scientific approach, that focuses on relationships between new materials, processing, microstructure, and performance properties, as shown in Table I listed below.

TABLE I

Raw Materials
↓
Processing
↓
Microstructure
↓
Performance
Properties

The theory is based upon understanding how various processing techniques used on desired raw materials affect the microstructure and, in turn, the properties of resulting products. Understanding these relationships permits one to selectively vary the materials and processing techniques to produce a product that has desired performance properties.

The "materials science" approach has been demonstrated with a wide range of materials including steel, polymers, composites, semi-conductors, and more recently, superconductors. In all of these widely diverse materials, the approach of materials science is leading to the production of a new generation of high performance materials. Through materials science, one can model the relationship between processing, microstructure, and properties to design a specific product with optimized properties and cost based on scientific understanding, rather than on a trial-and-error basis.

Application of the materials science approach to concrete is a challenge due to the inherent complexities of cement-based materials. The relationships that control and optimize the microstructure and the properties of concrete are interactive and difficult to define. The complexity of the hundreds of chemical reactions occurring in hydration of cement in conjunction with the wide variability in raw materials, processing techniques, handling, and curing procedures, etc., has persuaded industry in the past that concrete is not a controllable product with sufficient predictability to make it applicable to the materials science approach. Historically, researchers have documented the variability of the microstructure and properties of concrete. The generally accepted conclusion is that the task of modeling was of little worth, if not impossible.

An aspect of concrete that has been most difficult to fit to the materials science discipline is the relationship between, and the optimization of, the "wet" (early age) and the subsequently "hardened" (mature or cured) state. For example, optimum slump and workability require different formulations than that required for high strength and low permeability. This apparent conflict between the properties of the material (during handling and placing vis-a-vis after curing) has been viewed as an irreconcilable conflict that requires a best "compromise" for the craftsman and the engineer.

For these reasons, until now, the science and technology of cement-based materials have not been linked to practice and a complete approach to understanding the relationships between processing, microstructure, and properties have not been undertaken by industry. The present invention uses the materials science approach to microstructurally engineer concrete and teaches one of ordinary skill in the art this novel approach and process with surprising results. To design the new cementitious materials, each step represented in Table I was analyzed and broken down into categories as shown in Table II.

TABLE II

| Materials | Processing | Microstructure | Performance Properties |
|---|---|---|---|
| Cement | Particulate size and shape | Structure of bond between particles | Slump |
| Sand | | | Strength |
| Coarse aggregate | Distribution of solids | Structure of C—S—H | Permeability |
| Fillers | Water-cement ratio | Size of pores | Durability |
| Fly ash | | | Creep and shrinkage |
| Silica fume | Addition of admixtures | Dispersion of solids | |
| Water reducers | Mixing conditions | Density of matrix | Economy |
| Pozzolans | | | |
| Air-Entraining agents | Placing | Connectedness of pores | |
| | Finishing | | |
| | Curing conditions | Early age aqueous phase | |
| | Time | Reaction rates | |
| | Temperature | Hydration mechanisms | |

Empirical models were then created to describe how processing of the materials affected the microstructure and thus performance properties of the resulting cement product. The empirical models were refined (e.g., expanded and narrowed in scope and limited by defined constants) to create models that could then be tested. Valid models were then combined to make a total system for the design and production of specific products having desired properties.

The resulting system disclosed by the current invention can perform several functions. Most notably, the ability to predictably determine the relationship between each component and step previously outlined allows for superior low-cost concrete to be designed and produced. More specifically, the system can determine what combination of materials, including admixtures, should be used to obtain a cement mixture with a desired slump and resulting strength that will have a minimal cost. The system can also determine what combination of available materials should be used to obtain a mixture with desired properties. Furthermore, the system can define what combination of materials should be used to obtain a mixture that will have maximum durability or any desired durability without segregation or bleeding. Additional functions of the system will be disclosed or be self-apparent in the specification and claims.

The present system has been formulated into a series of steps that can be calculated manually, with the assistance of some diagrams, or can be formulated into a computer program. The formulation process requires the user to input the desired strength and slump; the natural packing density and average particle diameter of the aggregate and cement used; whether fly ash, silica fume, fillers, water reducers, air entraining agents, or other pozzolans are to be used and if so with what characteristics; and the unit price for each component in the concrete. The process then determines the mix designs that will result in a concrete having the desired properties. The unit prices of these mix designs are then calculated and compared so as to determine the least expensive concrete mixture having the desired properties.

B. Particle Packaging

To fully appreciate the optimization process of the current invention, it is necessary to understand some of the fundamental mechanics of concrete. As previously discussed, one of the difficult concepts in modeling concrete is the apparent conflict between optimizing properties of wet and dry concrete.

Wet properties include slump, which is a particular measure of the rheological function of the water and the cement content. The more water added to a concrete mixture, the lower the viscosity of the cement paste and the lower the friction force between the aggregate particles—therefore, the higher the slump. In turn, high slump leads to increased workability which makes it easier to place and finish the concrete. However, different slumps ranging from 0 to 23 cm are required for different kinds of structures.

The dry properties include strength and porosity properties. These properties are also a function of the water content, but in opposite proportions. The more water added to a cement mixture, the lower the concentration of cement, thereby resulting in lower ultimate strength of the concrete. Furthermore, mixtures with high water contents often segregate or bleed.

"Bleeding" is the migration of water to the surface layer of newly mixed concrete as a result of the settling of the aggregate. The migration of water further increases the water-cement ratio at the surface layer of the concrete, thereby decreasing the strength and durability of the surface layer. "Segregation" is the separation of mortar (cement, water, and sand) from the coarse aggregates leading to decreased homogeneity, areas of less cement, and hence, reduced strength and increased porosity and permeability. Finally, a high water content also increases porosity throughout the cured concrete, thereby decreasing its durability.

Studies, however, have found that the best dry and wet properties of concrete are obtained for mixture compositions close to the maximum packing density. Packing density is a function of particle packing which is the process of selecting appropriate sizes and proportions of particulate materials to fill larger voids with smaller particles, containing smaller voids that again are filled with smaller particles, and so on to achieve maximum particle density. Ideally, a concrete can be designed by packing the coarse aggregate as efficiently as possible, then packing the fine aggregate into the interstitial spaces, and finally filling the remaining smaller interstitial spaces with paste.

To understand why wet and dry properties of concrete are interrelated, consider a dry concrete mixture "A" having a packing density of 0.5, a volume of one cubic meter, and subsequently being mixed with a quantity of water, X. Since the packing density is less than 1, part of the volume (i.e., 0.5 cubic meters) constitutes air voids or interstitial spaces between the particles which are later filled by the water.

Now, if the size of the particles in mixture "A" are modified to have an increased packing density of 0.8, the new mixture has a smaller total volume of 0.625 cubic meters because the volume of air voids inside the mixture are decreased to 0.125 cubic meters. Accordingly, when the same quantity of water, X, is added to the new mixture having a density of 0.8, the slump is increased because the water that was initially used to fill the air voids is now used to surround the particles and decrease their friction force.

In the alternative, as the packing density increases, one can also decrease the amount of water added, thereby increasing the strength of the concrete while maintaining the same slump. Thus, as one approaches maximum packing density, the wet and dry properties of concrete are optimized since only the minimal amount of water necessary to achieve a desired slump needs to be added to the mixture.

It should be noted, however, that as the maximum packing density is approached, the tendency for segregation and bleeding increases. This is because, at the point of maximum packing density, there is insufficient sand or fine aggregate in the mixture to make a sufficiently cohesive matrix that will support the aggregate. As a result, segregation occurs, thereby decreasing the homogeneity and the strength of the resulting concrete.

Determining the mixture composition for maximum packing density also has an economic benefit. Cement is generally the most expensive element in a concrete mixture. To provide a cohesive sound structure, sufficient cement must be added to coat all aggregates and to preferably fill the voids within the concrete mixture. (A higher strength is obtained by filling the voids between the aggregates with cement as opposed to just water.) At the point of maximum packing, the surface area of the particles and the voids between the particles are minimized, thus, minimizing the amount of cement needed. Accordingly, the cost of the concrete is also minimized. Of course, determining what mixture is the least expensive depends on the cost of the different components.

At times, mixtures having a lower packing density may be less expensive. For example, sand is often the least expensive component. Accordingly, mixtures having a low concentration of cement and a high concentration of sand may be the least expensive mixture. However, as the percent of sand increases, so as to move away from the point of maximum packing density, the porosity increases, thereby decreasing the durability of the mixture.

The ability to accurately and predictably regulate the particle packing of a mixture permits the regulation of the systems rheology of a mixture. System rheology refers in part to the viscosity and yield stress of a mixture and is a function of both macro-rheology and micro-rheology. The macro-rheology is the relationship of the solid particles with respect to each other as defined by the particle packing. That is, by selectively regulating the particle size distribution of a mixture while holding the water or lubricating component constant, the yield stress and viscosity of the mixture can be selectively controlled.

Control over the system rheology of a mixture is important in the economic mass production of thin-walled container and particles such as those disclosed in the patent application entitled "Hydraulically Settable Containers and Other Articles for Storing, Dispensing, and Packaging Food and Beverages and Methods For Their Manufacture" that was previously incorporated by reference. Mixtures having a low viscosity are more easily fashioned into a desired shape and thus are usually preferred during the forming step of a container. In contrast, once the container is formed, it is preferred that the mixture have a sufficient high yield stress to permit the container to be form stable in a self-supporting posture, thereby permitting mass production of the containers. Control over particle packing can be used in optimizing the viscosity and yield stress of a mixture.

The micro-rheology is a function of the lubricant fraction of the system that fills or more than fills the spaces between the "macro" particles. By modification of the lubricants (which may be water, rheology-modifying agents, plasticizer, or other materials), the viscosity and yield stress can be chemically modified. The micro-rheology can also be modified physically by changing the shape and size of the particles e.g., the use of chopped fibers, plate-like mica, round-shaped silica fume, or crushed rough cement particles will interact with the lubricants differently.

Although the theory of particle packing is understood, the difficulty is in determining with speed, accuracy, and consistency what size and proportions of defined components will result in a maximum packing density. The present invention resolves this problem by defining a model that accurately determines the packing density for a defined percent volume mixture of at least one type of aggregate, and cement. To determine the maximum packing density, the packing density is calculated for all percent volume combinations of the feedstock.

II. Design Optimization Process

The following is a detailed description of the theory, models, and steps necessary to accurately and reproducibly determine the optimal proportions of cement, water, sand, coarse aggregate, and admixtures (such as water reducers, air entraining agents, fillers, fly ash, silica fume, and other pozzolans) needed to produce a concrete mixture having desired wet and dry properties at a minimal cost.

Step 1 discusses the process for ascertaining the maximum packing density and corresponding composition of a dry concrete mixture having cement and one or more types of aggregate.

Step 2 discusses the process for determining the initial optimal concrete mixture that is closest to the maximum packing density and has the desired strength, slump, and cohesion at a specific fine-to-coarse-aggregate ratio.

Step 3 discusses the process for comparing the unit cost for each optimal mixture at defined fine-to-coarse-aggregate ratios so as to determine the overall optimal mixture.

Steps 4–7 discuss the processes for calculating the effects of combining different admixtures including fly ash, silica fume, water reducers, and fillers, respectively, independently to the standard concrete mixture.

Step 8 outlines the flow diagram and iterative loops used in determining the best optimal mixture having desired properties and minimal cost. The mixture includes fine aggregate, cement, coarse aggregate, mixing water, fly ash, water reducers, air entraining agents, silica fume, and pozzolans with desired properties and minimum cost.

Step 9 modifies the resulting mixture to insure that it reflects the proper concentration of air-entraining agent so as to have the proper air content.

Step 10 describes how to determine a correction factor to be applied to the optimization process so as to obtain improved slump results thereby, further optimizing the results.

Step 11 provides a means for determining the durability of a mixture to insure that the selected mixture has sufficient durability for its intended use.

Finally, Step 12 discloses how to accurately determine what volume or weight of the various components of a mixture are needed to produce a desired yield of the mixture.

Step 1: Maximum Packing Density

The first step in the optimization process is determining the maximum packing density and corresponding volume for each component in a dry concrete mixture. The terms "concrete mixture," "cementitious mixture," and "mixture" as used in the specification and appended claims are intended to include a composition having at least one type of cement and at least one type of aggregate and to which may be added water and various admixtures. The term mortar as used in the specification and appended claims is intended to include a mixture having only cement and one type of aggregate. Other mixtures which can be formed from the present invention include plaster and wall board.

The terms "aggregate" or "aggregates" as used in the specification and appended claims are intended to include a variety of crushed and naturally occurring rock and mineral. For use in the present invention, however, they should be sound and conform to certain standards for optimum engineering use: they should be clean, hard, dense, strong, durable particles free of absorbed chemicals, coatings of clay, humus, and other fine material that could affect hydration and bond of the cement paste.

In some mix designs it may be desirable to add aggregates that decrease weight or increase the insulation ability of the mixture. Examples of useful aggregates include perlite, vermiculite, sand, gravel, rock, limestone, sandstone, glass beads, aerogels, xerogels, seagel, mica, clay, synthetic clay, alumina, silica, fly ash, silica fume, tabular alumina, kaolin, microspheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, unreacted cement particles, pumice, exfoliated rock, and other geologic materials. Reacted and unreacted cement particles may also be considered to be "aggregates" in the broadest sense of the term.

In addition to conventional aggregates used in the cement industry, a wide variety of other aggregates, including fillers, strengtheners, metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and other such fibers typically used to prepare various types of composites), may be combined with the hydraulic cements within the scope of the present invention. Even materials such as seeds, starches, gelatins, and agar-type materials can be incorporated as aggregates in the present invention.

Studies have found that the packing density of a mixture is increased where two or more types of aggregate having a difference in their average particle size diameter are used. Accordingly, as used in the specification and appended claims, the term "aggregate" will often be defined in terms of a fine aggregate and a coarse aggregate. To obtain an improved packing density it is desirable that the ratio of the average particle size of the coarse to fine aggregate be about 3:1, with about 5:1 being preferred, and about 7:1 being most preferred. Typically, sand is used as a fine aggregate. Sand includes compositions of particles that have diameters ranging from about 8 mm and smaller. Conventional coarse aggregate usually includes compositions of particles that have diameters ranging from about 2 mm to about 165 mm. In the embodiments where thin-walled articles are being formed, it may be preferable that the aggregate size be less than twenty times the cement particle size. Such aggregate is generally less than 2 mm in diameter.

The terms "fine aggregate" and "coarse aggregate" as used in the specification and appended claims are not intended to be limited by any size range but are simply used to designate that one type of aggregate is larger than another. For example, in a cement mixture containing two types of sand, the sand with the larger diameter would be referred to as the coarse aggregate.

The term "type" as used in the specification and appended claims with regard to aggregate, cement, and other solid particles is intended to include both the kind of material used and the ranges of the particle sizes. For example, although coarse aggregate usually includes particles having a range from 2 mm to 165 mm, one type of coarse aggregate may have a particle size range from 2 mm to 8 mm while a second type may have a particle size range from 8 mm to 16 mm. As will be shown below, optimal particle packing of a mixture can be obtained by selectively combining different types of aggregates. Studies have found that types of aggregates have a defined average particle size but a large gradation will usually have improved packing.

The cement used in the present invention comes from the family of cements known as hydraulic cements. Hydraulic cement is characterized by the hydration products than form upon reaction with water. Hydraulic cements are to be distinguished from other cements such as polymeric organic cements. The term powdered hydraulic cement, as used herein, includes clinker, crushed, ground, and milled clinker in various stages of pulverizing and in various particle sizes.

Examples of typical hydraulic cements known in the art include: the broad family of portland cements (including ordinary portland cement without gypsum), calcium aluminate cements (including calcium aluminate cements without set regulators), plasters, silicate cements (including β-dicalcium silicates, tricalcium silicates, and mixtures thereof), gypsum cements, phosphate cements, and magnesium oxychloride cements. The term hydraulic cement also includes other cements, such as α-dicalcium silicate, which can be made hydraulic under hydrating conditions within the scope of the present invention. The term "cement" is also intended to include fillers, fly ash, silica fume and other pozzolans. Hydraulic cements generally have particle sizes ranging from 0.1 µm to 100 µm.

All volume measurement used in the specification, unless expressly enumerated otherwise, are expressed as a fraction of the total solids in the mixture. The term "total solids" as used in the specification and appended claims is intended to include cement, aggregate, and, where relevant, fillers, fly ash, silica fume, and other pozzolans. Accordingly, the volume of aggregate and cement in a standard mixture always add up to 1.0. The volume measurements of water and air in the mixture are also based on a fraction of the volume of total solids. Thus, a value of 0.3 for a volume of water in a mixture corresponds to a volume of water equal to 30% of the total volume of solids in a mixture. Accordingly, the total volume of the mixture including the water would be 1.3.

The types of aggregate and cement of the present invention are further defined by the average diameter size (d') and the natural packing density (ϕ) of the types of particles. These values are experimentally determined and are necessary for calculating the theoretical packing density of the resulting concrete mixture. The average diameter size is determined by plotting the particle size distribution of each material according to the Rosin-Rammler-Sperling-Bennett distribution described by the equation:

$$R(D) = \exp\left\{-\left(\frac{d}{d'}\right)^n\right\} \quad (1)$$

Where, d is the particle diameter, R(D) is the cumulative probability that the diameter is less than d, d' is the diameter for which R(d')=0.368 corresponding to 36.8% residue on that sieve size, and n is the slope of the line defined by plotting the percent of particles retained on a sieve versus the sieve size.

The packing density of each type of material, ϕ, is determined by filling the material into a cylinder having a diameter of at least 10 times the largest particle diameter of the material. The cylinder is then tapped against a hard surface until the material is fully compacted. By reading the height of compacted material in the cylinder and the weight of material, the packing density is calculated according to the formula:

$$\phi = \frac{W_M}{SG_M \cdot V_M} \quad (2)$$

Where, $W_M$ = weight of the material, $SG_M$ = specific gravity of the material, and $V_M$ = volume of the material.

In this way, not only is the volume of particles quantified but it is done as a function of particle morphology, specific surface area and other specific surface characteristics.

The maximum packing density of a conventional, three-component mixture including cement, one type of fine aggregate, and one type of coarse aggregate is determined by incrementally varying the volume of each component in the mixture and calculating the corresponding packing density. The various packing densities are then plotted on a triangular-shaped packing density chart so as to determine what composition has the maximum packing density.

As an example, FIG. 1 is a packing density chart for the ternary mixture of cement, quartz sand (0–2 mm), and crushed granite (8–16 mm). Side (A) of the chart defines the volume percent of fine aggregate (sand); side (B) defines the volume percent of cement; and the bottom or side (C) defines the volume percent of coarse aggregate (crushed granite). The values inside the triangle represent the packing density at various percent volume mixtures of the components. The chart is read in the following manner:

1(a). Select a desired packing density from within the triangle. By way of example, point "Z" is selected on FIG. 2 which represents the maximum packing density for the defined mixture.

1(b). Determine the percent volume of cement used in the concrete mixture needed to obtain the packing density at point "Z" by drawing a horizontal line 20 from point "Z" to side (B) of the triangle. The value defined by where line 20 and side (B) of the triangle intersect is the percent volume of cement needed to obtain the desired packing density. In the example on FIG. 2, the percent volume cement is approximately 10%.

1(c). Determine the percent volume of fine aggregate in the mixture by drawing a line 22 parallel to side (B) of the triangle; the line starting from point "Z" and intersecting side (A) of the triangle. The value defined at where line 22 and side (A) intersect is the percent volume of fine aggregate needed to obtain the desired packing density. In the example, the percent volume of fine aggregate is approximately 30%.

Figure 2:
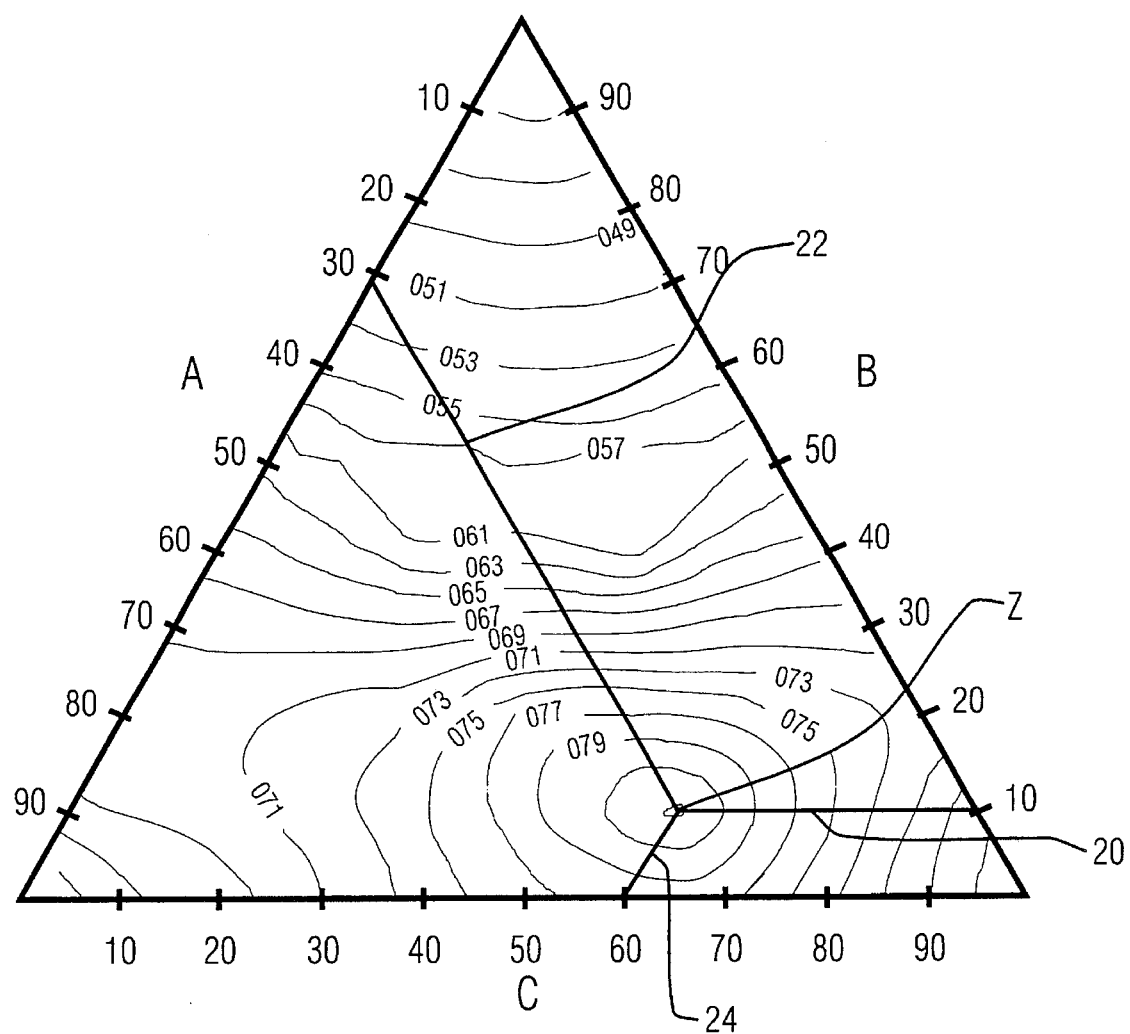
FIG. 2 is the packing density chart of FIG. 1 with lines designating how to read a composition corresponding to a density within the chart.

1(d). Since the percent volume of the mixture must sum to 100%, it logically follows that if the mixture is 10% cement and 30% fine aggregate, the percent volume of coarse aggregate must be 60%. This value, however, can also be determined from the packing density chart by drawing a line 24 parallel with side (A); the line starting at point "Z" and intersecting side (C). The value at the intersection of line 24 and side (C) corresponds to the percent volume of coarse aggregate. As shown in FIG. 2, the value turns out to be approximately 60%. Using this method, the composition can be ascertained for any packing density on the chart or, using the reverse operation, the packing density can be ascertained for any desired composition.

The packing density values within the chart are evaluated from the Toufar, Klose, and Born model (hereinafter "Toufar model") used in connection with a correction factor. The Toufar model is a formula for calculating the packing densities of binary mixtures:

$$\phi = \cfrac{1}{\cfrac{r_1}{\phi_1} + \cfrac{r_2}{\phi_2} - r_2 \cdot \left(\cfrac{1}{\phi_2} - 1\right) \cdot \cfrac{d_2 - d_1}{d_1 + d_2} \cdot \left\{1 - \cfrac{1 + 4 \cdot \cfrac{r_1}{r_2} \cdot \cfrac{\phi_2}{\phi_1 \cdot (1 - \phi_2)}}{\left[1 + \cfrac{r_1}{r_2} \cdot \cfrac{\phi_2}{\phi_1 \cdot (1 - \phi_2)}\right]}\right\}} \quad (3)$$

Where, $r_1$=volume of smaller particles,
  $r_2$=volume of larger particles,
  $d_1$=diameter of smaller particles,
  $d_2$=diameter of larger particles,
  $\phi_1$=packing density of the smaller particles, and
  $\phi_2$=packing density of the larger particles.

Other models may also be used for calculating the packing densities of binary mixtures. Examples of applicable models are the Aïm model and the Larrard model discussed in the article V. Johansen and P. J. Andersen, "Particle Packing and Concrete Properties" at 118–122, *Materials Science of Concrete II* (The American Ceramic Society, Inc., 1991) which is incorporated herein by specific reference.

Figure 3:
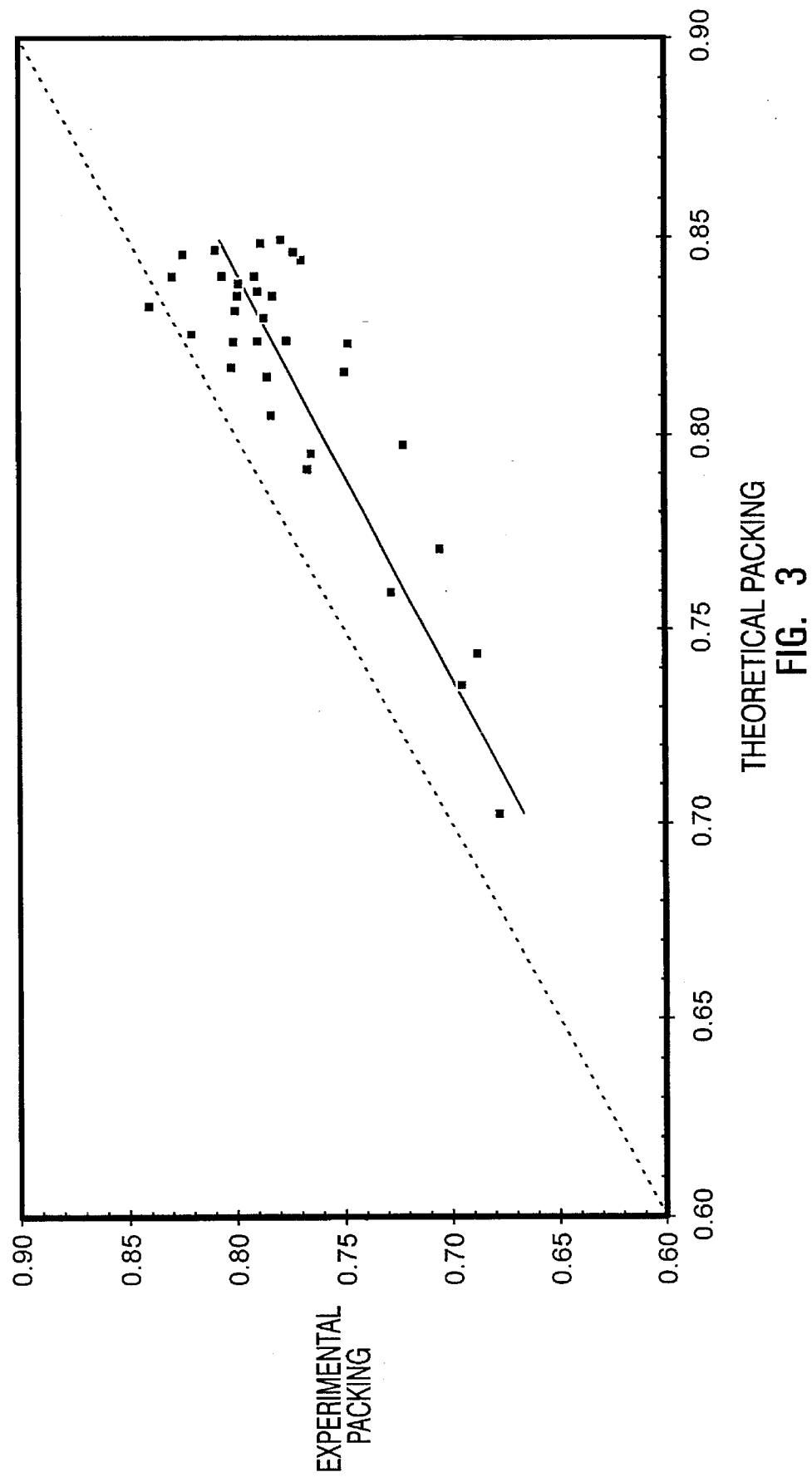
FIG. 3 is a graph of experimental packing densities versus theoretical packing densities (using the Toufar model) of a ternary mixture of cement, pea gravel (⅜"), and sand.

To increase the accuracy of the Toufar model, experimental packing densities of a ternary mixture were compared to corresponding theoretical packing densities obtained from the Toufar model. As shown in FIG. 3 for a ternary compaction of cement, pea gravel (⅜") and fine aggregate, the comparison reveals a linear correlation between theoretical and experimental packing densities. The theoretical values obtained from the Toufar model, however, are slightly higher than the actual experimental values. To compensate for this discrepancy, the values from the Toufar model are modified according to the correlation between the theoretical and experimental, conventional values. The equation for the corrected packing density in concrete application is as follows:

$$P_c = 0.9940 \, P_T - 0.00895 \quad (4)$$

The variable $P_c$ designates the corrected packing density and $P_T$ designates the theoretical or modeled packing density obtained by the Toufar model. Accordingly, by inputing values obtained from the Toufar model in for $P_T$ and solving for $P_c$, one obtains a corrected theoretical packing density value of the concrete mixture within 2% of the actual packing density.

Figure 4:
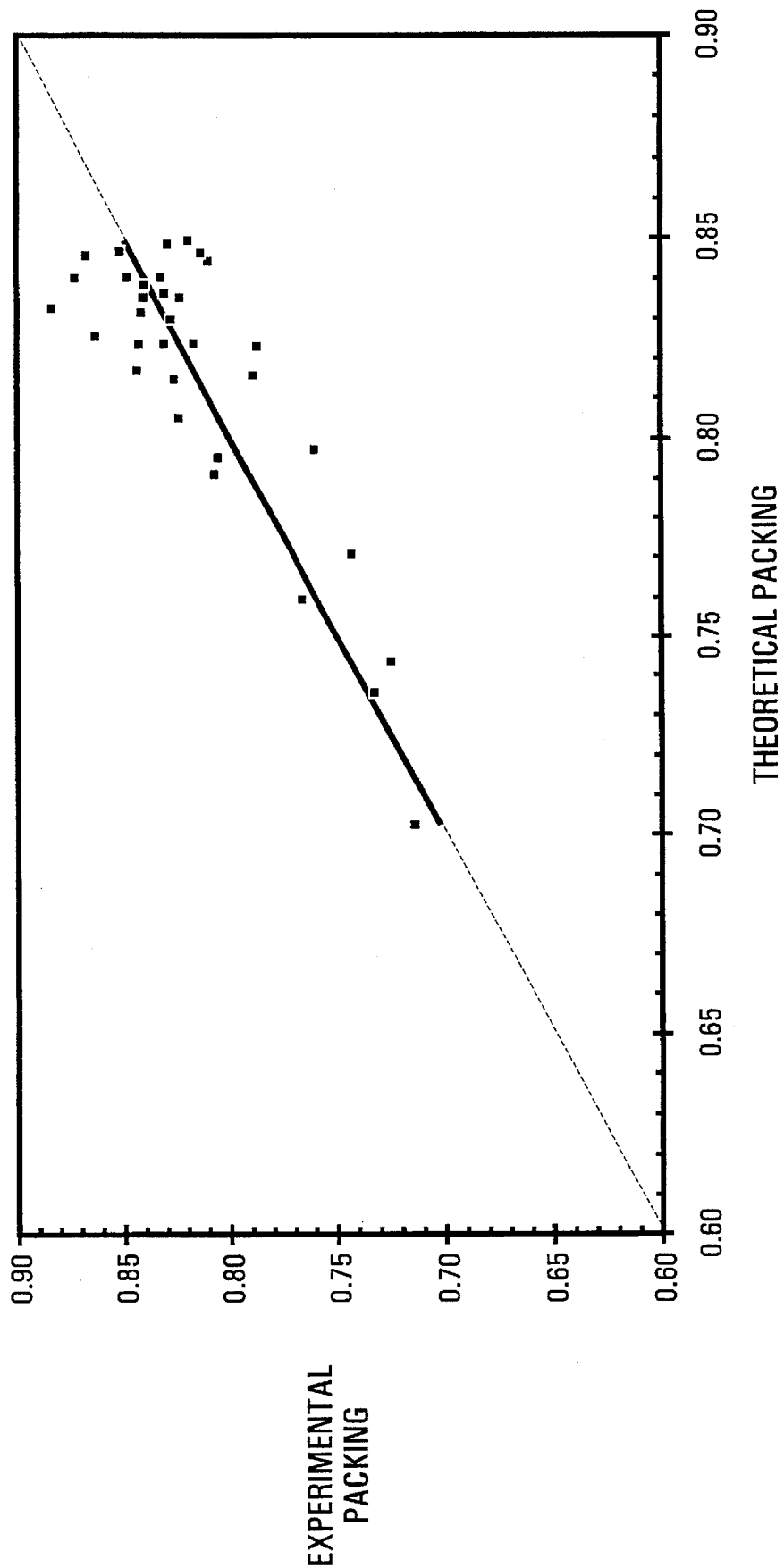
FIG. 4 is a graph comparing the experimental packing densities versus the corrected theoretical packing densities of the mixture plotted in FIG. 3.

The accuracy of the corrected Toufar model is illustrated in FIG. 4 which shows a graph comparing the experimental and corrected theoretical packing densities. With regard to the remainder of the specification, all references to uses and results from Toufar model will include applying the correction equation, whether or not expressly stated. The constants expressed in the correction equation (equation (4)) are applicable independent of the type of material being packed. However, the constants are based in part on experimental packing densities and, thus, may vary depending on the number and accuracy of the testing.

Since the Toufar model only calculates packing densities for binary mixtures, packing density values are first calculated along line (C) of the packing density chart (the line representing the percent volume of coarse aggregate). On line (C), the composition of the mixture includes only coarse aggregate and fine aggregate, no cement is added. For example, referring again to FIG. 2, the corresponding composition for the packing density on line (C) where the percent volume of coarse aggregate reads 50% is: 50% coarse aggregate, 50% fine aggregate, and 0% cement.

The packing density along line (C) is first calculated by varying the mixtures of coarse aggregate and fine aggregate at 1% increments. For example, $\phi$ is initially determined using the Toufar model (equation (3)) where $r_1$ is 0.01 representing 1% volume fine aggregate, $r_2$ is 0.99 representing 99% volume coarse aggregate, $d_1$ is the experimentally predetermined value of d' for the fine aggregate, $d_2$ is the experimentally predetermined value of d' for the coarse aggregate, $\phi_1$ is the experimentally predetermined value of $\phi$ for the fine aggregate, and $\phi_2$ is the experimentally predetermined value of $\phi$ for the coarse aggregate.

Once the packing density, $\phi$, for the mixture is determined, it is corrected using the previously discussed correction formula (equation (4)). The resulting value is then plotted at its appropriate position on line (C) of the packing density chart. In the second calculation, all numbers remain the same except $r_1$ is now 0.02 for 2% fine aggregate, and $r_2$ is 0.98 for 98% coarse aggregate. This process is continued until $\phi$ is calculated and plotted for all compositions of fine aggregate and coarse aggregate at 1% increments. Of course, the smaller the increment used in varying the percent volume of the different components, the more accurate the final results. To simplify the examples and discussion of the present invention, however, 1% increments are used.

The above process can also be used for calculating the maximum packing density for a mortar. As previously defined, a mortar is a binary mixture comprising a cement and one type of aggregate. By defining line (A) to represent the percent volume cement and line (C) to represent the percent volume of aggregate and then inputing incrementally varied amounts of cement and aggregate into the Toufar model, all possible packing density value for the binary mixture can be defined along line (C). The highest packing density value on line (C) then corresponds to the composition of the defined cement and aggregate having the maximum packing density.

To determine the maximum packing density for the ternary mixture, once the packing density values have been determined along the line (C), the Toufar model is used to calculate the values within the triangle. Since the Toufar model can only calculate packing densities for binary mixtures, pseudo-particles are defined that represent the combination of various ratios of fine aggregate to coarse aggregate along the base line. Packing densities within the triangle can then be calculated by using the pseudo-particle and cement as the binary mixture.

Each mixture of the pseudo-particles and cement is represented by a pseudo-particle line drawn inside the triangle.

Figure 5:
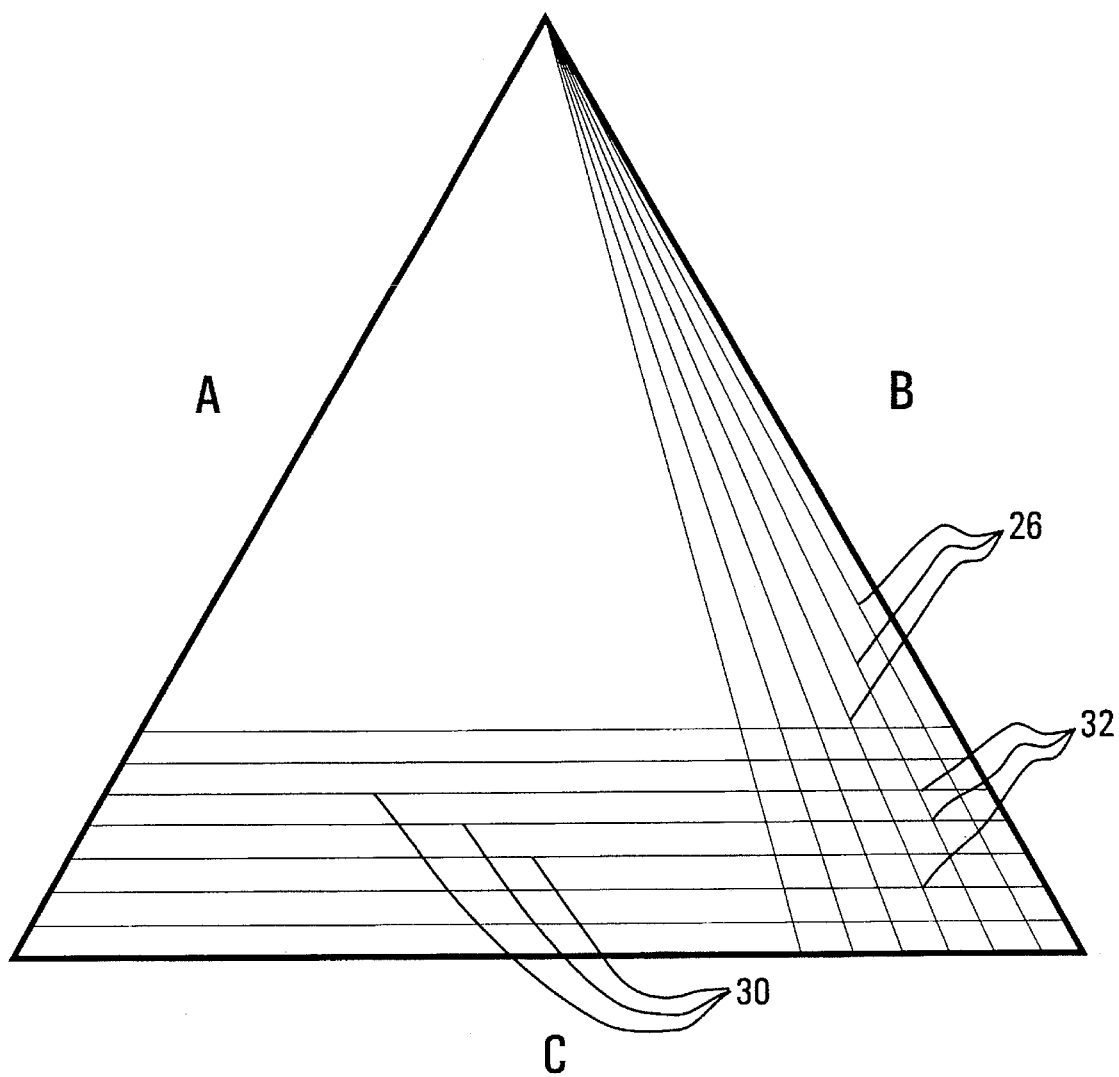
FIG. 5 is a graph of a packing density chart showing pseudo particle lines.

FIG. 5 shows a series of pseudo-particle lines 26 extending from an apex 28 of the triangle to a percent volume of coarse aggregate on line (C). Since the percent volume of coarse aggregate ranges from 0% to 100%, there are 100 individual pseudo-particle lines. Each line represents a pseudo-particle having a ratio of fine-to-coarse-aggregate defined by the intersecting coarse aggregate value. For example, the line connected to the 1% coarse aggregate value represents a pseudo-particle having a ratio of 1% coarse aggregate and 99% fine aggregate. As one moves vertically on the pseudo-particle line, towards apex 28, the percent volume of cement increases and the percent volume of the pseudo-particle decreases proportionally; however, the ratio of fine aggregate to coarse aggregates remains constant.

The packing density chart is then completed by calculating and plotting the packing density for each 1% increase in the percent volume of cement along each of the pseudo-particle lines. These positions are best located on the packing density chart by drawing a horizontal line 30 (see FIG. 5) at each percent volume cement such that each horizontal line 30 intersects with each pseudo-particle line 26. The intersecting points 32 are the positions at which the packing densities are calculated. The values necessary to determine the packing densities from the Toufar model can be ascertained using the previously discussed method for reading the packing density chart.

For example, the first pseudo-particle line is drawn from the apex of the triangle to the point representing 1% volume coarse aggregate on line (C). The packing density is then determined on the pseudo-particle line where there is a 1% volume of cement. The Toufar model is used to calculate the packing density, where $r_1$ is the percent volume of the smaller particle (cement) and equals 0.01; $r_2$ is the percent volume of the pseudo-particle 0.99; $\phi_1$ is the experimentally predetermined packing density of the cement; $\phi_2$ is the packing density of the pseudo-particle and equals the previously corrected and calculated packing density for a mixture of 1% coarse aggregate and 99% fine aggregate; $d_1$ equals the experimentally predetermined d' value for the cement; and finally, $d_2$ equals the average particle diameter of the pseudo-particle. The value for $d_2$ is determined from the following equation:

$$d_2 = r_1 d_1' + r_2 d_2' \tag{5}$$

In the above equation, $r_1$ and $r_2$ equal the volume of fine aggregate and coarse aggregate, respectively, in the mixture for which the packing density is being determined. The values of $r_1$ and $r_2$ are determined by simply reading the values from the packing density chart as previously discussed. Finally, the values for $d_1'$ and $d_2'$ represent the experimentally predetermined values for d' of the fine aggregate and the coarse aggregate, respectively. Once the packing density is determined, it is modified using the previously discussed correction factor to better represent the true packing density and is then plotted on the packing density chart.

Once all the packing density values are determined and plotted, contour lines inside the triangle can be made by connecting those points where the packing density is the same. The maximum density and corresponding percent volume mixture can then be determined by locating the highest packing density on the chart and reading the corresponding mixture as previously discussed.

In cases where the concrete mixture includes two types of fine aggregate or two types of coarse aggregate, thus a mixture of four components, the procedure is to use the Toufar model to produce a pseudo-particle having a packing density and average diameter size that represents both of the types of fine aggregate or coarse aggregate. The pseudo-particle can then be used as the fine aggregate or coarse aggregate component in the previously discussed method for determining the maximum packing density of a ternary mixture.

The packing density of the pseudo-particle corresponds to the maximum packing density of the two fine aggregates or coarse aggregates. The maximum packing density is determined by comparing all packing densities for the various percent volume ratios of the two components. This is the same process used to determine the packing densities of the fine aggregate and coarse aggregate along line (C) of the packing density chart.

The average diameter, $d_p'$, of the pseudo-particle is obtained using the formula:

$$d_p' = r_1 d_1' + r_2 d_2' \tag{6}$$

Where, $r_1$ and $r_2$ correspond to the percent volume of the two types of coarse aggregate or fine aggregate for the mixture at maximum packing density, and the values for $d_1'$ and $d_2'$ correspond to the average diameter of the two types of fine aggregate or coarse aggregate, respectively.

In the cases where the concrete mixture includes three types of fine aggregate or coarse aggregate, again a pseudo-particle having a packing density and average diameter can be used to represent the various types of fine aggregate or coarse aggregate. The packing density of the pseudo-particle corresponds to the maximum packing density of the ternary mixture of the fine aggregates or coarse aggregates and is determined in the same process used to calculate the maximum packing density for the ternary mixture of cement, fine aggregate, and coarse aggregate.

The average diameter of the pseudo-particle is determined by the formula:

$$d_p' = r_1 d_1' + r_2 d_2' + r_3 d_3' \tag{7}$$

Where, as before, the r values correspond to the percent volume of each of the types of fine aggregate or coarse aggregate in the mixture having maximum packing density and the $d_p'$ values correspond to the average diameter sizes of each of the types of fine aggregate and coarse aggregate, respectively.

For concrete mixtures having four or more types of fine aggregates or aggregates, the approach is to first define the packing density and average diameter size of a pseudo-particle that represents the two coarsest materials. The pseudo-particle is then combined with the next finer particle creating a binary packing which is again defined by a new pseudo-particle having a new packing density and average diameter size. The new pseudo-particle is then combined with next finer particle and the process continues until one pseudo-particle is defined to represent all of the different types of coarse aggregate or fine aggregate.

Of course, two or more types of cement may also be added to a mixture. The particle size of the cement is so small, however, that the combination of different types of cement generally does not significantly affect the packing density of the mixture. Nevertheless, in some situations, such as powder packing or finely divided mortars, the combination of types of cements may be relevant. In these situations, the types of cement can be represented as a pseudo-particle in the same manner as for fine aggregate and coarse aggregate.

The above described process teaches a method for determining the packing density for all possible combinations of a given feedstock. One is thus able, through a comparison process, to determine what components result in a maximum packing density. By varying the types of feedstock entered into the process over a large range of materials, a database can be obtained which permits one to select the types of components that will give the highest maximum packing density.

Step 2: Property Optimization

The second step in the optimization process is to determine the optimal concrete mixture that has desired strength and slump properties for a specific fine-to-coarse-aggregate ratio. Almost any fine-to-coarse-aggregate ratio can obtain a desired strength and slump by adding sufficient cement and water. The present invention, however, provides a method for determining the minimum amount of cement and water to be added to a specified fine-to-coarse-aggregate ratio to produce a concrete mixture with desired properties.

Since the ultimate price of concrete depends on the market price of its components, the present invention can be used to calculate the least expensive mixture by calculating and comparing the unit cost for each mixture at varying fine-to-coarse-aggregate ratios. The current step describes how the optimal design mixture is determined for a specific fine-to-coarse-aggregate ratio. The following step, Step 3, describes how the cost for each optimal mixture at varying fine-to-coarse-aggregate ratios are compared.

The composition of the concrete mixture having desired strength and slump properties is determined by first ascertaining the amount of water needed to produce the desired slump in a preselected mixture. Once the amount of water is known, the resulting strength of the concrete can be obtained. If the resulting strength is lower or higher than the desired strength, an estimate of the amount of cement needed to obtain the desired strength is obtained, thereby producing a new mixture. The amount of water needed to produce the desired slump in the new mixture is then determined and the process is repeated until the desired strength corresponds to the theoretical strength. By this process, only the minimal amount of cement needed to obtain the desired strength is used, thereby minimizing the cost of the concrete.

In specific, the process is performed by the following steps:

2(a). An initial mixture that is sufficiently close to the maximum packing density to optimize concrete properties without segregating or bleeding is selected by first, as discussed in Step 1, locating the maximum packing density on the packing density chart and the corresponding volume composition. The volume of the corresponding cement, fine aggregate, and coarse aggregate at the point of maximum packing are respectively defined by the variables $V_{C(MP)}$, $V_{F(MP)}$, and $V_{CA(MP)}$ which add up to 1.0. Next, the volume of cement, is held constant while the volume of fine aggregate is increased by a quantity defined as the cohesion safety factor, and the volume of coarse aggregate is decreased by the same quantity. The mixture is thus moved horizontally left on the packing density chart. The corresponding mixture is defined as the initial mixture.

Accordingly, the volume of the components in the initial mixture are defined by the equations:

$$V_C = V_{C(MP)} \quad (8)$$

$$V_F = V_{F(MP)} + CF \quad (9)$$

$$V_{CA} = V_{CA(MP)} - CF \quad (10)$$

The variable CF represents the cohesion safety factor and is typically about 0.05. The cohesion safety factor insures that the mixture has sufficient fine aggregate to make a cohesive mixture that will not segregate or bleed. Mixtures to the right of the initial mixture on the packing density chart will typically segregate or bleed. The cohesion safety factor can vary in a range between about 0 to about 0.15 depending on the type of concrete. A low strength concrete requires a high cohesion factor up to about 0.15, while a high strength concrete requires a low cohesion factor of less than about 0.5.

The fine-to-coarse-aggregate ratio of the initial mixture is defined by a pseudo-particle line extending from the apex of the packing density chart, through the position of the initial mixture, and to the coarse aggregate line. The remainder of this step will discuss how to ascertain the optimal concrete mixture along this defined pseudo-particle line.

2 (b). The packing density of the composition of the initial concrete mixture is determined as described in Step 1.

2 (c). The amount of mixing water required to provide the initial concrete mixture with a predetermined desired slump is ascertained. Determining this amount of water is a two-step process. First, the amount of water needed to provide the mixture with a 1 cm slump is determined using the following formula:

$$W_1 = \frac{1}{\phi} - 1 \quad (11)$$

Where, $\phi$=the packing density of the mixture, as defined in Step 2(b), and $W_1$=the volume of water required to give the mixture a 1 cm slump. The value for $W_1$ is a fraction of the volume of the solids in the mixture.

Studies have found that equation (11) is typically most accurate for determining the amount of water required to give a mixture a 1 cm slump. Although the actual slump has been found to vary up to about 2.5 cm, the designation of a 1 cm slump is not critical since Step 9 of the present invention corrects for discrepancies between the amount of water added and the actual slump.

Once $W_1$ is calculated for a 1 cm slump, the amount of water needed for the desired slump is calculated using Popovic's formula as follows:

$$W_2 = \frac{W_1}{\left(\frac{S_1}{S_2}\right)^{0.1}} \quad (12)$$

Where, $W_1$=the volume of water needed for a 1.0 cm slump as previously defined, $W_2$=the volume of water needed to give the mixture a desired slump, $S_1$=1.0, representing 1.0 cm slump, and $S_2$=the desired slump in centimeters.

2(d). Using the results from Steps 2(a)–2(c), the 28 day compressive strength of the resulting mixture is calculated using Feret's equation:

$$\sigma = K \cdot \left( \frac{V_C}{V_C + V_{W2} + V_A} \right)^2 \quad (13)$$

Where, $\sigma$=theoretical 28-day compressive strength of the concrete mixture in MPa, $V_C$=volume of cement in the mixture, $W_2$=volume of water, defined in Step 2(c), needed to give the mixture the desired slump, K=Feret's constant.

Feret's constant, according to this invention, is not a true constant but depends on the type of mixing apparatus being used. The constant has been found to typically be in the range from about 250–600. For a pan mixer, the constant typically has been found to have a value of 280; for a counter rotational mixer, typically about 340; and for a high shear mixer, about 340–450. High shear energy mixers and their methods of use are described in U.S. Pat. No. 4,225,247 entitled "Mixing and Agitating Device" and U.S. Pat. No. 4,552,463 entitled "Method and Apparatus for producing A Colloidal Mixture." The value of K for a given mixer can be obtained by solving for K in the above equation using empirical values for $\sigma$ where the relevant mixer was used. The K value can also vary for different types of aggregates, and $V_A$=the volume of air in the mixture and is defined by the following equation:

$$V_A = \left( \frac{1+W_2}{1-\frac{\% \text{ AIR}}{100}} \right) - 1 - W_2 \tag{14}$$

Where, % AIR=estimated percent volume of air in the mixture. The volume of air in a mixture varies based on the type of mixer used, the volume of fine aggregate in a mixture, and the types of admixtures combined with the mixture. The percent volume of air can be estimated by those skilled in the art and is generally between about 1% to 2% for a slump greater than 10 cm and between about 2% to 4% for slump less than 10 cm.

Figure 6:
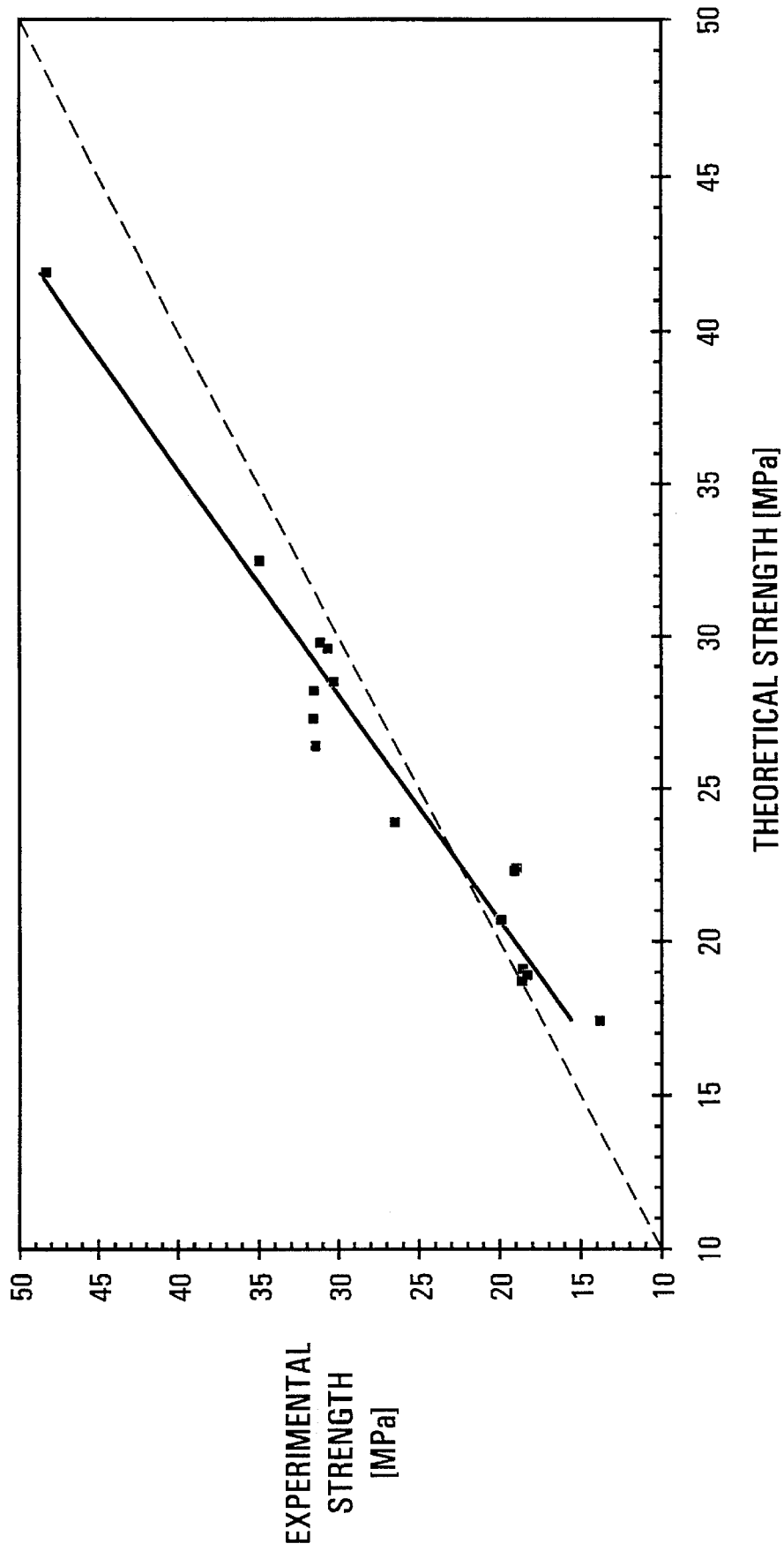
FIG. 6 is a graph of experimental strengths for mixtures versus the corresponding theoretical strengths for the mixture using the Feret equation.

FIG. 6 shows a comparison of the 28 day compressive strength of a concrete mixture estimated with Feret's equation and the actual 28 day compressive strength of the concrete. As seen from FIG. 6, the best fit line does not follow the line of direct proportionality. Using the correlation between the theoretically calculated strength and the experimental or actual strength a more precise estimation of the strength can be obtained using the following correction equation:

$$\sigma_C = 1.351 \sigma_T - 7.930 \tag{15}$$

Figure 7:
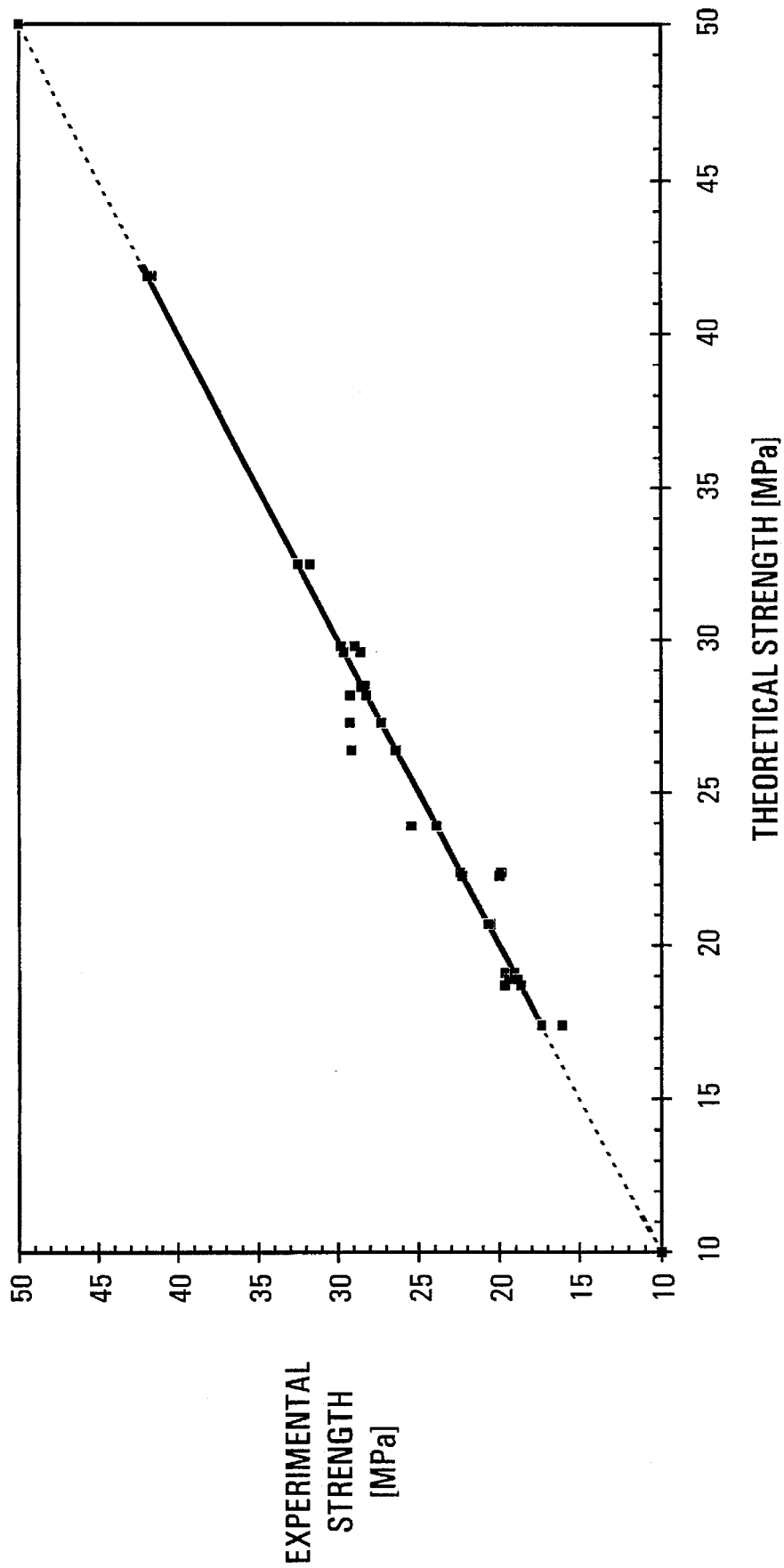
FIG. 7 is a graph comparing the experimental strengths versus the theoretical strengths of the mixtures in FIG. 6.

By inputing the theoretical strength values obtained from the Feret equation for $\sigma_T$, the corrected strength value, $\sigma_C$, can be obtained. The accuracy of the corrected strength equation is shown in FIG. 7 which depicts a plot of the experimental strength versus the theoretical strength using the corrected equation. With regard to the remainder of the specification and claims, all references to uses and results from the Feret equation will include applying the correction equation, whether or not expressly stated.

The constants expressed in correction equation (15) are based in part on experimental strength results and, thus, may vary depending on the number and accuracy of the tests. Furthermore, equation (13) for 28-day strength is based on the assumption that the coarse aggregate and fine aggregate have a higher strength than the cured cement paste, which is generally true using sound aggregate. An exception to this would be the use of limestone which is a very weak aggregate.

Feret's equation also assumes the use of standard or normal mixing, placing, finishing, and curing of the concrete as defined by the American Concrete Institute in *Guide for Measuring, Mixing Transporting, and Placing Concrete*, *ACI* 304–85, ACI Committee 304 Report, (American Concrete Institute, 1985); and *Standard Practice for Curing Concrete. ACI* 308–81, ACI Committee 308 Report, (American Concrete Institute revised 1986), which are incorporated herein by specific reference.

2(*e*). The resulting compressive strength, $\sigma$, is compared with the desired strength. If the theoretical strength of the mixture is less than the desired strength, Steps 2(*b*)–2(*e*) are repeated by replacing the initial mixture with a new mixture and corresponding new packing density. The composition of the new mixture is obtained by increasing or decreasing the volume of cement in order to obtain the desired strength. An estimate of the volume of cement needed to obtain the desired strength is determined by inputing the desired strength into Feret's equation and solving for the corresponding volume of cement according to the following equation:

$$V_{C(N)} = \left( \frac{1+W_2}{1-\frac{\% \text{ AIR}}{100}} - 1 \right) \cdot \frac{\left(\frac{\sigma_D}{K}\right)^{0.5}}{\left(1-\frac{\sigma_D}{K}\right)^{0.5}} \tag{16}$$

Where, $V_{C(N)}$=volume of cement in the new mixture,
$W_2$=volume of water needed to obtain the desired slump in the initial or previous mixture,
% AIR=estimated percent volume of air in the mixture,
K=Feret's constant, dependent on the mixer type, and
$\sigma_D$=the desired strength in MPa.

As the volume of cement changes for the new mixture, the volume of fine aggregate and coarse aggregate must be normalized so that the volume of fine aggregate, coarse aggregate, and cement sum up to 1.0. However, the ratio of fine-to-coarse-aggregate remains constant. Accordingly, the volume of fine aggregate and coarse aggregate in the new mixture are defined by the equations:

$$V_{F(N)} = r_F \cdot (1 - V_{C(N)}) \tag{17}$$

$$V_{CA(N)} = r_{CA} \cdot (1 - V_{C(N)}) \tag{18}$$

Where, $r_F$ and $r_{CA}$ are the ratios of fine aggregate and coarse aggregate, respectively, and are constants for each pseudo-particle line. The ratios are defined by the equations:

$$r_F = V_F / (V_F + V_{CA}) \tag{19}$$

$$r_{CA} = V_{CA} / (V_F + V_{CA}) \tag{20}$$

This new mixture corresponds to the position on the packing density chart defined by the intersection of the pseudo-particle line described in step 2(*a*) and a horizontal line extending from new volume of cement determined by equation (*16*). As the volume of cement changes, one moves up or down on the pseudo-particle line. Steps 2(*b*)–2(*d*) are continually repeated until the theoretical strength of the mixture equals the desired strength. The resulting mixture for the defined fine-to-coarse-aggregate ratio has the desired slump and strength using a minimal amount of cement and water. Typically, the desired mixture is found within ten iterations.

For some low strength concretes, the necessary volume of cement may be very low. However, for a concrete mixture to have a sufficient cohesive matrix to prevent segregation, the mixture should generally comprise at least about 10% cement by volume. Accordingly, the volume cement can only be decreased until the obtained strength equals the desired strength or the volume cement is equal to 10%. As will be discussed below, however, the volume of cement can be less than 10% when fillers are used.

The above process can also be used for a mortar by simply replacing the values used for the fine-to-coarse aggregate with the corresponding values for the defined aggregate in the mortar. The resulting composition of the cement aggregate and water produces a mortar with a desired slump and strength using a minimal amount of cement. It is also assumed that the resulting mortar mixture will be cost optimized. Although mixtures having an increase in the percent volume of cement and a decrease in percent volume coarse aggregate can be formed having the desired slump and at least the desired strength, such mixtures are seldom, if ever, less expensive due to the relatively high cost of cement.

Step 3: Cost Optimization

As previously discussed, this step describes the method for determining and comparing the unit cost of the optimal concrete mixture for each fine-to-coarse-aggregate ratio so as to determine the most overall cost efficient mixture. In general, this is accomplished by first calculating the unit cost of the initial optimal mixture determined in Step 2. An optimal composition and resulting unit price is then determined for a second optimal mixture defined by a new fine-to-coarse-aggregate ratio.

The new fine-to-coarse-aggregate ratio is obtained by decreasing the percent volume of coarse aggregate by 1% and increasing the percent volume of fine aggregate respectively. The unit price of the second optimal mixture is then compared with the unit price initial mixture. If the price of the initial mixture is less than the price of the second mixture, the composition of the initial mixture is the most economical and the process is over. If the second mixture is less than the price of the initial mixture, the fine-to-coarse-aggregate ratio is again varied so as to obtain a third optimal mixture. The cost comparison is then repeated until the least expensive mixture is obtained.

More specifically, cost optimization has the following steps:

3(a). Determine the unit cost for the resulting optimal mixture of Step 2 based on the unit cost of the cement, fine aggregate, and coarse aggregate used in the mixture.

3(b). Using the same packing density chart as for Step 2, define a new fine-to-coarse-aggregate ratio by decreasing the volume of coarse aggregate by 0.01 and increasing the volume of fine aggregate by 0.01. This new fine-to-coarse-aggregate ratio can be defined by a pseudo-particle line connecting the apex of the triangle and the value for the percent volume coarse aggregate 1% less or left of the initial mixture.

3(c). Repeat Step 2 along the new pseudo-particle line until the optimal mixture for the new fine-to-coarse-aggregate ratio is determined. This is referred to as the second optimal mixture. The initial mixture used on the new pseudo-particle line has a volume of cement equal to the optimal mixture on the previous pseudo-particle line.

3(d). Ascertain the unit price for the second optimal mixture determined in Step 3(c). If the unit price of the second optimal mixture is more than the unit price of the initial optimal mixture, the initial optimal mixture is the most economical mixture, and the process is over. If the price of the second optimal mixture is less than the price of the initial optimal mixture, the fine-to-coarse-aggregate ratio is again varied as discussed in Step 3(b), and a third optimal mixture is obtained according to Steps 2(b)–2(e). The cost of the third optimal mixture is then compared to the previous or in this case the second optimal mixture to determine which is the least expensive. The process is continued until the most economical composition is determined or the maximum percent volume of fine aggregate is reached.

In the preferred embodiment, the percent volume of sand in a mixture should not be greater than about 80% for concrete even if such a compositions would be less expensive. This is because as one moves farther left on the packing density chart by increasing the volume of fine aggregate or sand, the porosity in the resulting concrete increases, thus, decreasing the durability of the mixture.

At 80% sand, the durability of the concrete is so low as to make the concrete impracticable for almost all situations except extremely low strength applications and mortars where no aggregates are included. Accordingly, the overall optimal mixture for concrete is defined by the mixture having the desired properties and the lowest unit price or the mixture having the desired properties and a 80% volume of sand. As previously discussed, however, the present system can be varied for designing mortars which contain only cement and one aggregate. In such situations, the volume of sand may be greater than 80%. Furthermore, the available amount of fine aggregate in a mixture can be set by the user of the system based on the required durability of the concrete and the size of the aggregate.

The combination of Steps 1–3 reveals methods for designing a mixture of cement, water, and aggregate having a desired strength and slump. The amount of water added to the mixture can be minimized to maximize strength. The proportions of fine aggregate, coarse aggregate, and cement can be optimized to minimize the cost of the mixture. Furthermore, using the above process, mixtures having desired properties can be consistently and accurately produced independent of the variations in the feedstock.

Steps 1–3 can also be used to determine the mixture of highest durability. As will be discussed later in Step 11, the mixture with highest durability is defined as the mixture with the lowest possible total porosity. This is because, in general, as the porosity increases the durability of the mixture decreases. Studies have determined that the porosity of a mixture decreases as the packing density increases. Thus, mixtures closest to the maximum packing density have the highest durability.

Step 4: Fly Ash

Admixtures are those ingredients in concrete other than cement, fine aggregate, coarse aggregate, and water that are added to the mixture either before or during mixing to alter the properties or cost of the concrete. The present invention provides models for representing the affects of adding the following admixtures to a concrete mixture: pozzolans (such as fly ash and silica fume), water reducers, air-entraining agents, and fillers. By incorporating these models into the previously disclosed optimization process, optimal concrete mixtures can be determined where such admixtures are included.

A pozzolan is a siliceous or aluminosiliceous material that in itself possesses little or no cementitious value but will, in finely divided form and in the presence of water, chemically react with the calcium, sodium, and potassium hydroxide released by the hydration of cement to form compound cementitious properties. The two pozzolans that are most commonly used in the industry and that are incorporated into the present invention include fly ash and silica fume.

Fly ash is a mineral admixture that results from the combustion of pulverized coal in electric power generating plants. Primarily, fly ash comprises silicate glass containing silica, alumina, iron, and calcium. Minor constituents include magnesium, sulfur, sodium, potassium, and carbon. Unlike ground particles, such as cement, that have angular particles, fly ash is made of spherical particles. The particles vary in size from 1 μm to more than 100 μm with a typical particle size under 20 μm.

A mixture in which a portion of the cement is substituted by an equal volume of fly ash generally requires less water to obtain a given slump than concrete containing only cement. This is a result of the lower hydraulic activity of fly ash and the spherical shape of the fly ash which together create a lower frictional force between the particles of the mixture. Accordingly, fly ash can be a substitute for cement to increase slump and workability of the mixture without increasing the amount of water added. In the alternative, fly ash can be substituted for cement to decrease the amount of water added to the mixture while maintaining the same slump, thereby decreasing the water-cement ratio. In addition to increasing the workability of a mixture, fly ash has some hydraulic cementitious properties that contribute to the strength of the resulting concrete.

When fly ash is incorporated into a concrete mixture, the same process as outlined in Steps 1–3 can be used to obtain the most economical mixture. Slightly modified formulas however, are used to determine the amount of water required for a desired slump and the resulting strength.

In general, the process includes first repeating Steps 1 and 2 so as to determine the optimal mixture (without an admixture) having desired strength and slump properties for a defined fine-to-coarse-aggregate ratio. Based on the composition of the resulting optimal mixture, a percent volume of cement is incrementally replaced with fly ash. As the percent volume of fly ash is increased, the unit price of each mixture is calculated and compared to the previous mixture to determine the least expensive mixture for the defined fine-to-coarse-aggregate ratio.

The fine-to-coarse-aggregate ratio is then varied by moving 1% to the left on the packing density chart. The above process is then repeated to determine the least expensive mixture using fly ash with the new fine-to-coarse-aggregate ratio. The unit price for the optimal mixtures at the different fine-to-coarse-aggregate ratios are then compared to determine the least expensive mixture. The process continues to move to the left on the packing density chart until the overall optimal mixture having fly ash and the desired properties is obtained.

The specific process for cost optimization when the mixture includes fly ash comprises the following steps:

4(a). Determine the optimal mixture (with no admixtures) having the desired slump and strength at the initial fine-to-coarse-aggregate ratio—this is the same process as defined in Steps 1 and 2.

4(b). Determine the optimal mixture with the addition of fly ash at the initial fine-to-coarse-aggregate ratio. Based on the resulting composition of Step 2, replace 1% of the volume of cement with an equal volume of fly ash and calculate the resulting strength. With regard to the packing density chart, the volume of fly ash is included with the volume of cement. Experiments have found that fly ash has substantially the same average particle diameter, d; and natural packing density, $\phi$, as cement. Accordingly, the percent volume of cementitious material remains constant as the fly ash replaces the cement. However, where the average particle diameter and natural packing density of the fly ash significantly varies from the cement, the cement can be represented by a pseudo particle, as discussed in Step 1, that corresponds to the combination of the cement and fly ash. This same principal holds true for the addition of silica fume, fillers, and other pozzolans that will be discussed later. As to what constitutes a significant variance depends on the desired accuracy of the results.

Studies have found, however, that where the volume of cement and fly ash comprises 37% fly ash, there is approximately a 6% reduction in the volume of water needed to obtain a desired slump. The actual water reduction can vary slightly for different types of fly ash and can be empirically determined. The volume of water needed to produce a concrete mixture including fly ash with a desired slump is therefore determined by the following modified Popovic's equation:

$$W_2 = \frac{W_1}{\left(\frac{S_1}{S_2}\right)^{0.1}} - W_{FA} \quad (21)$$

Where, $W_{FA}$ is a reduction, as a result of the fly ash, in the volume of water needed to produce a mixture with a desired slump and is determined by the equation:

$$W_{FA} = \frac{W_1 \cdot \% FA \cdot 6}{100 \cdot 37} \quad (22)$$

Where, $W_1$=the volume of mixing water required for a 1.0 cm slump in a standard mixture as previously defined, and % FA= the percent volume of fly ash in the combination of fly ash and cement.

The value for $W_2$ can then be used to calculate the 28 day strength. Although fly ash has some hydraulic properties, per equal volume of cement, fly ash contributes a lower strength to the mixture. Accordingly, the modified Feret formula for determining the resulting 28-day strength of concrete using fly ash is:

$$\sigma = K \left( \frac{V_C + K_2 V_{FA}}{V_C + K_2 V_{FA} + W_2 + V_A} \right)^2 \quad (23)$$

Where, $K_2$= a constant known as the strength reactivity that describes the strength development per volume of fly ash comparable to the same volume of cement. Typically, this value is between 0.3 and 0.6 and can be determined for the actual fly ash used, K, $W_2$, and $V_A$= the same values as previously defined in Step 2(d), and $V_{FA}$= the volume of fly ash in the mixture and is calculated according to the following equation:

$$V_{FA} = \%_{FA} \cdot (V_{C+FA}/100) \quad (24)$$

Where, $V_{C+FA}$=the total volume of cement and fly ash and can be read off the packing density chart as the volume of cement, and $V_C$= the volume of cement in the mixture and is calculated according to the following equation:

$$V_C = V_{C+FA} - V_{FA} \quad (25)$$

4(c). Compare the resulting strength of the mixture with fly ash to the desired strength. If the resulting strength is different than the desired strength, a new mixture is obtained by estimating of the volume of cement and fly ash needed to produce a mixture with a desired strength, the new mixture having the same cement to fly ash ratio. The new volume of cement is calculated according to the following equation:

$$V_C = \frac{\left(\frac{\sigma_D}{K}\right)^{0.5} \cdot \frac{W_2 + V_A}{1 - \left(\frac{\sigma_D}{K}\right)^{0.5}}}{1 + \left(\frac{K_2 \cdot \% FA}{100 - \% FA}\right)} \quad (26)$$

Where, $\sigma_D$= desired strength in MPa, and K, $K_2$, $V_A$, $W_2$ and % FA are as previously defined in Step 4(b).

The volume of fly ash in the new mixture is calculated from the equation:

$$V_{FA} = \left(\frac{\% FA}{100 - \% FA}\right) \cdot V_C \quad (27)$$

All variables are as previously defined.

The corresponding normalized volumes of fine aggregate and coarse aggregate can be calculated according to the equations 17 and 18 in Step 2(e). Steps 4(b) and 4(c) are then repeated until a mixture is obtained wherein the calculated strength equals the desired strength.

4(d). Calculate and compare the unit cost of the mixture in Step 4(c) having 1% fly ash to the mixture in Step 4(a) with no fly ash. If the cost of the mixture in Step 4(c) is less, repeat Steps 4(b)–4(d) by replacing an additional 1% of the volume of cement in the mixture from Step 4(a) with fly ash. Steps 4(b)–4(d) are continued to be repeated for increased values of fly ash until the least expensive mixture including fly ash is obtained or the percent volume of fly ash is greater than 30%. For mixtures with fly ash greater than 30%, there is insufficient gelling of the cement to prevent segregation and bleeding of the concrete. Furthermore, as the hydration of fly ash has to be initiated by hydroxyl ions from the cement, higher dosages of fly ash cannot be recommended for proper strength development.

4(e). As with Step 3, the process is now continued by changing the fine-to-coarse-aggregate ratio by decreasing the percent volume of coarse aggregate by 1%, thereby moving 1% to the left on the packing density chart. Using mixtures based on the new fine-to-coarse-aggregate ratio, repeat Steps 4(a)–4(d) so as to determine the least expensive mixture including fly ash and having the desired strength and slump properties.

4(f). Calculate and compare the unit cost of the mixture in Step 4(e) with the mixture in Step 4(d). If the mixture in Step 4(e) is less, Step 4(e) is again repeated by moving another 1% to the left on the packing density chart so as to vary the fine-to-coarse-aggregate ratio. The process continues by varying the fine-to-coarse-aggregate ratio so as to move left on the packing density chart until the overall least expensive mixture is obtained using fly ash or the percent fine aggregate reaches 80% as previously discussed.

Other pozzolans will behave similar to fly ash when combined with a concrete mixture. By way of example and not by limitation, such pozzolans include blast-furnace slag, pyrex, diatomaceous earth, opaline cherts, clays, shales, volcanic tuffs and pumicites. Such pozzolans can be incorporated into the above optimization process by using the above equations with the appropriate water reduction and strength reactivity values. Typically, not more than two pozzolans are added to a concrete mixture as there is seldom an economic benefit or an improvement in the material properties.

Step 5: Silica Fume

Silica fume, also referred to as microsilica, is also a pozzolanic admixture but is distinguished from other pozzolans by its extremely large specific surface area and the way it affects concrete mixtures. Silica fume is a result of the reduction of high-purity quartz with coal in an electrical arc furnace in the manufacturing of silicon or ferrosilicon alloy. Essentially, silica fume is silicon dioxide in amorphous form. Since it is formed as an air born particle, silica fume has a spherical shape like fly ash. Silica fume particles, however, are extremely fine having diameters less than 1 µm and an average diameter of 0.1 µm.

The optimal mixture using silica fume can be ascertained in the same manner used in determining the proper amount of fly ash in Step 4; however, the formulas for the required amount of water and resulting strength are different. In contrast to fly ash, silica fume requires more water for a given slump, but silica imparts a greater strength to the cement mixture. With regard to the packing density chart, the volume of silica fume is also considered as part of the volume of cement in the mixture. If desired, a pseudo particle can be used to represent the combination of the cement and silica fume.

Studies have found that a substitution of 20% by volume of the cement with a corresponding volume of silica fume results in approximately a 20% increase in the required amount of water for a desired slump. (The actual increase in water may vary for a given silica fume, but it can readily be empirically determined.) Pursuant to this analysis, the percent volume of water needed to produce a mixture including silica fume with a desired slump is determined by the following equation:

$$W_2 = \frac{W_1}{\left(\frac{S_1}{S_2}\right)^{0.1}} + W_{SF} \quad (28)$$

Where, $W_{SF}$ is an increase, as a result of the silica fume, in the volume of water needed to produce a mixture with a desired slump and is determined by the equation:

$$W_{SF} = \frac{W_1 \cdot \% SF \cdot 20}{100 \cdot 20} \quad (29)$$

Where, % SF= the percent volume of silica fume in the combination of silica fume and cement.

The value for $W_2$ can then be used to calculate the 28-day strength of the concrete. As a result of the cementitious properties of silica fume, the modified Feret formula for determining the resulting 28-day strength of concrete using silica fume is:

$$\sigma = K \left(\frac{V_C + K_3 V_{FA}}{V_C + K_3 V_{SF} + W_2 + V_A}\right)^2 \quad (30)$$

Where, $V_{SF}$=the volume of silica fume in the mixture and is calculated according to the following equation:

$$V_{SF} = \% SF \cdot (V_{C+SF}/100) \quad (31)$$

Where, $V_{C+SF}$= the total volume of cement and silica fume and can be read off the packing density chart as the volume of cement, and $V_C$= the volume of cement in the mixture and is calculated according to the following equation:

$$V_C = V_{C+SF} - V_{SF} \quad (32)$$

$K_3$= a reactivity constant describing the strength development per volume of silica fume comparable to the same volume of cement. Typically, this value is between 1.5 and 4 with 2 being the preferred value. The actual value can be empirically determined for a given silica fume, and K, $W_2$, and $V_A$ = the same values as previously defined in Step 2(d).

The above formulas for water and strength can thus be incorporated into the process as described in Step 4 to determine the optimal concrete mixture including silica fume that has a desired slump and strength with a minimal cost. As discussed in Step 4(c), should the calculated strength not equal the desired strength, an estimate for the volume of cement and silica fume needed to obtain the desired strength can be calculated. The new volume of cement is calculated according to the following equation:

$$V_C = \frac{\left(\frac{\sigma_D}{K}\right)^{0.5} \left(\frac{W_2 + V_A}{1 - \left(\frac{\sigma_D}{K}\right)^{0.5}}\right)}{1 + \frac{K_3 \cdot \% SF}{100 - \% SF}} \quad (33)$$

Where, $\sigma_D$ = desired strength in MPa, and K, $K_3$, $V_A$, $W_2$ and % SF are as previously defined.

The volume of silica fume in the new mixture is calculated from the equation so that the ratio of cement to silica fume remains constant:

$$V_{SF} = \left(\frac{\% SF}{100 - \% SF}\right) \cdot V_C \quad (34)$$

All variables are as previously defined. The corresponding normalized volumes of fine aggregate and coarse aggregate can be calculated according to the equations in Step 2(e).

Similar to fly ash, the volume of silica fume should not exceed 20% by volume of the combination of cement and silica fume. Concentrations in excess of 20% can limit the strength development of the mixture and result in drying shrinkage cracks due to the high specific surface area of the silica fume.

Step 6: Water Reducers

Water reducing admixtures are used to reduce the quantity of mixing water required to produce a concrete with a desired slump or workability. Normal water reducers typically comprise 30% by weight an active component including lignosulfonates, hydroxylated carboxylic acids, and sulfonated naphthalene formaldehyde condensates, that can reduce the required amount of water needed to obtain a desired slump by approximately 15%. High-range water reducers, also referred to as superplasticizers, typically comprise 40% by weight an active component including sulfonated melamine formaldehyde condensates, sulfonated naphthalene formaldehyde condensates, and lignosulfonates, that can reduce the required amount of water needed to obtain a desired slump by about 30%. Water reducers also contain a retarding agent that retards the rate of strength development of the concrete. Unlike fly ash, however, water reducing admixtures have no cementitious properties and, thus, generally only affect the strength of the concrete by affecting the water-cement ratio.

Water reducers generally work by being adsorbed onto the surface of the cement particles. This creates a negative charge on the surfaces of the particles, causing them to repel each other. Because of this mechanism, water reducers can be thought of as dispersants. Normal water reducers and high-range water reducers have been found to lead to the same water reduction for equivalent concentrations of active ingredients.

The main difference between normal and high-range water reducers is that the high-range water reducers sold in commercial products simply have higher concentrations of the active dispersing ingredient and less of the retarding agent. Accordingly, the type of water reducing agent used in a mixture can be accounted for in the optimization process through a normalizing process discussed below.

Furthermore, since the water reducers contain a retarding agent, no more than 1% of the solution of normal water reducers and 2% of the solution of high-range water reducers (by weight of cement) are generally added to a concrete mixture. Exceeding these concentrations of water reducers can inhibit the concrete from ever hardening. Higher concentrations of the high-range water reducers can be used since they contain less retarding agent.

Assuming that only water reducers are added to a standard concrete mixture, the process for obtaining the optimal mixture is the same as that used for Step 4 to obtain the optimal mixture using fly ash. The only difference is that the formulas for determining the required amount of mixing water and the resulting strength are modified. The process includes determining the optimal mixture for the first fine-to-coarse-aggregate ratio. Incremental amounts of water reducers are then added to the mixture. The unit cost of these mixtures are calculated and compared so as to determine the optimal mixture having water reducers at the initial fine-to-coarse-aggregate ratio. The fine-to-coarse-aggregate ratio is then varied and the process is repeated. By comparing the unit cost for the optimal mixtures at each fine-to-coarse-aggregate ratio, the overall optimal mixture using water reducers can be determined.

Since the general process for obtaining an optimal mixture using a water reducing agent is the same as that discussed in Step 4, only the modified formulas to Step 4 will be discussed below in detail. Once the optimal mixture is determined for the initial fine-to-coarse-aggregate ratio, a water reducer is added in the amount of 0.1% by weight of cement in the optimal mixture. The resulting strength is calculated using Feret's Equation. To calculate the resulting strength, however, the amount of water needed to obtain a desired slump in the mixture using the water reducer must be determined.

To define a formula that will calculate the amount of water for a mixture using a water reducer, the various types of water reducers must be normalized. A high range water reducer typically has a concentration of active ingredient of about 40% by weight. A 2% (by weight of cement) addition of such a water reducer to a cement mixture results in a 30% reduction in the amount of water required to obtain a desired slump. Studies have found that the relationship between the addition of a water reducer and the reduction in the amount of water required is substantially linear. Using the above defined high range water reducer as the standard, all water reducers can be normalized accordingly. For example, the addition of 1% of a water reducer with only a 30% concentration of active ingredient is considered the same as adding 0.75% of the standard water reducer. This is because there is 25% less active ingredient in the new water reducer.

Based on the parameters of the standard water reducer, the percent volume of water needed to produce a mixture including a water reducer with a desired slump is determined by the following equation:

$$W_2 = \frac{W_1}{\left(\frac{S_1}{S_2}\right)^{0.1}} - W_{WR} \quad (35)$$

Where, $W_{WR}$ is a reduction, as a result of the water reducer, in the volume of water needed to produce a mixture with a desired slump and is determined by the equation:

$$W_{WR} = \frac{W_1 \cdot \% \, WR \cdot 30}{100 \, (2)} \quad (36)$$

Where, $W_1$ = the volume of mixing water required for a 1.0 cm slump as previously defined, and % WR = the percent quantity of water reducer in the mixture by weight of the cement.

The value for $W_2$ can then be used to calculate the 28-day strength. As water reducers do not independently contribute to the strength of concrete, the same formulas used in Step 2 can be used for calculating 28-day strength and for estimating the volume of cement needed to obtain the desired strength. Typically, the volume of water reducer in a mixture is so small that the quantity is not considered to change the volume of the mixture. If desired, however, the volume of water reducer can be accounted for. The portion of water in the water reducer, typically between about 60%–70% of the admixture, can be subtracted from the amount of water added to the mixture. The remaining portion of the water reducer is a solid which can be substituted for a portion of the cement similar to how the fly ash and silica fume were substituted for the cement in Steps 4 and 5, respectively.

Since the amount of water required for the desired slump is decreased by using a water reducing agent, the water-cement ratio in the mixture is decreased, thereby, increasing the strength of the resulting mixture. Accordingly, the amount of cement can be reduced until a mixture is defined possessing the desired strength and slump and having the initial 0.1% water reducing agent. A cost comparison is then performed and if the mixture with the water reducer is cheaper, an additional 0.1% water reducer is added to the mixture. The above process is then again repeated according to the format in Step 4 until the optimal mixture including a water reducer is determined. As previously discussed, however, water reducers are generally only added up to approximately 2% of the weight of cement. Quantities above that amount increase the setting time of the concrete to an impractical duration.

As a general perspective, water-reducing admixtures will not be added to low strength concrete. Since only a minimal amount of cement is required for such mixtures, the addition of expensive water reducers is cost prohibitive. However, in high strength concrete, the addition of a water reducer can significantly reduce the amount of cement required, thus, making the water reducing agent economical to use.

Step 7: Fillers

Fillers are another admixture that can be included in the optimization process. A concrete mixture generally requires at least 10% cement by volume of the cement, fine aggregate, and coarse aggregate to produce a cohesive mixture that prevents segregation and bleeding of concrete. Some low strength concretes, however, can obtain the desired strength with less than 10% cement. Accordingly, inexpensive fillers having particles substantially the same size as cement particles can be used to make up the difference between the required amount of cement necessary to obtain the desired strength and the 10% cement necessary to obtain a cohesive mixture.

Fillers generally do not possess cementitious properties and, thus, do not directly contribute to the strength of the resulting concrete. Similar to fly ash, however, fillers do decrease the amount of mixing water required to obtain a desired slump as compared to cement and, accordingly, can indirectly affect the slump and strength of the resulting concrete. By way of example and not by limitation, fillers can include calcium carbonate, dolomite, granite, basalt, and ore that are crushed to have a particle size similar to fly ash—diameters less than 100 μm. The reduction in the amount of water need to obtain a desired slump is a result of the approximately spherical shape of the fillers and lack of hydraulic activity.

Fillers are typically incorporated in a concrete mixture independent of pozzolans or other admixtures. Since fillers are only used in low strength mixtures, the addition of pozzolans, which generally have half the strength, but more than twice the cost of cement, only serves to increase the cost of the mixture.

As discussed in the previous steps, the minimum percent volume of cement needed in a mixture to prevent segregation and bleeding is about 10%. With the use of fillers, however, the percent volume of cement can continue to be decreased by replacing the cement with a filler. With regard to the packing density chart, even though fillers are replacing cement, the percent volume of cement remains constant at 10% since fillers have the same packing characteristics as cement. As previously discussed, however, where the average particle diameters and the natural packing density of the fillers significantly vary from the cement, the combination of fillers and cement can be represented as a pseudo particle.

When fillers are added, however, the amount of mixing water required to obtain a desired slump is decreased by approximately the same amount as if fly ash were added. Accordingly, the volume of water needed to produce a mixture including a filler with a desired slump is determined by the following equation:

$$W_2 = \frac{W_1}{\left(\frac{S_1}{S_2}\right)^{0.1}} - W_F \quad (37)$$

Where, $W_F$ is a reduction, as a result of the filler, in the volume of water needed to produce a mixture with a desired slump and is determined by the equation:

$$W_F = \frac{W_1 \cdot \% \, FIL \cdot 6}{100 \, (37)} \quad (38)$$

Where, % FIL = the percent volume of filler in the combination of filler and cement.

The value for $W_2$ can then be used to calculate the 28 day strength. As fillers do not independently contribute to the strength of the concrete, the same formulas used in Step 2 can be used for calculating 28 day strength and for estimating the volume of cement needed to obtain the desired strength.

Step 8: Combined Design Optimization System

Figure 8A:
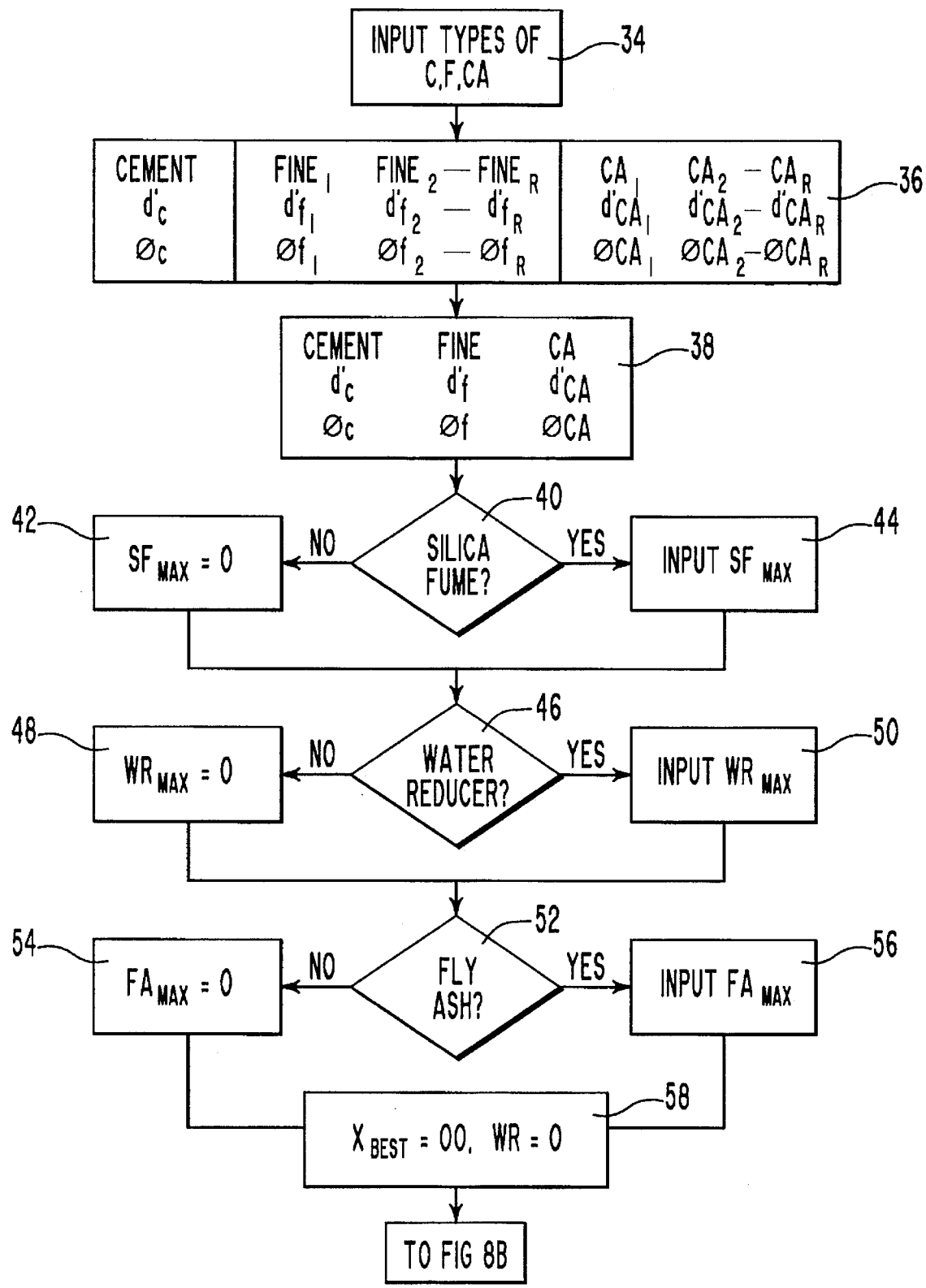
FIGS. 8 (A)–(B) comprise a logic flow diagram of the optimization system.
Figure 8B:
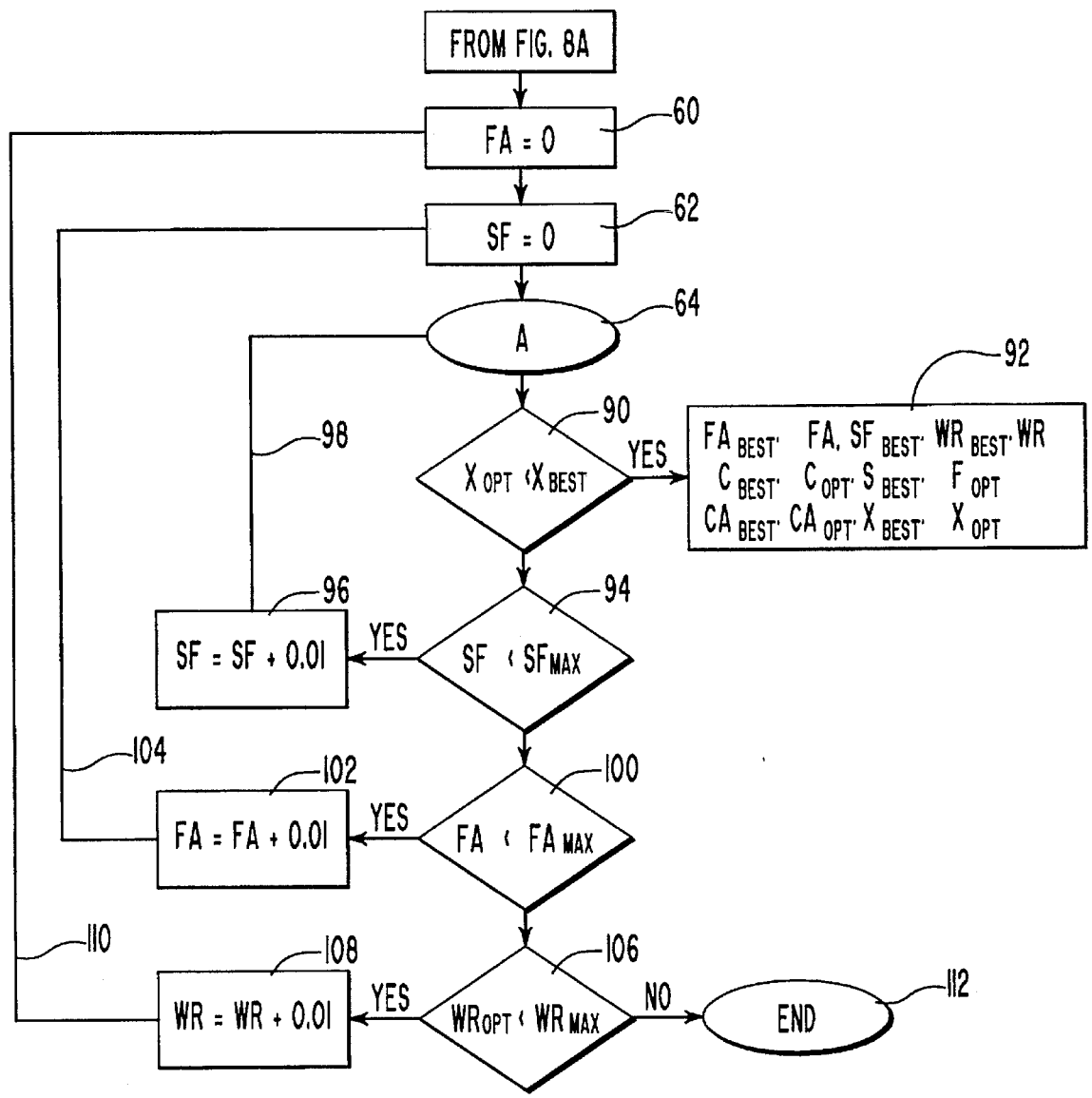

Once the process is understood of how to optimize a concrete mixture using a single admixture in conjunction with cement, fine aggregate, coarse aggregate and water, the various processes can be combined into a system using an imbedded "do loop" that allows one to determine the optimal mixture having selective combinations of admixtures, the admixtures including fly ash, silica fume, and water reducers. By way of example and not by limitation, such a system is disclosed in the logic flow diagram shown in FIGS. 8(A)–(B).

There are, of course, a variety of ways of drafting and performing the present system. The theory, however, is to calculate the cost of all possible combinations of the cement, fine aggregate, coarse aggregates, and various admixtures having the desired strength and slump properties. The cost of each of the mixtures is then compared to determine the overall least expensive mixture. The corresponding composition is thus the best overall mixture. By way of example and not by limitation, one embodiment for performing the present invention is by executing the source code disclosed in the Microfiche Appendix on a computer. In practice, not all mixtures need to be calculated. In the below described system, once it is determined that a mixture is becoming more expensive as the volume of fine aggregate is increasing in the fine-to-coarse-aggregate ratio, there is no need to continue to vary the fine-to-coarse-aggregate since all additional mixtures for the set cementitious volume will be more expensive.

Referring to FIGS. 8 (A)–(B), box 34 requests a list of all types of cement, fine aggregate, and coarse aggregate that are to be incorporated into the mixture. The types of components are classified by their average diameter size, d', and packing density, $\phi$, as shown in box 36. As discussed in Step 1, each of the types of fine aggregate and coarse aggregate are reduced to a single fine aggregate pseudo-particle and coarse aggregate pseudo-particle as shown in box 38.

The system then asks in box 40 whether silica fume is to be a possible component in the mixture. If no silica fume is to be used, the maximum amount of silica fume is set equal to zero in box 42. If silica fume can be used, the maximum amount is defined in box 44. As discussed in Step 5, the volume of silica fume should typically not exceed 20% of the volume of cementitious material. With regard to the presently described system, the term "cementitious materials" includes cement, fly ash, and silica fume. Boxes 46–50 request the same information for water reducers while boxes 52–56 request the information on the use of fly ash.

Figure 9:
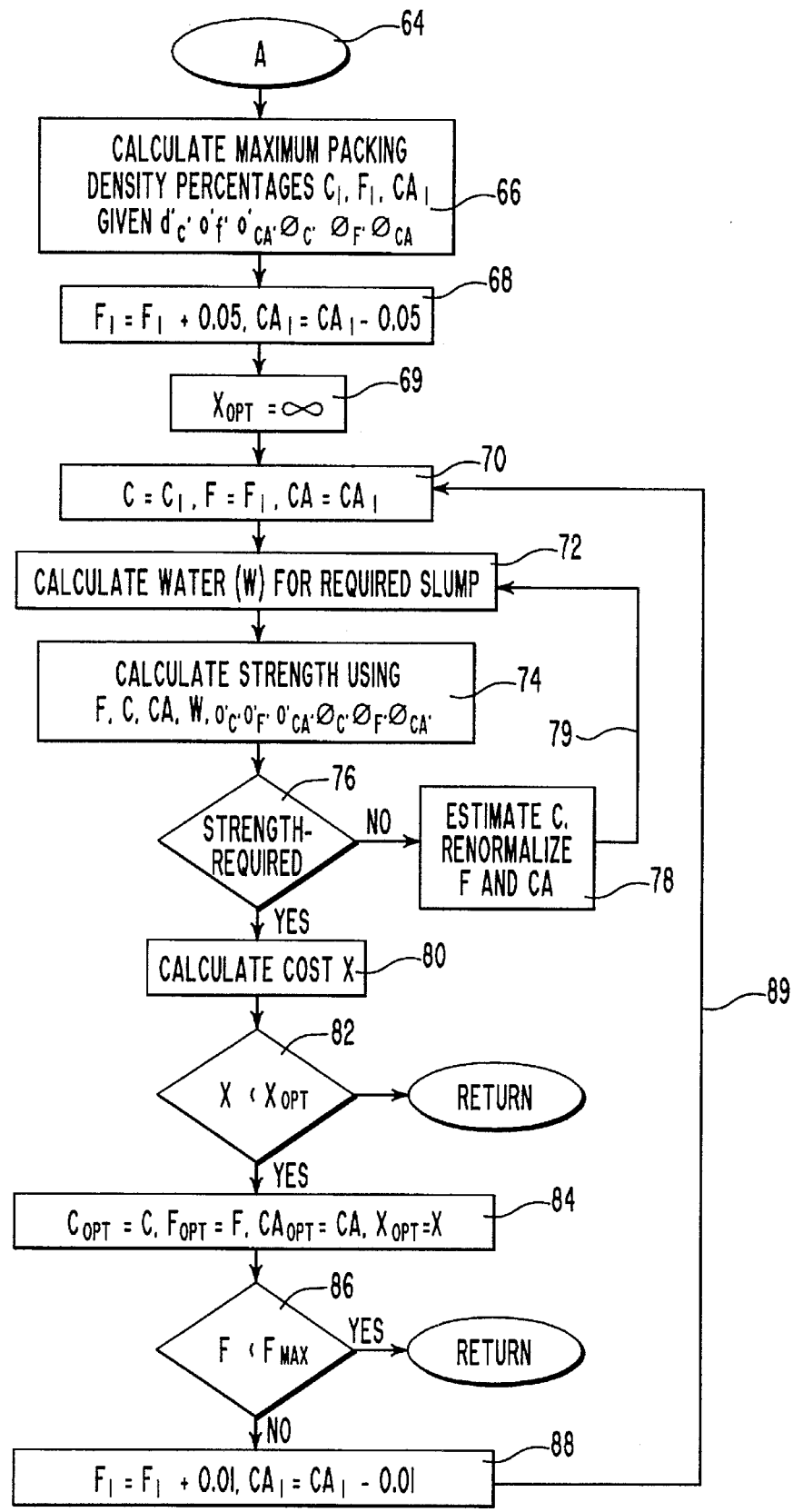
FIG. 9 is a tree of the logic flow diagram shown in FIG. 8 (B).

Once the admixtures are selected, the initial parameters are defined by setting the heretofore best mixture cost, $X_{BEST}$, equal to infinite and setting the amount of water reducer, fly ash, and silica fume equal to zero as shown respectively in boxes 58–62. The system is now ready to determine the composition and cost of the initial mixture having the desired strength and slump properties. This process is performed in tree 64 which is depicted in FIG. 9.

Box 66 begins the optimization process by calculating the maximum packing density for the given cement, fine aggregate, and coarse aggregate. The maximum packing density is determined according to the process described in Step 1. The cohesion safety factor, shown in box 68, is then applied to the composition of the mixture at the maximum packing density so as to define an initial mixture, as shown in box 70, that will not segregate or bleed. Box 69 initially sets the optimal cost mixture equal to infinity for later comparison with the actual cost.

In box 72, the volume of water needed for the mixture to obtain the desired slump is calculated. Based on the required amount of water, the resulting strength of the mixture is determined in box 74. Box 76 then compares the calculated strength with the desired strength. Assuming the calculated strength does not equal the desired strength, an estimated volume of cement necessary to obtain the desired strength is calculated in box 78. Furthermore, box 78 renormalizes the volume of fine aggregate and coarse aggregate so that the volume of cement, fine aggregate, and coarse aggregate in the new mixture sum to 1.0 while the fine-to-coarse-aggregate ratio remains constant. The above calculations are all performed according to the equations in Step 2.

Using the composition of the new mixture, the system then returns to box 72 through loop 79 where the process is repeated for the new mixture by calculating the required water and resulting strength and then comparing the calculated strength to the desired strength. Loop 79 continues until the calculated strength equals the desired strength, at which point the cost of the defined mixture is calculated in box 80. Box 82 then compares the cost of the mixture from box 80 with the cost of the optimal mixture. Since the cost of the optimal mixture is initially set to infinity, the first mixture having the desired properties is defined as the optimal mixture and the values for volume of cement, fine aggregate, and coarse aggregate, along with the cost of the mixture are so defined in box 84.

The system then compares in box 86 the volume of fine aggregate in the mixture with the maximum volume of fine aggregate allowed. As discussed in Step 2, this is typically about 80% by volume of the solids. If the volume of fine aggregate in the mixture is less than the allowable fine aggregate, the system moves to box 88 where a new fine-to-coarse-aggregate ratio is defined by increasing the volume of fine aggregate by 1% and decreasing the volume of coarse aggregate respectively; the volume of cement is held constant. The system then returns to box 70 through loop 89 where the process is repeated by determining what composition of cement, fine aggregate, and coarse aggregate, at the newly defined fine-to-coarse-aggregate ratio, will result in a mixture that has a calculated strength equal to the desired strength.

Once the mixture having the desired properties at the new fine-to-coarse-aggregate ratio is determined, its cost is calculated in box 80 and compared to the previously defined optimal mixture. If the cost of the new mixture is less, the new mixture becomes the optimal mixture and loop 89 continues by defining a new fine-to-coarse-aggregate ratio in box 88. Loop 89 continues until it is exited through either box 82 or 86. Loop 89 exits through box 86 when the volume of fine aggregate of the newly defined optimal mixture is equal to or greater than the defined maximum volume of fine aggregate. Loop 89 can also exit through box 82 if the cost of the new mixture is found to be more expensive than the cost of the defined optimal mixture. At the point when loop 89 exits, the optimal mixture corresponds to the overall best composition of cement, fine aggregate, and coarse aggregate that has the desired strength and slump with a minimal cost.

Box 90 compares the cost of the optimal mixture defined by box 84 to the best cost mixture. Since the best cost is initially set to infinity in box 58, the best cost in box 92 is initially set to the optimal mixture defined in box 84 at the time loop 89 is exited. Box 92 stores the composition and cost of the best mixture.

Next, the system enters a series of embedded "do loops" which incrementally increase the volume of silica fume, fly ash, and water reducer. The cost for each of the optimal mixtures are compared, and the best mixture is stored in box 92. Box 94 asks whether the amount of silica fume in the mixture is less than the defined allowable amount of silica fume. If yes, the volume of silica fume in the cementitious material is increased by 1% as shown in box 96. The system then returns via loop 97 to tree 64. Using the formulae defined in Step 5, tree 64 now determines the composition and cost of mixtures having silica fume and desired properties for varying fine-to-coarse-aggregate ratios; the ratio of silica fume to cementitious materials being held constant for each mixture.

Loop 89 continues to vary the fine-to-coarse-aggregate ratio until a new mixture is more expensive than a previous mixture as compared in box 82 or the maximum volume of fine aggregate is reached. Upon the occurrence of either event, the system returns to box 90 and the cost of the optimal mixture in box 84 is compared to the cost of the previous best mixture. If the cost of the optimal mixture is less expensive, the composition of optimal mixture becomes the best mixture. The system then checks to see if the maximum amount of silica fume has been reached, if not, an additional 1% of the volume of the cementitious material is substituted for silica fume. Loop 98 is then repeated to find the new optimal mixture at the new set silica fume to cementitious material ratio. Loop 98 is continually repeated until the amount of silica fume in the mixture reaches the maximum amount of silica fume.

Once the maximum amount of silica fume is reached, the system asks in box 100 whether the maximum amount of fly ash in the mixture has been reached. If not, 1% of the volume of cementitious material is replaced by fly ash in box 102. Loop 104 then returns the system to box 62 where the volume of silica fume is reset to zero and tree 64 is entered again.

Tree 64 now uses the formulas as disclosed in Step 4 to determine the optimal mixture having cement, 1% fly ash (based on the volume of cementitious material), fine aggregate and coarse aggregate. Once this mixture is obtained, its cost is compared to the cost of the best mixture in box 90. The silica fume is then incrementally added to mixture as loop 98 is repeated. As loop 98 incrementally increases the value of silica fume, the system determines the optimal mixture for compositions having cement, 1% fly ash, silica fume, fine aggregate, and course aggregate. Once the allowable amount of silica fume equals the maximum amount of silica fume, loop 98 is exited and the percent volume of fly ash is again increased by 1%. The volume of silica fume is then again set to zero and incrementally increased as loop 98 is repeated with a 2% volume of fly ash. This cycle continues until the volume of fly ash in the mixture equal the maximum amount of fly ash.

The system then asks in box 106 if the volume of water reducer is greater than the allowable amount of water reducer. If not, a water reducer is added to the mixture in the amount of 0.1% by weight of the cementitious material. Loop 110 then returns the system back to box 60. The system then repeats loops 98 and 104 for each incremental increase of water reducer.

Each time an optimal mixture is obtained, the cost is compared to the best mix cost stored in box 92. Accordingly, when the amount of water reducer is equal to the maximum amount of water reducer and the system ends by exiting to box 112, the best mixture stored in box 92 corresponds to the least expensive mixture having the desired properties of slump and strength based on all possible combinations of cement, fly ash, silica fume, water reducers, fine aggregate, and coarse aggregate.

Where the cement is singularly combined with either the fly ash or silica fume, the calculations for the amount of water required and the resulting strength of a mixture can be calculated according to the formulas in Step 4 and 5 respectively. However, where the cement, fly ash, and silica fume are combined in a single mixture, the following equations are to be used. The amount of water required to give a mixture including silica fume and fly ash a desired slump is determined from the equation:

$$W_2 = \frac{W_1}{\left(\frac{S_1}{S_2}\right)^{0.1}} - W_{FA} + W_{SF} \tag{39}$$

Where, $W_{SF}$ and $W_{FA}$ are as defined in Steps 4 and 5.

Using the determined value for W: the resulting strength can be determined for box 74 by the modified Feret Equation:

$$\sigma = K \left( \frac{V_C + K_2 V_{FA} + K_3 V_{SF}}{V_C + K_2 V_{FA} + K_3 V_{SF} + W_2 + V_A} \right)^2 \tag{40}$$

Where, $$V_{SF=\%} \; SF \cdot (V_T/100) \tag{41}$$

$$V_{FA=\%} \; FA \cdot (V_T/100) \tag{42}$$

$$V_C = V_T - V_{SF} - V_{FA} \tag{43}$$

Where, $V_T$ = the total volume of cement, silica fume, and fly ash in the mixture. The other variables are as previously & defined in Step 4 and 5.

Should the desired strength not equal the calculated strength, the estimated values for the new volumes of cement, fly ash, and silica fume can be calculated from the following equations, respectively:

$$V_{C(N)} = \frac{\left(\frac{\sigma_D}{K}\right)^{0.5} \cdot \frac{W_2 + V_A}{1 - \left(\frac{\sigma_D}{K}\right)^{0.5}}}{1 + \frac{K_2 \cdot \% FA}{100 - \% FA} + \frac{K_3 \cdot \% SF}{100 - \% SF}} \tag{44}$$

$$V_{FA(N)} = \frac{\% FA \cdot V_{C(N)}}{100 - \% FA} \tag{45}$$

$$V_{SF(N)} = \frac{\% SF \cdot V_{C(N)}}{100 - \% SF} \tag{46}$$

where all variables are as previously defined in Steps 4 and 5.

Using the above equations, the ratios of cement, fly ash, and silica fume to the total volume of the cementitious material remain constant. The corresponding volumes of cement and coarse aggregate can be solved for using the equations in Step 2.

Finally, as discussed more fully in Step 6, the addition of water reducers are only taken into consideration in determining the amount of water required to give a mixture a desired slump. Accordingly, independent of whether the water reducer is to be added to the combination of cement and fly ash, cement and silica fume, or the composition of cement, fly ash and silica fume, the above defined equations are only varied by subtracting the reduction in the amount of water required for a desired slump as a result of the addition of the water reducer.

For example, the required amount of water for a desired slump in a mixture containing cement, fly ash, silica fume, water reducer, fine aggregate, and coarse aggregate is determined by the following equation:

$$W_2 = \frac{W_1}{\left(\frac{S_1}{S_2}\right)^{0.1}} - W_{FA} + W_{SF} - W_{WR} \tag{47}$$

Where, the values for $W_{FA}$, $W_{SF}$, and $W_{WR}$ are as defined in Steps 4, 5, and 6, respectively.

It should also be noted that the affects of other pozzolans or admixtures can also be added to the optimization process by simply adding another loop to the iterative process. Similarly, fillers could have been added to the above system, but since fillers are seldom (if ever) added to a mixture including other admixtures, the result would have been the same.

Step 9: Air-Entraining Agents

Unlike the admixtures discussed above, air-entraining agents are not modeled into the optimization process and thus must be corrected after the fact. Air-entraining agents are admixtures that stabilize bubbles formed during the mixing process. This is accomplished by lowering the surface tension of the water. The air-entraining agent forms a water repelling film that is sufficiently strong to contain and stabilize air bubbles. Unlike naturally occurring air bubbles, air bubbles formed through the use of an air-entraining agent are extremely small and have a diameter size ranging from about 10 to about 1000 μm.

The primary benefits to increasing the percent volume of air voids in a concrete mixture are the improved resistance to freezing and thawing of hardened concrete in moist condition and the increased workability of the concrete mixture. As the water in moist concrete freezes, it produces osmotic and hydraulic pressures in the capillaries and pores of the cement paste and aggregate. These recurring pressures, as a result of the freeze-thaw process, can expand and degrade the structural integrity of the concrete structure. The air voids relieve these pressures by acting as empty chambers in which the freezing water can expand without exerting undue internal pressures on the concrete structure.

Air-entraining agents slightly increase the slump and workability of a concrete mixture by providing air bubbles over which the particles of the mixture can travel, thereby decreasing the friction force between the particles. Furthermore, by incorporating air bubbles into the cement paste, the volume of the paste increases, thereby providing more paste to surround the aggregate particles and decreasing their frictional forces. Typical air entraining agents include salts of wood resins (vinsol resin), some synthetic detergents, salts of sulfonated lignin, salts of petroleum acids, salts of proteinaceous material, fatty and resinous acids and their salts, alkylbenzene sulfonates, and salts of sulfonated hydrocarbons.

Typically, air-entraining agents are added in amounts of about 0.02% to about 0.2% by weight of the cement (depending on the type and amount of solids in the air-entraining agents) to introduce an air content from about 4% to about 10% by volume of the concrete. The necessary concentration of an air-entraining agent depends on the cohesiveness of the concrete mixture. The dosage added to the mixtures in the optimization process is typically the recommended dosage from the sales company. The air-entraining agent Sika Aer® from the Sika company should be dosaged in a concentration of 0.04% of the cement weight to give an air content of about 5% by volume of the concrete.

Once the optimal mixture is actually produced, the actual air content in the mixture can be determined. If the air content for a given slump after completion of the optimization process is too low or too high compared to the assumed air content used in Step 2(c), the optimization process can be recalculated using the corrected value for the content of air or the mixture can be reformed with the appropriate amount of air-entraining agent. The air content can also modeled according to the discussion in Step 10. As with water reducers, the percent volume of an air entraining agent in a mixture is typically so small that the agent itself is not taken into account as affecting the volume of the mixture. However, the resulting amount of air incorporated into the mixture is taken into consideration in determining the strength of the mixture.

Step 10: System Correction

Once the design system of Step 8 is completed, a linear regression analysis can be used to improve the accuracy of the system results. In general, this is accomplished by plotting the theoretically determined amount of mixing water required to obtain a desired slump versus the actual amount mixing water required to obtain a desired slump. The relationship between the plotted values is then defined and incorporated into Popovic's formula so as to increase the accuracy of the theoretical amount of water required to obtain a desired slump.

In practice, the above process includes the following steps:

10(a). Determine the theoretical amount of water required to obtain a desired slump in the optimal mixture defined in Step 8. This amount corresponds to the value for $W_2$ solved from Popovic's formula and is the amount used in determining the resulting 28-day strength of the optimal mixture.

10(b). Physically combine the theoretical amount of water with the optimal concrete mixture of Step 8. Next, experimentally determine the actual slump and air content of the mixture. As a result of approximations incorporated into the optimization process, there will often be a discrepancy between the actual values for slump and air and the theoretical values for slump and air.

10(c). Using Popovic's formula, solve for the amount of water, $W_2$, needed to give the defined mixture the actual slump determined in Step 10(b). Steps 10(b) and 10(c) now give the actual and theoretical amounts of water, respectively, required to give a specific mixture a specific slump.

10(d). Repeat Steps 10(a)–10(d) for different desired slumps. The steps should be repeated at least three times with the accuracy of the final results improving the more the steps are repeated. This provides two sets of values corresponding to the actual and theoretical amounts of water required to obtain a defined slump.

10(e). Plot the values of Step 10(d) with the actual amount of water required for a specific slump on the y-axis and the theoretical amount of water required for a specific slump on the x-axis. Studies have shown that such a plot will reveal a linear relationship.

10(f). Define the linear relationship of Step 10(e) in the following form:

$$W_{2c} = (W_2 \cdot m) + b \tag{48}$$

Where, $W_{2c}$ = actual amount of water for a defined slump (in use, the value represents the corrected theoretical amount of water for a defined slump), $W_2$= theoretical amount of water for a defined slump, p1
m= slope of the plot in Step 10(e), and
b= the y intercept.

10(g). Plot the experimentally determined air content values for each the mixtures versus the experimentally determined slump values for the corresponding mixtures. Define the correlation in the following form:

$$AIR_{ACT} = (SLUMP \cdot m) + b \quad (49)$$

Where, $AIR_{ACT}$= the volume of air in a mixture based on the corresponding slump,
SLUMP= the slump for a given mixture,
m= slope of the plot of actual slump versus correspond air content, and
b= the y intercept of the slope.

10(h). The formula of Step 10(f) is then incorporated into the design optimization process such that after the theoretical amount of mixing water required for a desired slump is solved for from Popovic's formula, the resulting value for $W_2$ is inputed into equation (48) in Step 10(f). $W_{2c}$ is then solved for providing an improved or corrected value for the amount of water required to obtain a desired slump. The desired slump is then incorporated into equation (49) to obtain the volume of air in the mixture. The resulting volume of air and corrected water volume are then used in the Feret equation to solve for the strength of the mixture. The optimization process then continues as previously discussed. In this way the slump can be estimated within plus or minus 2 cm.

Step 11: Durability

The above optimization process can also be used to insure that the selected mixture has sufficient durability for its intended use. Durability is the ability of a concrete structure to maintain its integrity over an extended period of time and is measured in this patent in terms of porosity. Mixtures with a high porosity typically have an excessively high concentration of water or fine aggregate and as such have low durability. Total porosity of a mixture can be determined by the following equation, where it is assumed 80% of the hydration of the cement has already occurred.

$$\text{TOTAL POROSITY} = \left( \frac{W_W - 0.208\,(W_C)}{10} \right) + \% \text{ AIR} \quad (50)$$

Where, $W_w$= weight of water per cubic meter of concrete,
$W_c$= weight of cement per cubic meter of concrete, and
% Air=percent volume of air in mixture based on volume of solids in mixture.

The above equation can thus be used with the slump and strength to insure that a mixture has desired properties. That is, once a mixture has been found to have sufficient strength and slump, the total porosity can be calculated to determine if it satisfies the desired porosity. If the desired porosity is insufficient, the percent volume of cement can be increased, thereby decreasing the porosity of the structure and insuring that it has sufficient durability.

Step 12: Yield

Once the proportions of the best overall mixture are determined, it is desirable to be able to calculate what volumes of the components will produce a desired yield or volume of the mixture. The present manufacturing processes generally overestimate the yield of a mixture. The volume of a proposed mixture is typically calculated by dividing the weight of each component by its respective density to obtain the volume of each component. The volume of each of the components are then added together to obtain the sum volume of the resulting mixture.

Such a process, however, does not take into account the packing density of the particles and, thus, does not consider the interstitial spaces remaining between the mixed particles. As a result, the actual volume of the mixture is greater than the calculated volume. This production of excess concrete is not only expensive in terms of wasted material, time, and energy, but the excess material may also be very difficult to discard safely.

In contrast, the present invention discloses a method for determining the yield of a mixture in which the volume of air in the mixture is taken into consideration. The process entails dividing the volume of each component (as determined by the previously discussed optimization process) by the total volume of the mixture and then multiplying the corresponding fractions by the desired volume of the mixture. These calculations determine the actual volume of each component that should be added to produce a mixture of a desired volume. In turn, the volume of the components can be multiplied by their respective specific gravity to determine what weight of each component should be added to a mixture to obtain a desired yield of a mixture.

By way of example, the volume of cement needed to produce 100 cubic meters of a defined mixture can be determined by the following equation:

$$\text{Vol. Cement} = (V_c/V_T) \cdot 100 \quad (51)$$

Where, $V_c$= the volume of cement in the mixture determined in Step 10 of the optimization process and is represented as a fraction of the solids in the mixture. The solids (i.e., cement, fine aggregate, coarse aggregate and, when relevant, fly ash and silica fume) summing to 1.0.
$V_T$= the total volume of the optimized mixture defined in Step 8. $V_T$ is obtained by adding the volume of water, w, in the mixture to the volume of solids (which sum to 1.0) and dividing the sum by the volume of air in the mixture. Hence, the total volume is represented by the following equation:

$$V_T = \frac{W + 1}{1 - \frac{\%\,\text{AIR}}{100}} \quad (52)$$

Where, the percent air, % Air, in the mixture can be empirically determined by a trial mix. Using the above equation for each of the components in the mixture, the volume of each of the components needed to produce a mixture with a desired yield can be accurately determined.

III. EXAMPLES

To date, numerous tests have been preformed comparing conventional concrete design mixtures to those designed using the above discussed optimization process. Below are specific examples of the operation of the inventive optimization process and comparisons between conventional mixes and optimized mixes.

EXAMPLE 1

Sand and pea gravel were mixed with Type 1 portland cement in the design of a pea gravel foundation concrete mix. The aggregates were characterized to determine the d' and packing density of each component:

|   | cement | sand | pea gravel |
|---|---|---|---|
| d' | 0.025 mm | 1.217 mm | 5.000 mm |
| φ | 0.560 | 0.738 | 0.656 |

Figure 10:
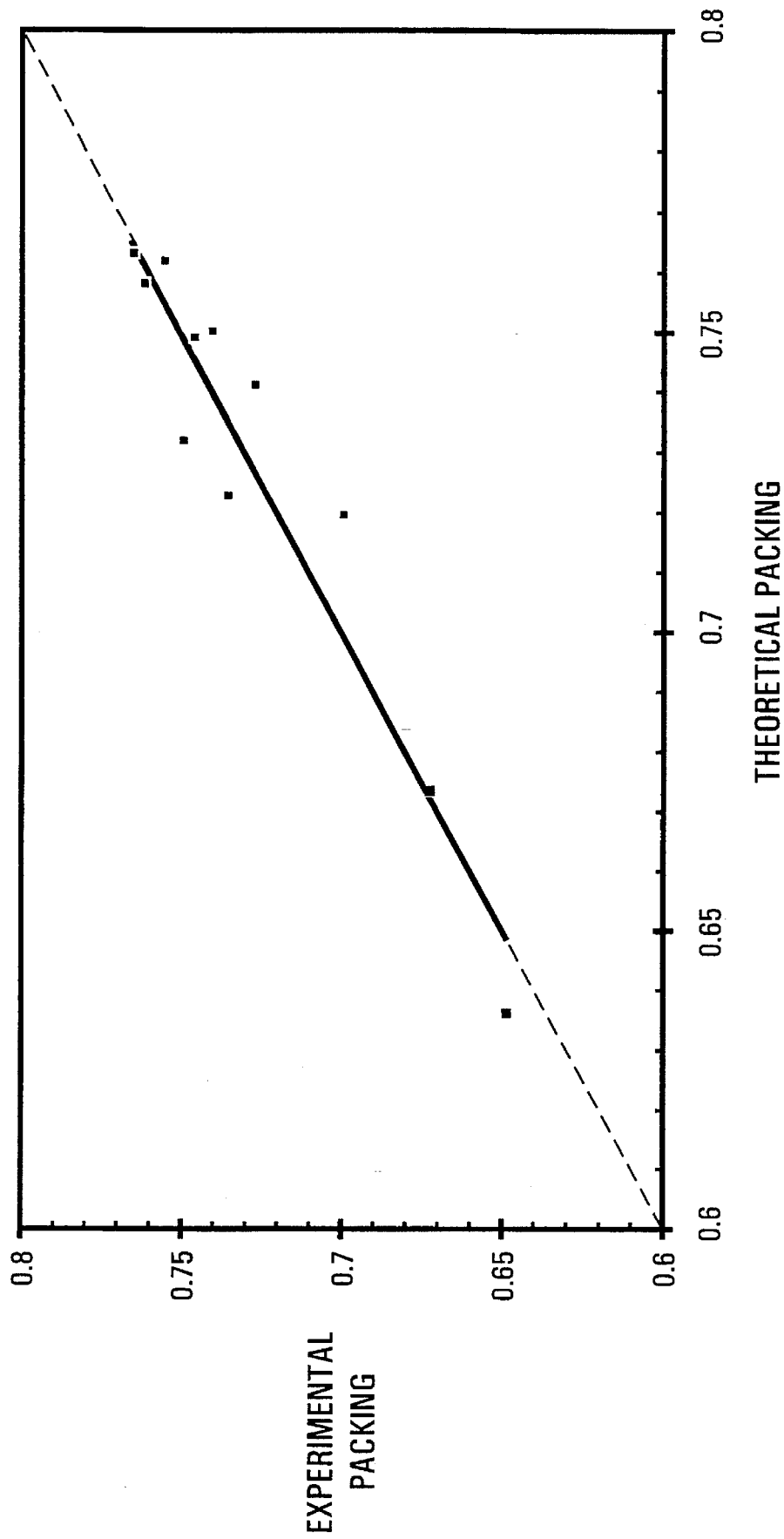
FIG. 10 shows the correlation between the corrected theoretical packing density and the experimental packing density of the sand and pea gravel in Example 1.
Figure 11:
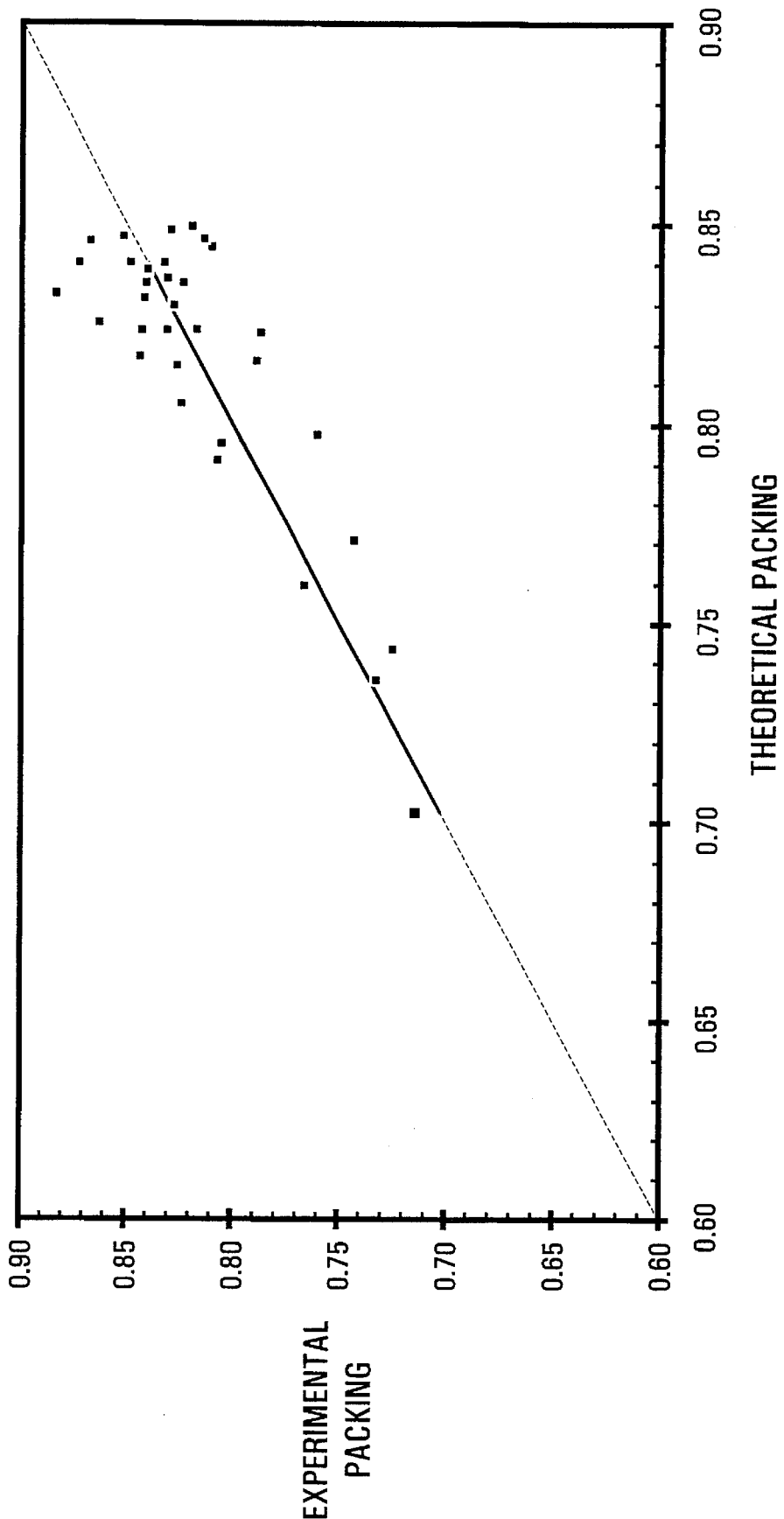
FIG. 11 shows the correlation between the corrected theoretical ternary packing density and the experimental ternary packing density of the cement, sand, and pea gravel of Example 1.

The binary packing of sand and coarse aggregate was estimated from Toufar's model and correlated to the experimental values as described previously in Step 1. FIG. 10 shows the correlation between the corrected theoretical packing density and the experimental packing density of the sand and the pea gravel. As the best fit line follows the line of direct proportionality, the behavior indicates a perfect model description. FIG. 11 shows the correlation between the corrected theoretical ternary packing density and the experimental ternary packing density of the cement, sand and pea gravel. It is seen from the FIG. 11 that an accurate model is obtained for estimating the packing properties.

With the above input parameters, the previously described models were used to estimate the design of a pea gravel mix containing a maximum of 55 volume % sand of the total volume of cement, sand and pea gravel and a strength of 25 MPa. A slump of 5 cm and an air content of 2.0 volume % was anticipated. The following optimized first mix design was predicted:

| cement | 289.9 kg/m³ |
|---|---|
| sand | 1109.3 kg/m³ |
| pea gravel | 693.1 kg/m³ |
| water | 200.5 kg/m³ |
| φ | 0.804 |

After adding an additional amount of water equal to the absorption of the aggregates (1.01 wt. % of the sand and 1.42 wt. % of the weight of pea gavel), the concrete mix was mixed for 3 minutes in a drum mixer and the slump and air were measured:

| actual slump | 5.0 cm |
|---|---|
| actual air | 3.8 volume % |

With the actual recorded values of slump and air, the theoretical amount of water was calculated as described in Step 2 for correcting/modelling the actual slump to water relationship.

The same materials were then used to simulate a second mix design with a maximum of 55 volume % sand, a strength of 25 MPa, a slump of 15 cm and an anticipated air content of 2.0%. The following mix was estimated:

| cement | 309.2 kg/m³ |
|---|---|
| sand | 1076.0 kg/m³ |
| pea gravel | 672.3 kg/m³ |
| water | 215.1 kg/m³ |
| φ | 0.807 |

After adding an additional amount of water equal to the absorption of the aggregates (1.01 wt. % of the sand and 1.42 wt. % of the weight of pea gravel), the concrete mix was mixed for 3 minutes in a drum mixer and the slump and air were measured:

| actual slump | 22.0 cm |
|---|---|
| actual air | 3.3 volume % |

Figure 12:
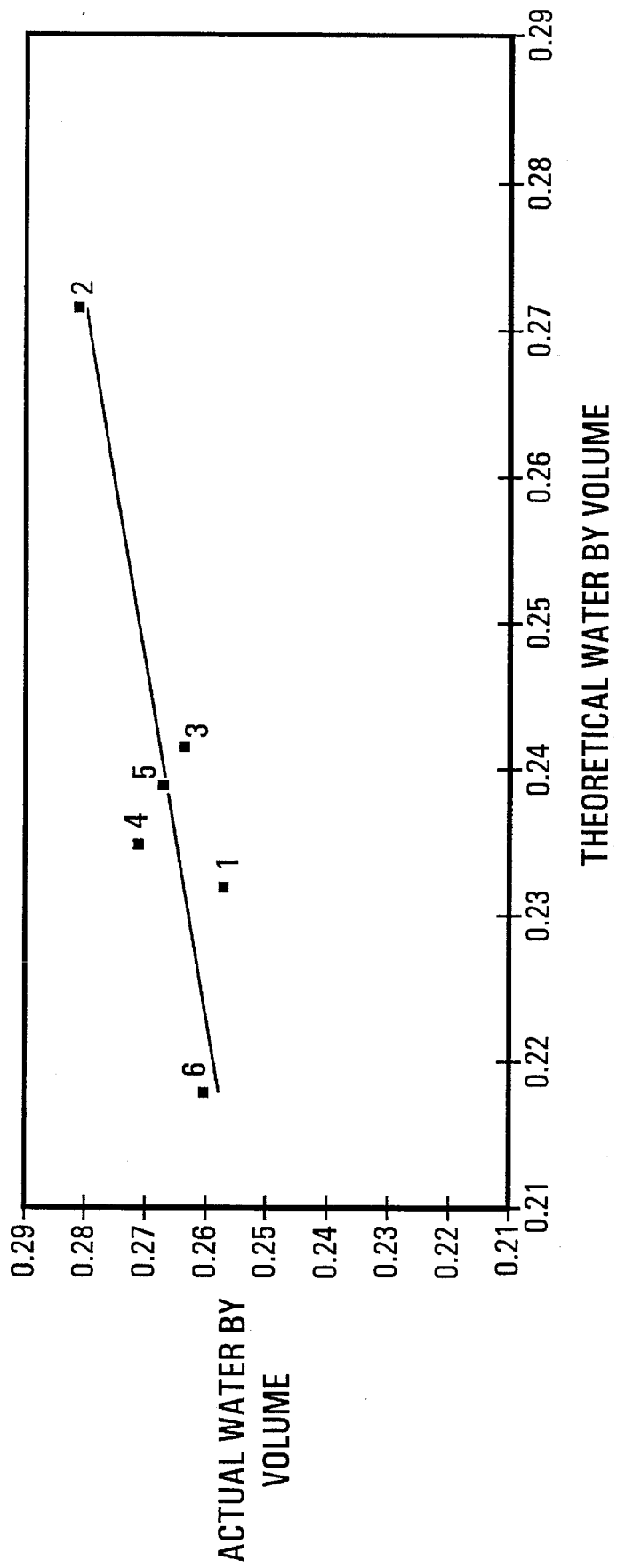
FIG. 12 shows the correlation between the actual amount of water and the theoretical amount for the mixtures in Example 1.

With the actual recorded values of slump and air, the theoretical amount of water was calculated, as described in Step 2, for correcting/modelling the actual slump to water relationship. The actual amount of water as a function of the theoretical amount of water for the first two mixes is shown in FIG. 12 (marked 1 and 2). Based on the first two points in the graph, the actual water by volume is correlated to the theoretical water for the observed slumps according to the following equation:

$$W_{act} = 0.609 W_{theo} + 0.116$$

This equation is now used as a correction of the calculated theoretical amount of water in Step 2.

The actual measured air content of the first two mixes are plotted as a function of the actual slump in FIG. 4 (marked 1 and 2). Based on the first two points in the graph, the actual air is correlated to the slump according to the following equation:

$$AIR_{actual} = -0.029 \cdot SLUMP + 3.947$$

This equation is now used in predicting the actual air content for incorporation into the Feret equation.

Following the initial steps to model the actual slump and air content of the concrete, the derived models can now be used for a precise estimation of the slump of concrete. Using the same materials as above and estimating the slump and air content of a concrete with a maximum of 55 volume % sand and a strength of 25 MPa, the following results were obtained:

| mix # | slump | | air | |
|---|---|---|---|---|
|  | estimated | actual | estimated | actual |
| 3 | 10.0 | 11.0 | 3.7 | 4.0 |
| 4 | 15.0 | 16.2 | 3.6 | 5.0 |
| 5 | 10.0 | 12.0 | 4.0 | 4.3 |
| 6 | 7.0 | 6.5 | 4.2 | 4.8 |

Figure 13:
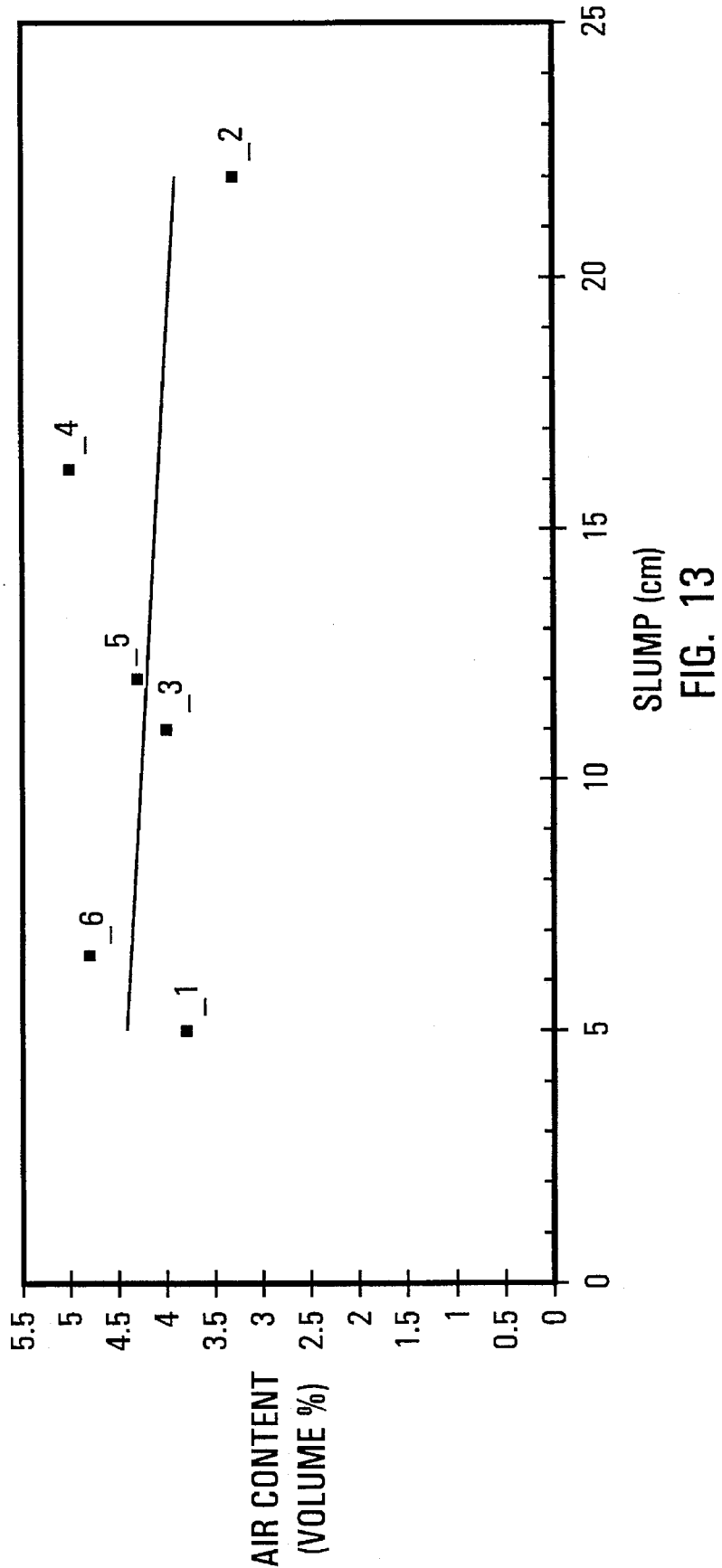
FIG. 13 shows the correlation between the air content and slump for the mixtures in Example 1.
Figure 14:
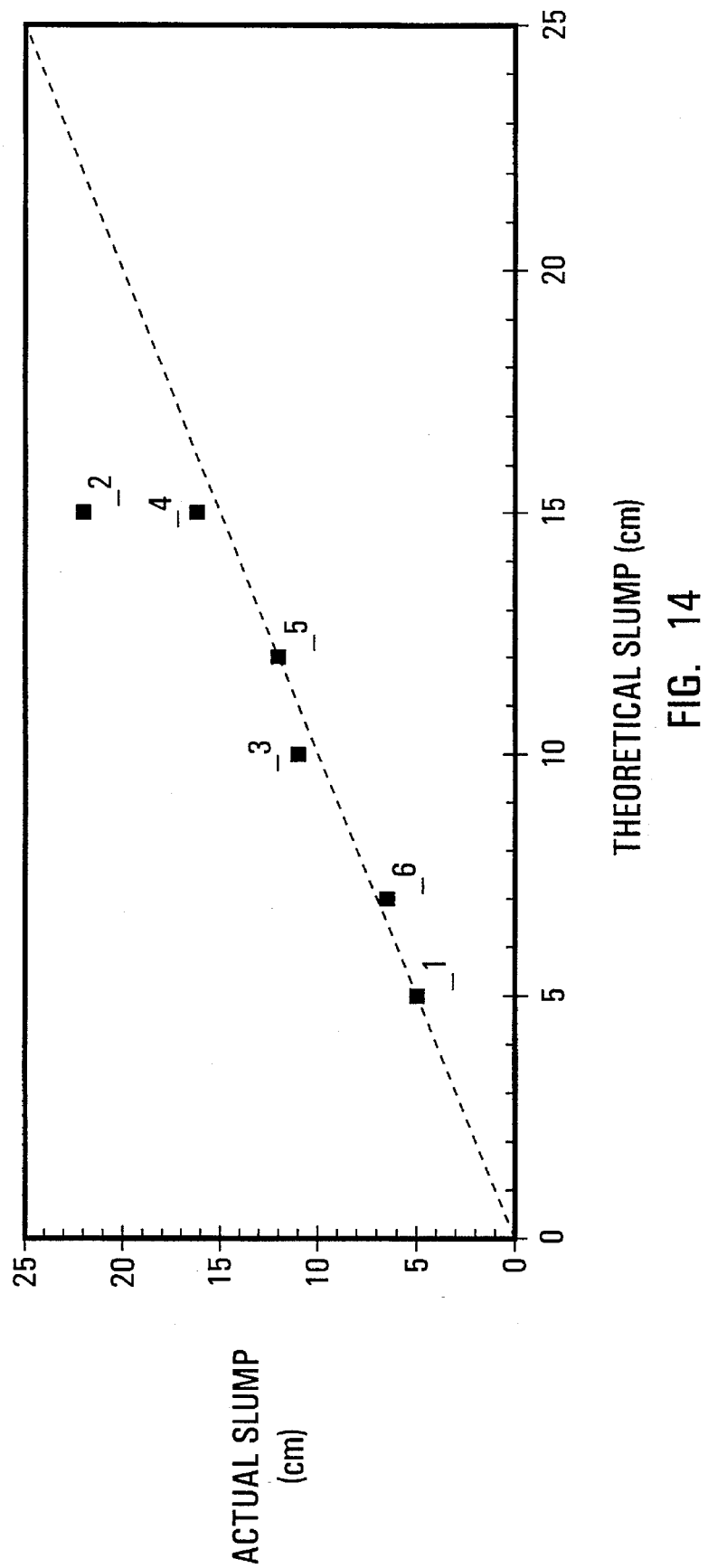
FIG. 14 shows the correlation between the actual slump and the designed slump for the mixtures in Example 1.

After the mixing of each mix, the theoretical water for the actual slump was estimated and plotted in FIG. 12. The increase in the number of points increases the precision in estimating the actual slump. Similarly, the actual air content was plotted in FIG. 13 to increase the precision in estimating the air content. The actual slump vs. the designed slump is shown FIG. 14. As can be seen from FIG. 14, the first two slumps are typically not correct. Recording the actual slump and air and feeding this information back into the model improves the accuracy so that the following slumps are recorded more precisely. The accuracy is approximately 2.0 cm.

As demonstrated, the advantage over conventional design methods is that it basically requires only two mix designs to perfect the model and predict a concrete with the correct strength, air content and slump at the lowest possible materials cost.

EXAMPLE 2

Sand and pea gravel were mixed with Type 1 portland cement in the design of a pea gravel foundation concrete mix. With the same input parameters as in Example 1, the previously described were used to estimate the design of a pea gravel mix containing a maximum of 50 volume % sand of the total volume of cement, sand, and pea gravel and a strength of 25 MPa. A slump of 5 cm and an air content of 2.5 volume % was anticipated. The following first optimized mix design was predicted:

| | |
|---|---|
| cement | 257.8 kg/m³ |
| sand | 1030.4 kg/m³ |
| pea gravel | 864.3 kg/m³ |
| water | 171.0 kg/m³ |
| ϕ | 0.804 |

After adding an additional amount of water equal to the absorption of the aggregates (1.2 wt. % of the sand and 1.4 wt. % of the weight of pea gravel), the concrete mix was mixed for 3 minutes in a drum mixer and the slump and air were measured:

| | |
|---|---|
| actual slump | 2.5 cm |
| actual air | 3.0 volume % |

With the actual recorded values of slump and air, the theoretical amount of water was calculated as described in Step 2 for correcting/modelling the actual slump to water relationship.

The same materials were then used to simulate a second mix design with a maximum of 50 volume % sand, a strength of MPa, a slump of 15 cm and an anticipated air content of 2.0%. The following mix was estimated:

| | |
|---|---|
| cement | 257.3 kg/m³ |
| sand | 1025.4 kg/m³ |
| pea gravel | 819.6 kg/m³ |
| water | 189.4 kg/m³ |
| ϕ | 0.809 |

After adding an additional amount of water equal to the absorption of the aggregates (1.2 wt. % of the sand and 1.4 wt. % of the weight of pea gravel), the concrete mix was mixed for 3 minutes in a drum mixer and the slump and air were measured:

| | |
|---|---|
| actual slump | 5.5 cm |
| actual air | 2.7 volume % |

Figure 15:
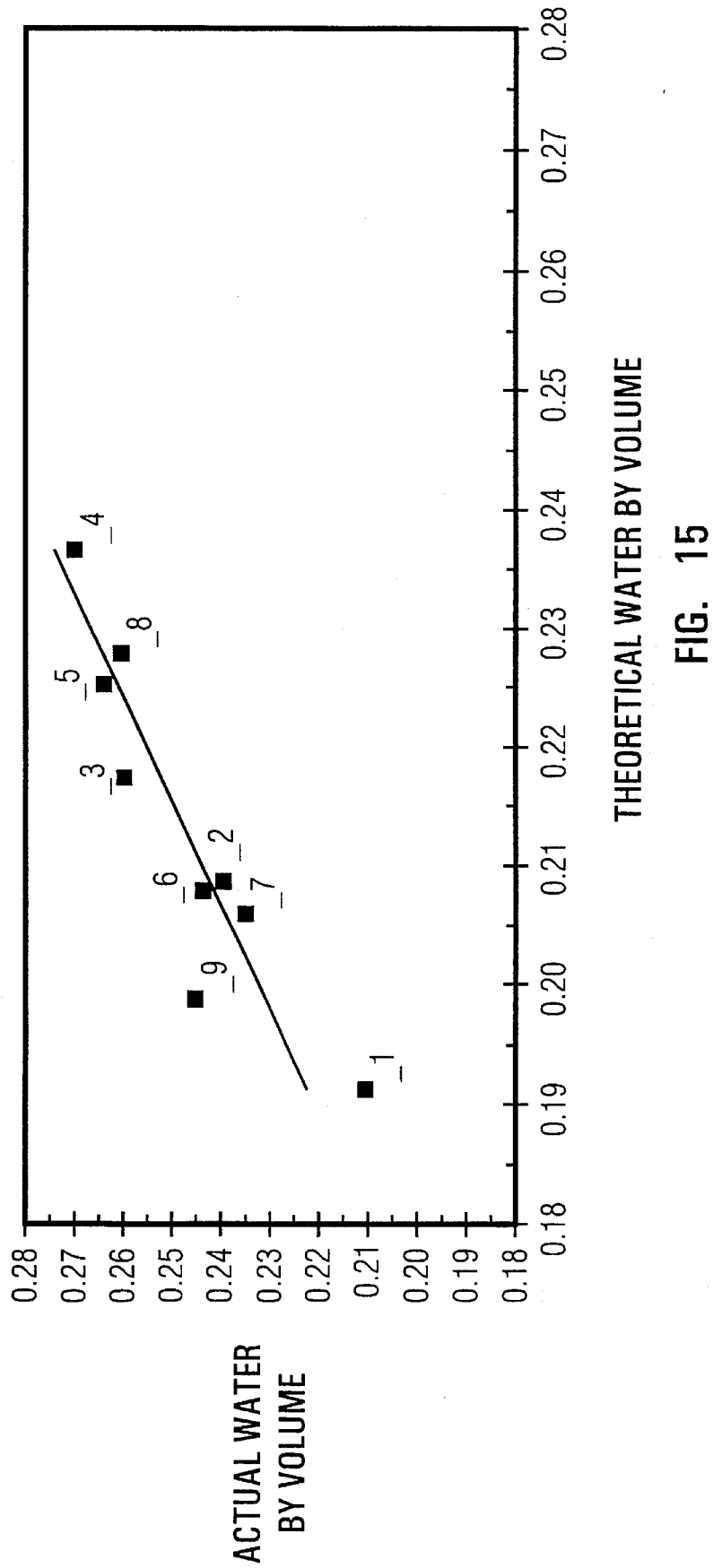
FIG. 15 shows the correlation between the actual amount of water and the theoretical amount for the mixtures in Example 2.

With the actual recorded values of slump and air, the theoretical amount of water was calculated, as described in Step 2, for correcting/modelling the actual slump to water relationship. The actual amount of water as a function of the theoretical amount of water for the first two mixes is shown in FIG. 15 (marked 1 and 2). Based on the first two points in the graph, the actual water is correlated to the theoretical water according to the following equation:

$$W_{act} = 1.740 W_{theo} - 0.124$$

This equation is now used as a correction of the calculated theoretical amount of water in Step 2. As can be seen from FIG. 15, something went wrong in testing the first slump; point #1 is totally misplaced. Unfortunately, the model for mix 3 is now based on mix 1 and 2. As will be demonstrated, the test of more mixes corrects the model and increases the precision of the program in predicting the slump.

Following the initial steps to model the actual slump of the concrete, the derived models can now be used for a precise estimation of the slump of concrete. Using the same materials as above and estimating the slump and air content of a concrete with a maximum of 50 volume % sand and a strength of 25 MPa, the following results were obtained:

| mix | slump | | air | |
|---|---|---|---|---|
| # | estimated | actual | estimated | actual |
| 3 | 10.0 | 8.0 | 2.0 | 2.3 |
| 4 | 15.0 | 14.3 | 2.0 | 1.7 |
| 5 | 12.0 | 11.0 | 1.9 | 2.2 |
| 6 | 7.0 | 6.3 | 2.9 | 2.8 |
| 7 | 5.0 | 4.5 | 2.5 | 2.5 |
| 8 | 10.0 | 10.1 | 2.5 | 1.8 |
| 9 | 5.0 | 3.6 | 2.5 | 2.6 |

After the mixing of each mix, the theoretical water for the actual slump was estimated and plotted in FIG. 15. The increase in the number of points increases the precision in estimating the actual slump. Similarly, the actual air content was plotted in FIG. 16 to increase the precision in estimating the air content. Also shown is a plot of actual slump vs. designed slump in FIG. 17. As can be seen from FIG. 17, only the slump of mix #1 and #2 were inaccurate. As the model corrected for the deviation, the rest of the mixes produced the correct slump.

The result is a concrete with the correct strength, air content, and slump at the lowest materials cost.

EXAMPLE 3

Sand and pea gravel were mixed with Type 1 portland cement and fly ash in the design of a pea gavel foundation concrete mix. With the same input parameters as in example 1, the previously described models for fly ash were used to estimate the design of a pea gravel mix containing a maximum of 60 volume % sand of the total volume of cement, sand, and pea gavel; a maximum of 30% fly ash of the weight of cement; and a strength of 30 MPa. A slump of 5 cm and an air content of 2.0 volume % was anticipated. The following first optimized mix design was predicted:

| | |
|---|---|
| cement | 298.8 kg/m³ |
| fly ash | 128.0 kg/m³ |
| sand | 1220.4 kg/m³ |
| pea gravel | 461.9 kg/m³ |
| water | 190.5 kg/m³ |
| ϕ | 0.805 |

After adding an additional amount of water equal to the absorption of the aggregates (1.01 wt. % of the sand and 1.42 wt. % of the weight of pea gravel), the concrete mix was mixed for 3 minutes in a drum mixer and the slump and air were measured:

| | |
|---|---|
| actual slump | 3.5 cm |
| actual air | 3.1 volume % |

With the actual recorded values of slump and air, the theoretical amount of water was calculated as described in Step 4 for correcting/modelling the actual slump to water relationship.

The same materials were then used to simulate a second mix design with a maximum of 60 volume % sand, 30% fly ash, a strength of 30 MPa, a slump of 15 cm and an anticipated air content of 2.0%. The following mix was estimated:

| | | |
|---|---|---|
| cement | 333.8 | kg/m³ |
| fly ash | 134.8 | kg/m³ |
| sand | 1188.1 | kg/m³ |
| pea gravel | 397.5 | kg/m³ |
| water | 213.1 | kg/m³ |
| φ | 0.801 | |

After adding an additional amount of water equal to the absorption of the aggregates (1.01 wt. % of the sand and 1.42 wt. % of the weight of pea gravel), the concrete mix was mixed for 3 minutes in a drum mixer and the slump and air were measured:

| | |
|---|---|
| actual slump | 19.5 cm |
| actual air | 1.8 volume % |

Figure 18:
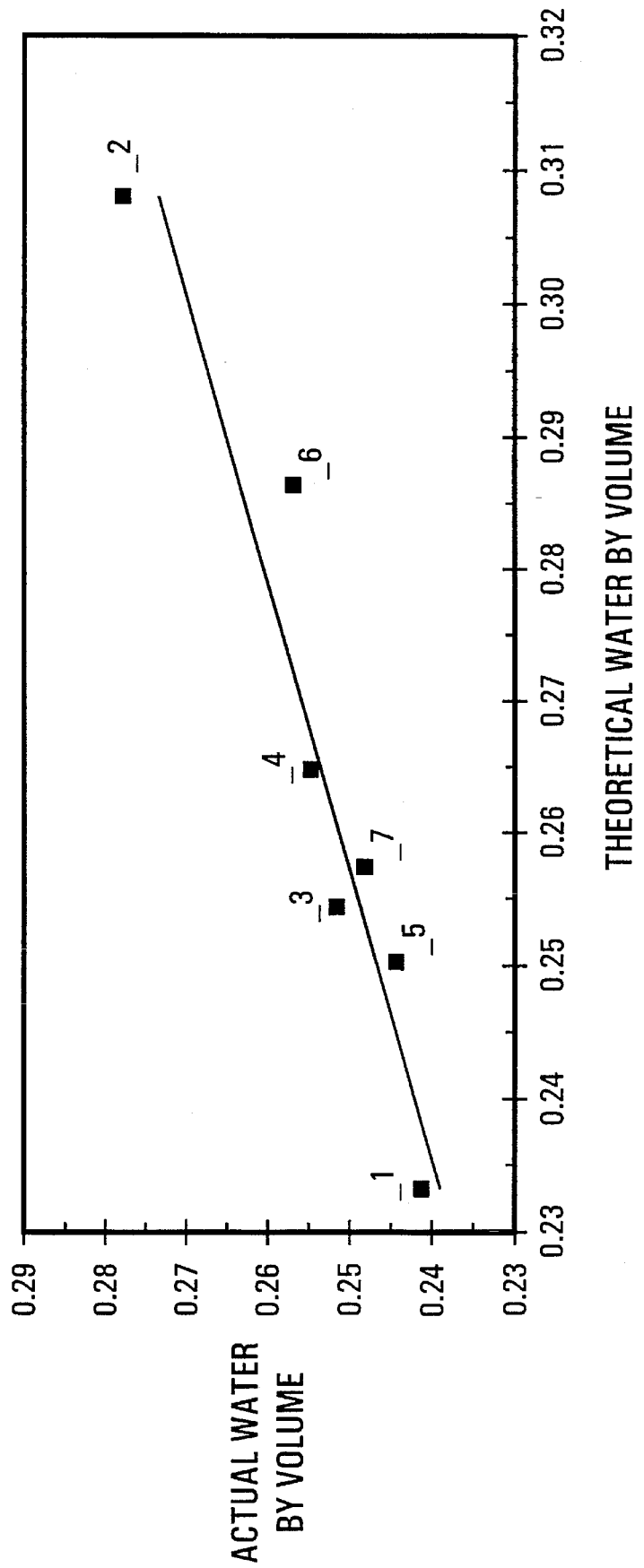
FIG. 18 shows the correlation between the actual amount of water and the theoretical amount for the mixtures in Example 3.

With the actual recorded values of slump and air, the theoretical amount of water was calculated, as described in Step 4, for correcting/modelling the actual slump to water relationship. The actual amount of water as a function of the theoretical amount of water for the first two mixes is shown in FIG. 18 (marked 1 and 2). Based on the first two points in the graph, the actual water by volume is correlated to the theoretical water according to the following equation:

$$W_{act} = 0.489 W_{theo} = 0.127$$

This equation is now used as a correction of the calculated theoretical amount of water in Step 4.

Figure 19:
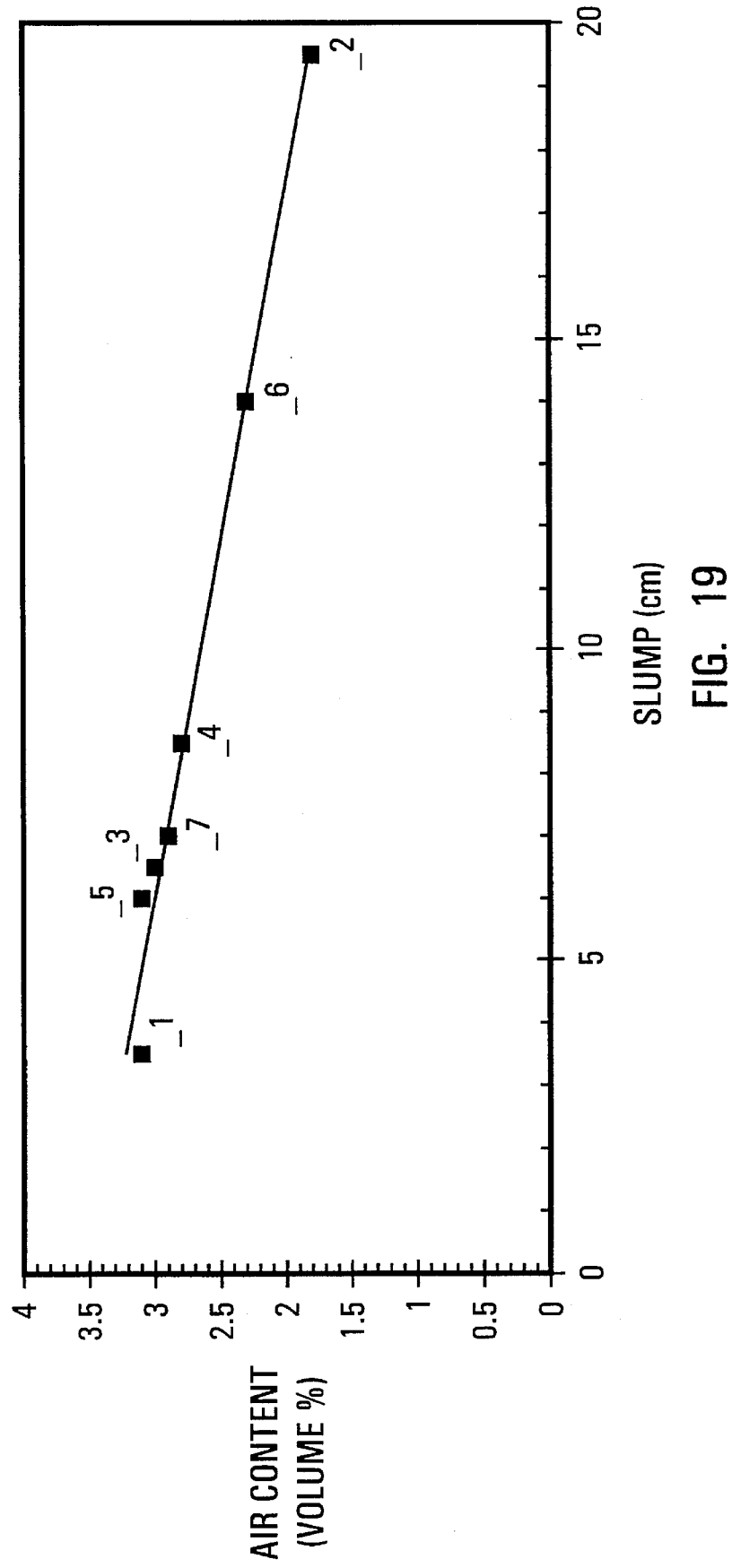
FIG. 19 shows the correlation between the air content and slump for the mixtures in Example 3.

The actual measured air content of the first two mixes are plotted as a function of the actual slump in FIG. 19 (marked 1 and 2). Based on the first two points in the graph, the actual air is correlated to the slump according to the following equation:

$$AIR_{actual} = -0.081 \cdot SLUMP + 3.384$$

This equation is now used in predicting the actual air content for use in determining the strength of the mixture.

Following the initial steps to model the actual slump and air content of the concrete, the derived models can now be used for a precise estimation of the slump of concrete. Using the same materials as above and estimating the slump and air content of a concrete with a maximum of 60 volume % sand, 30% fly ash and a strength of 30 MPa, the following results were obtained:

| mix | slump | | air | |
|---|---|---|---|---|
| # | estimated | actual | estimated | actual |
| 3 | 10.0 | 6.5 | 2.6 | 3.0 |
| 4 | 12.0 | 8.5 | 2.5 | 2.8 |
| 5 | 7.0 | 6.0 | 2.9 | 3.1 |
| 6 | 14.0 | 14.0 | 2.3 | 2.3 |
| 7 | 10.0 | 7.0 | 2.7 | 2.9 |

Figure 20:
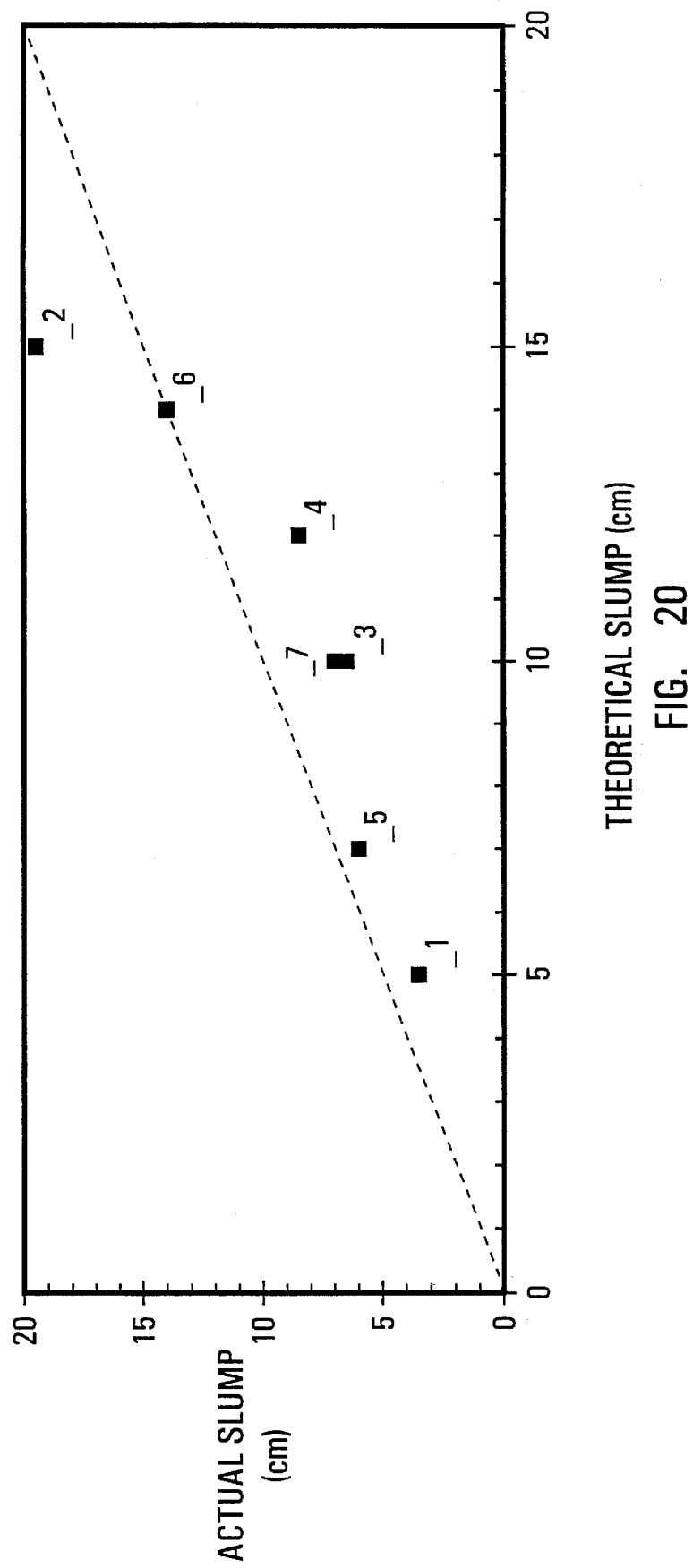
FIG. 20 shows the correlation between the actual slump and the designed slump for the mixtures in Example 3.

After the mixing of each mix, the theoretical water for the actual slump was estimated and plotted in FIG. 18. The increase in the number of points increases the precision in estimating the actual slump. Similarly, the actual air content was plotted in FIG. 19 to increase the precision in estimating the air content. Also shown is a plot of actual slump vs. designed slump in FIG. 20. As can be seen from FIG. 20, the actual slumps fall fairly close to the designed slumps in most of the mixes.

The result is again a concrete (with fly ash) with the correct strength, air content and slump at the lowest materials cost.

EXAMPLE 4

Sand and pea gravel were mixed with Type 1 portland cement and an air entraining agent in the design of a pea gravel foundation concrete mix. With the same input parameters as in Example 1, the previously described models in Steps 9 and 10 were used to estimate the design of a pea gravel mix containing a maximum of 60 volume % sand of the total volume of cement, sand and pea gravel, 0.04% air entraining agent of the weight of cement, and a strength of 25 MPa. A slump of 20 cm and an air content of 3.0 volume % was anticipated. The following first optimized mix design was predicted:

| | |
|---|---|
| cement | 347.6 kg/m³ |
| air entraining agent | 0.139 kg/m³ |
| sand | 1182.2 kg/m³ |
| pea gravel | 532.0 kg/m³ |
| water | 208.6 kg/m³ |
| φ | 0.806 |

After adding an additional amount of water equal to the absorption of the aggregates (1.01 wt. % of the sand and 1.42 wt. % of the weight of pea gravel), the concrete mix was mixed for 3 minutes in a drum mixer and the slump and air were measured:

| | |
|---|---|
| actual slump | 15.2 cm |
| actual air | 6.3 volume % |

With the actual recorded values of slump and air, the theoretical amount of water was calculated as described in Step 2 for correcting/modelling the actual slump to water relationship.

The same materials were then used to simulate a second mix design with a maximum of 60 volume % sand, 0.04% air entraining agent, a strength of 25 MPa, a slump of 15 cm and an anticipated air content of 4.0%. The following mix was estimated:

| | |
|---|---|
| cement | 339.2 kg/m³ |
| air entraining agent | 0.136 kg/m³ |
| sand | 1197.6 kg/m³ |
| pea gravel | 538.9 kg/m³ |
| water | 192.8 kg/m³ |
| φ | 0.806 |

After adding an additional amount of water equal to the absorption of the aggregates (1.01 wt. % of the sand and 1.42 wt. % of the weight of pea gravel), the concrete mix was mixed for 3 minutes in a drum mixer and the slump and air were measured:

| | |
|---|---|
| actual slump | 3.0 cm |
| actual air | 5.9 volume % |

Figure 21:
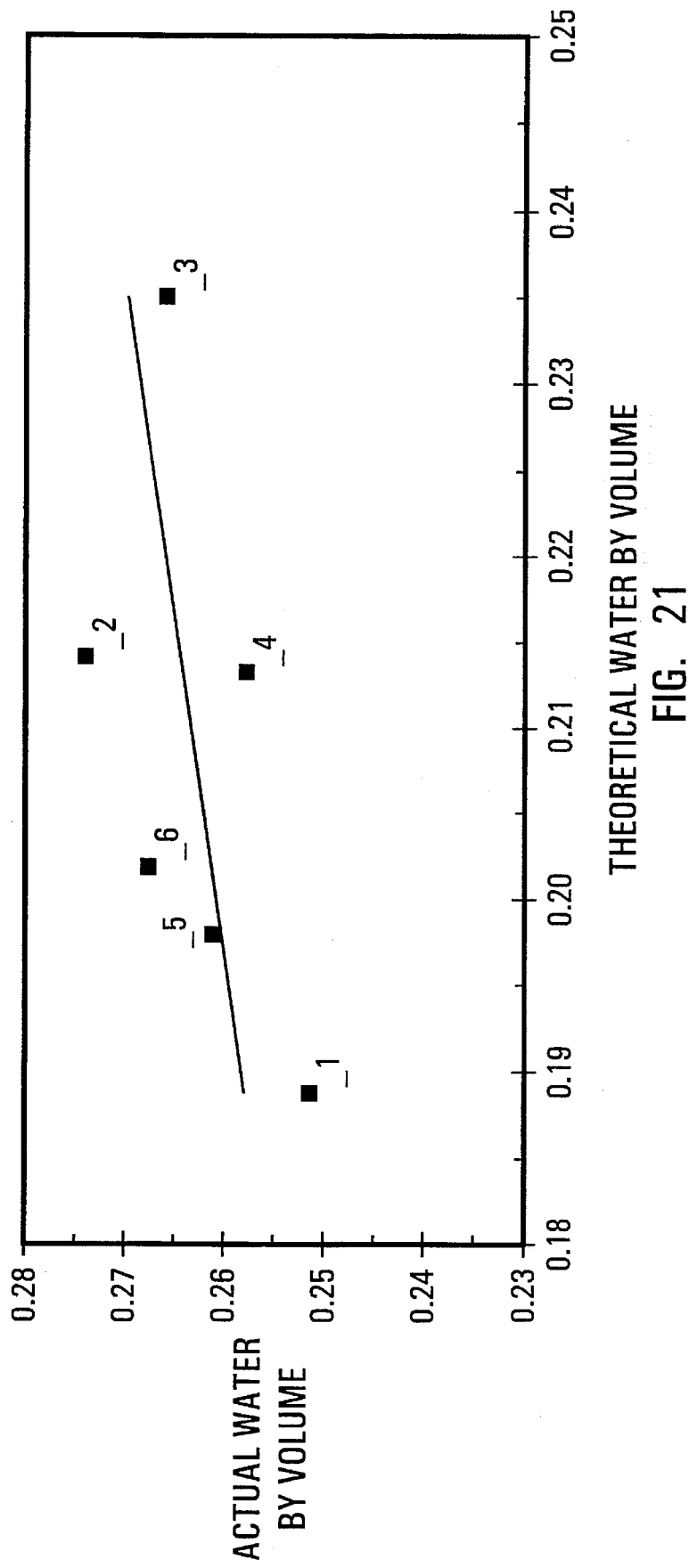
FIG. 21 shows the correlation between the actual amount of water and the theoretical amount for the mixtures in Example 4.

With the actual recorded values of slump and air, the theoretical amount of water was calculated, as described in Step 2, for correcting/modelling the actual slump to water relationship. The actual amount of water as a function of the theoretical amount of water for the first two mixes is shown in FIG. 21 (marked 1 and 2). Based on the first two points in the graph, the actual water by volume is correlated to the theoretical water according to the following equation:

$$W_{act}=0.893W_{theo}+0.083$$

This equation is now used as a correction of the calculated theoretical amount of water in Step 2.

Figure 22:
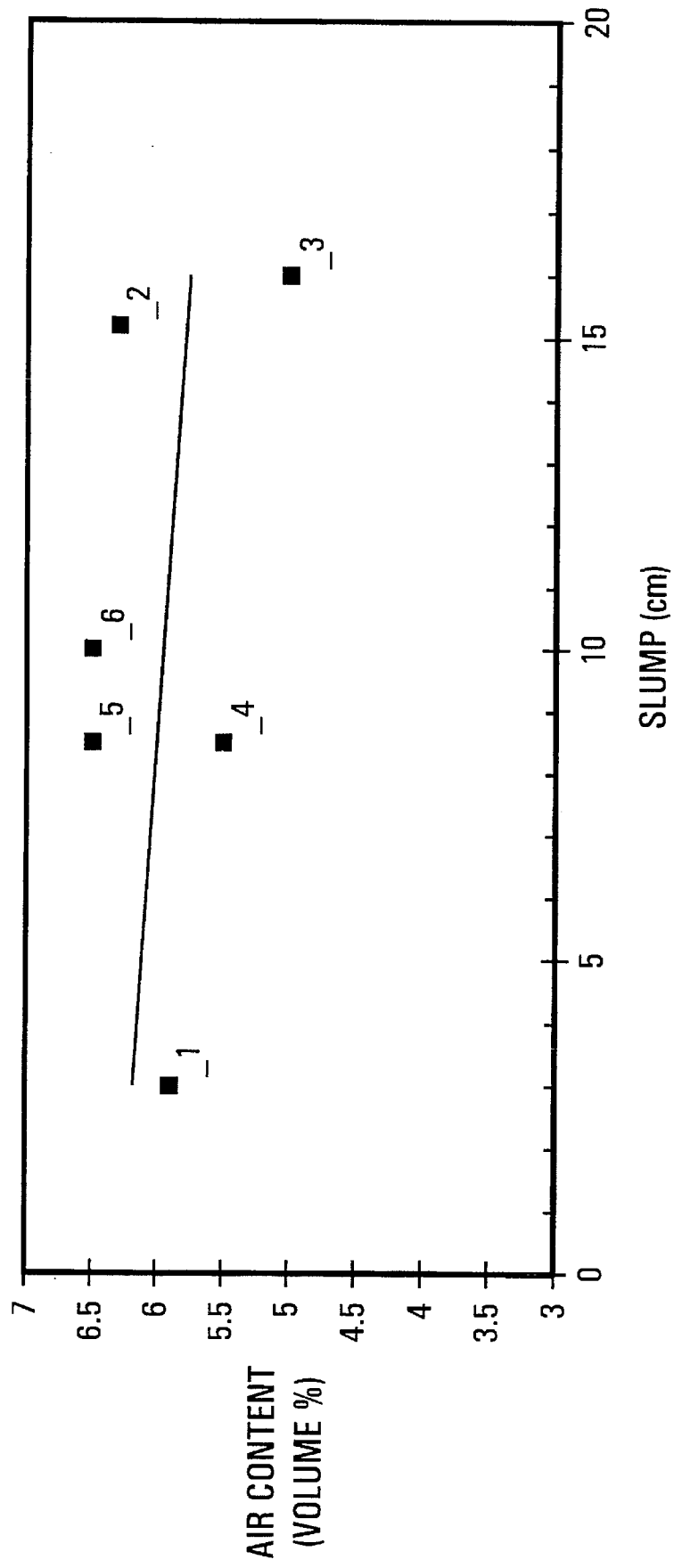
FIG. 22 shows the correlation between the air content and slump for the mixtures in Example 4.

The actual measured air content of the first two mixes are plotted as a function of the actual slump in FIG. 22 (marked 1 and 2). Based on the first two points in the graph, the actual air is correlated to the slump according to the following equation:

$$AIR_{actual}=0.033 \cdot SLUMP+5.802.$$

This equation is now used in predicting the actual air content for determining the strength of the mixture.

Following the initial steps to model the actual slump and air content of the concrete, the derived models can now be used for a precise estimation oft he slump of concrete. Using the same materials as above and estimating the slump and air content of a concrete with a maximum of 60 volume % sand, 0.04% air entraining agent and a strength of 25 MPa, the following results were obtained:

| mix | slump | | air | |
|---|---|---|---|---|
| # | estimated | actual | estimated | actual |
| 3 | 12.0 | 16.0 | 6.2 | 5.0 |
| 4 | 5.0 | 8.5 | 5.9 | 5.5 |
| 5 | 7.0 | 8.5 | 5.7 | 6.5 |
| 6 | 10.0 | 10.0 | 5.8 | 6.5 |

Figure 23:
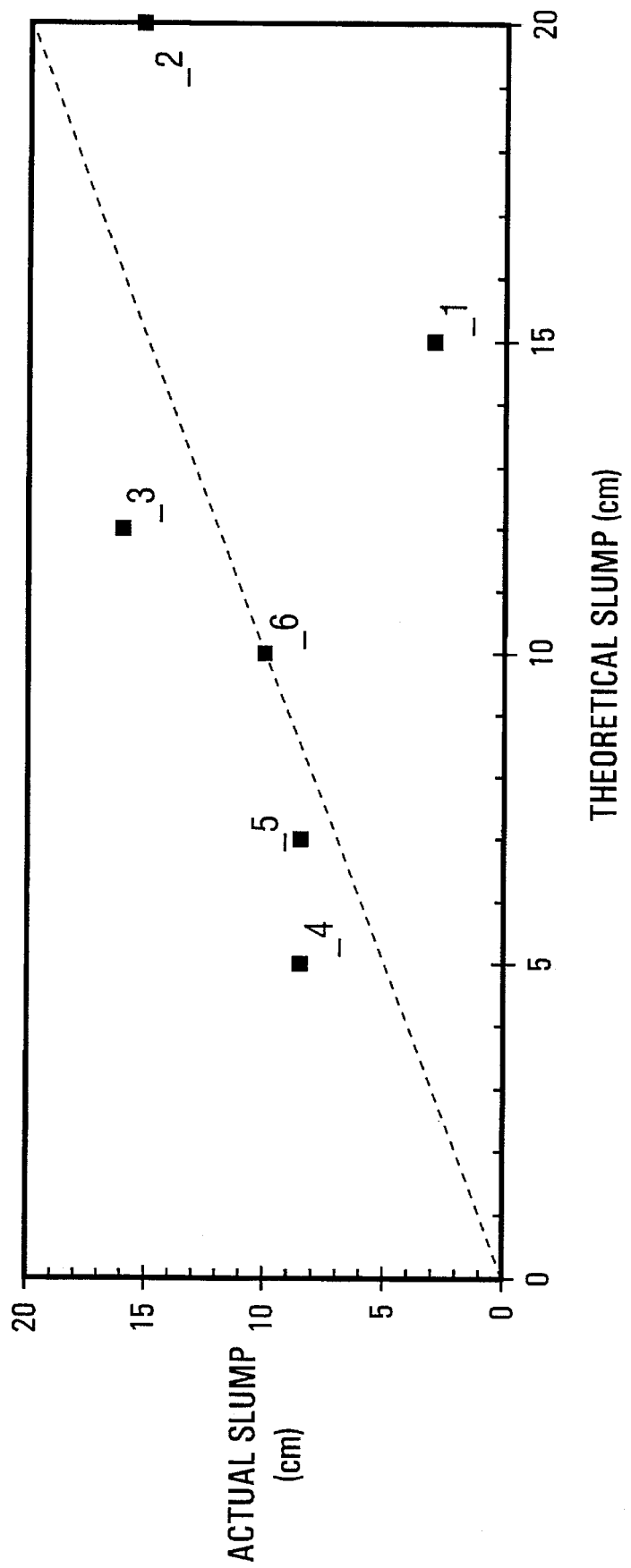
FIG. 23 shows the correlation between the actual slump and the designed slump for the mixtures in Example 4.

After the mixing of each mix, the theoretical water for the actual slump was estimated and plotted in FIG. 21. Again, the increase in the number of points corrects the model and increases the precision in estimating the actual slump. Similarly, the actual air content was plotted in FIG. 22 to increase the precision in estimating the air content. Also shown is a plot of actual slump vs. designed slump in FIG. 23. As can be seen from FIG. 23, after the first two initial mixes, the actual slumps fall fairly close to the designed slumps in most of the mixes.

The result is again a concrete (with air entraining agent) with the correct strength, air content and slump at the lowest materials cost.

EXAMPLE 5

A low strength concrete was to be designed with the use of a calcium carbonate filler. The concrete was designed for MPa and 60% maximum sand of the total volume of cement, filler, sand and pea gravel. To insure a good cohesion, a minimum of 10% by volume of the cement and filler of the total volume of cement, filler, sand and pea gravel was to be used. After setting up the model with the first two mixes as described in Example 1 and Example 2, the following mix was designed for a slump of 3.5 cm:

| cement | 201.4 kg/m³ |
|---|---|
| filler | 74.1 kg/m³ |
| sand | 1220.4 kg/m³ |
| pea gravel | 461.9 kg/m³ |
| water | 190.5 kg/m³ |

With the use of filler, only the necessary amount of cement for the desired strength is used; the cohesiveness is obtained with the addition of the filler. If filler was not used, additional cement would be used to insure cohesiveness and would give an optimal concrete with a strength of 20.7 MPa. Comparing the two mixes, the materials cost reduction with the use of filler is $3.60/m³.

EXAMPLE 6

Sand and pea gravel were mixed with Type 1 portland cement and superplasticizer in the design of a pea gravel foundation concrete mix. With the same input parameters as in Example 1, the previously described models in Step 8 for water reducers were used to estimate the design of a pea gravel mix containing a maximum of 50 volume % sand of the total volume of cement, sand and pea gravel, a maximum of 2% WRDA-19 of the weight of cement, and a strength of 35 MPa. A slump of 2 cm and an air content of 9.0 volume % was anticipated. The following first optimized mix design was predicted:

| cement | 383.0 kg/m³ |
|---|---|
| WRDA-19 | 7.7 kg/m³ |
| sand | 991.7 kg/m³ |
| pea gravel | 711.1 kg/m³ |
| water | 142.0 kg/m³ |
| φ | 0.813 |

After adding an additional amount of water equal to the absorption of the aggregates (1.01 wt. % of the sand and 1.42 wt. % of the weight of pea gravel) and subtracting the water content of the WRDA-19 (60% water), the concrete mix was mixed for 3 minutes in a drum mixer and the slump and air were measured:

| actual slump | 5.0 cm |
|---|---|
| actual air | 7.9 volume % |

With the actual recorded values of slump and air, the theoretical amount of water was calculated as described in Step 8 for correcting/modelling the actual slump to water relationship.

The same materials were then used to simulate a second mix design with a maximum of 50 volume % sand, 2% WRDA-19, a strength of 35 MPa, a slump of 4 cm and an anticipated air content of 9.0%. The following mix was estimated:

| cement | 397.6 kg/m³ |
|---|---|
| WRDA-19 | 8.0 kg/m³ |
| sand | 990.8 kg/m³ |
| pea gravel | 676.3 kg/m³ |
| water | 150.9 kg/m³ |
| φ | 0.813 |

After adding an additional amount of water equal to the absorption of the aggregates (1.01 wt. % of the sand and 1.42 wt. % of the weight of pea gravel) and subtracting the water content of the WRDA-19 (60% water), the concrete mix was mixed for 3 minutes in a drum mixer and the slump and air were measured:

| | |
|---|---|
| actual slump | 7.3 cm |
| actual air | 7.5 volume % |

Figure 24:
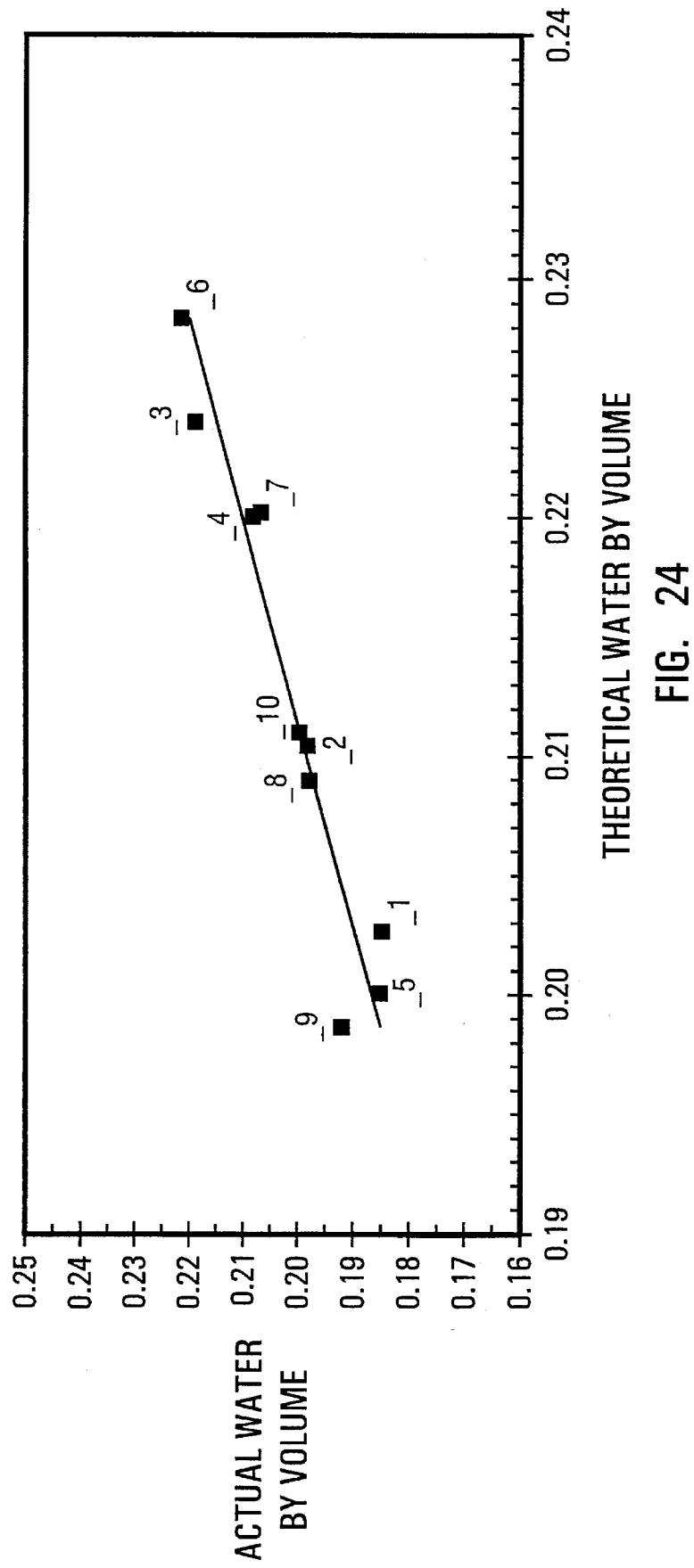
FIG. 24 shows the correlation between the actual amount of water and the theoretical amount for the mixtures in Example 6.

With the actual recorded values of slump and air, the theoretical amount of water was calculated, as described in Step 8, for correcting/modelling the actual slump to water relationship. The actual amount of water as a function of the theoretical amount of water for the first two mixes is shown in FIG. 24 (marked 1 and 2). Based on the first two points in the graph, the actual water by volume is correlated to the theoretical water according to the following equation:

$$W_{act}=1.423W_{theo}-0.125$$

This equation is now used as a correction of the calculated theoretical amount of water in Step 8.

Figure 16:
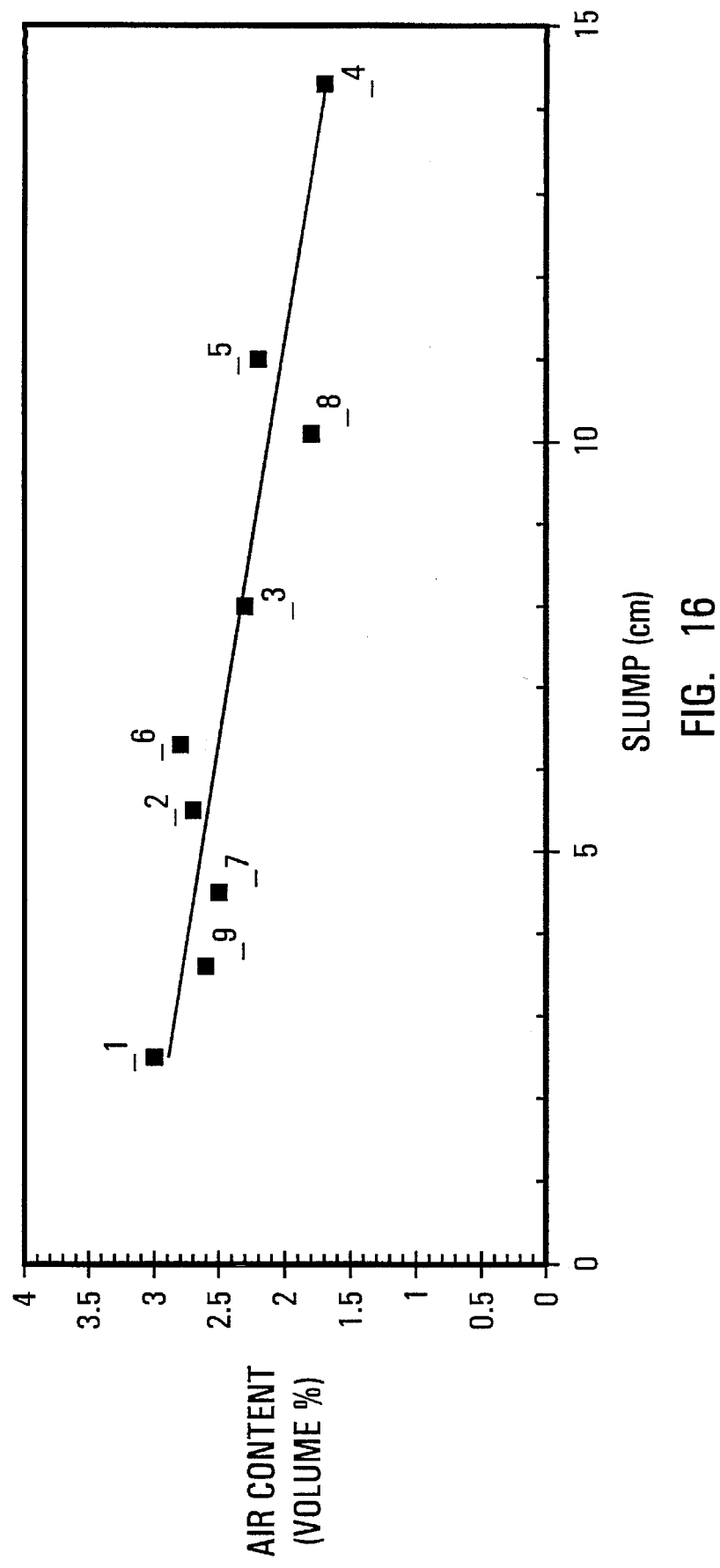
FIG. 16 shows the correlation between the air content and slump for the mixtures in Example 2.
Figure 17:
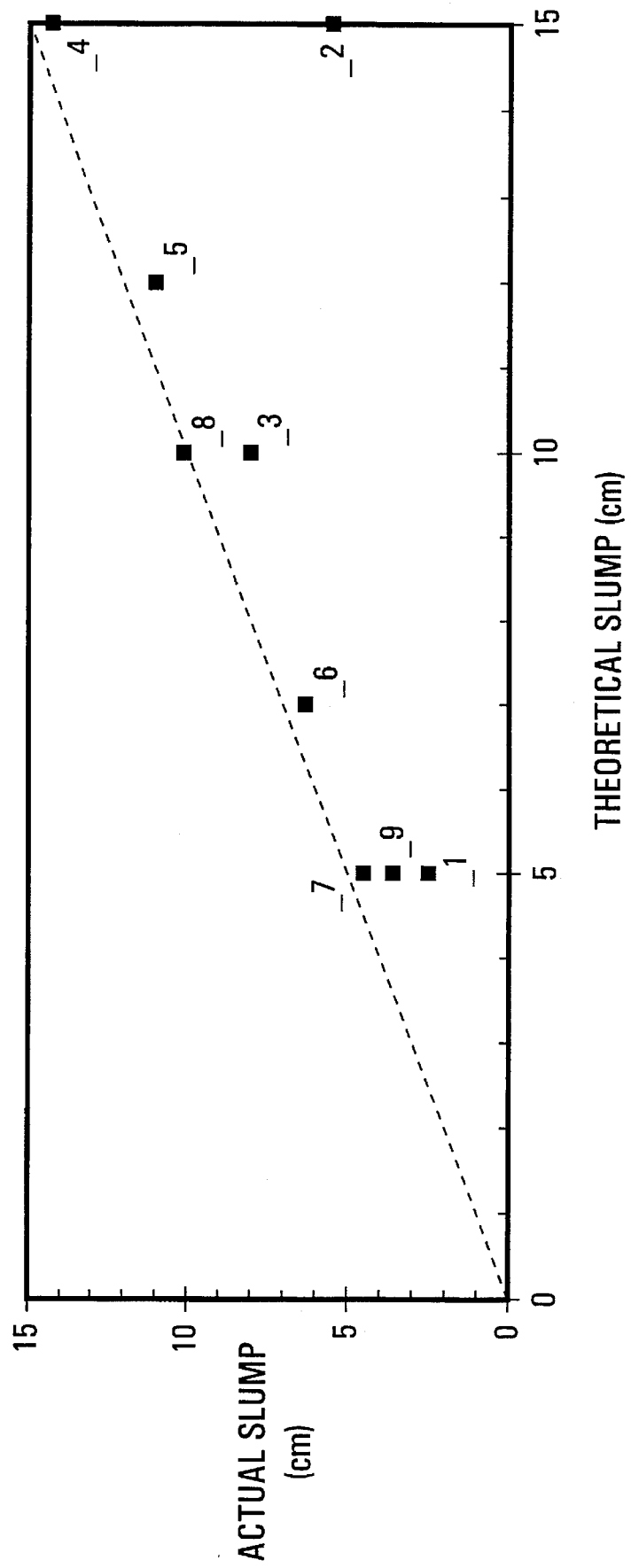
FIG. 17 shows the correlation between the actual slump and the designed slump for the mixtures in Example 2.

The actual measured air content of the first two mixes are plotted as a function of the actual slump in FIG. 16 (marked 1 and 2). Based on the first two points in the graph, the actual air is correlated to the slump according to the following equation:

$$AIR_{actual}=-0.174 \cdot SLUMP+8.770$$

This equation is now used in predicting the actual air content in Step 8.

Following the initial steps to model the actual slump and air content of the concrete, the algorithms and derived models can now be used for a precise estimation of the slump of concrete. Using the same materials as above and estimating the slump and air content of a concrete with a maximum of 50 volume % sand, 2% WRDA-19 and a strength of 35 MPa, the following results were obtained:

| mix | slump | | air | |
|---|---|---|---|---|
| # | estimated | actual | estimated | actual |
| 3 | 12.0 | 12.8 | 6.7 | 9.5 |
| 4 | 10.0 | 11.4 | 8.7 | 9.0 |
| 5 | 5.0 | 4.4 | 7.5 | 7.9 |
| 6 | 15.0 | 15.5 | 9.7 | 10.3 |
| 7 | 10.0 | 11.5 | 8.8 | 9.3 |
| 8 | 8.0 | 7.5 | 8.4 | 8.0 |
| 9 | 6.0 | 4.1 | 7.9 | 7.2 |
| 10 | 7.0 | 6.8 | 8.1 | 7.9 |

Figure 25:
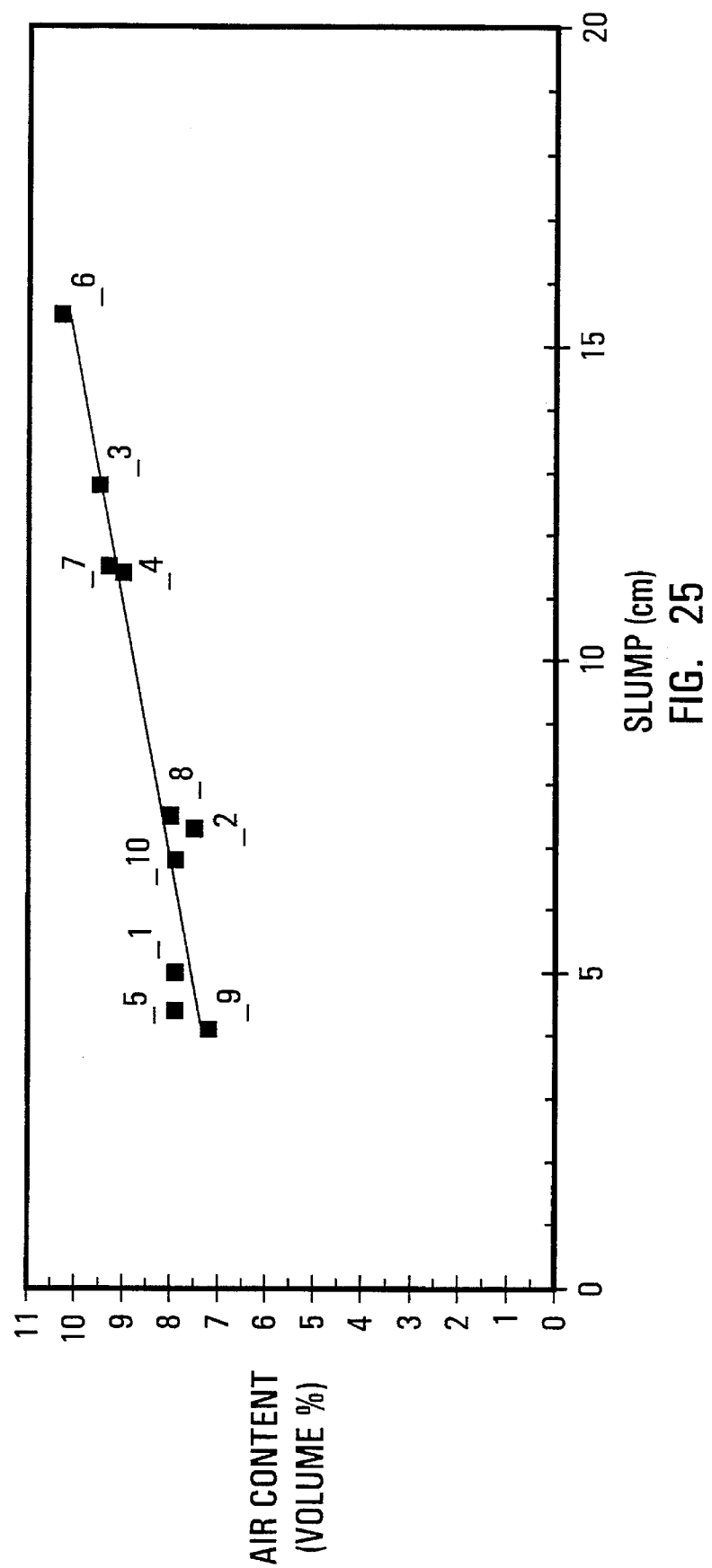
FIG. 25 shows the correlation between the air content and slump for the mixtures in Example 6.
Figure 26:
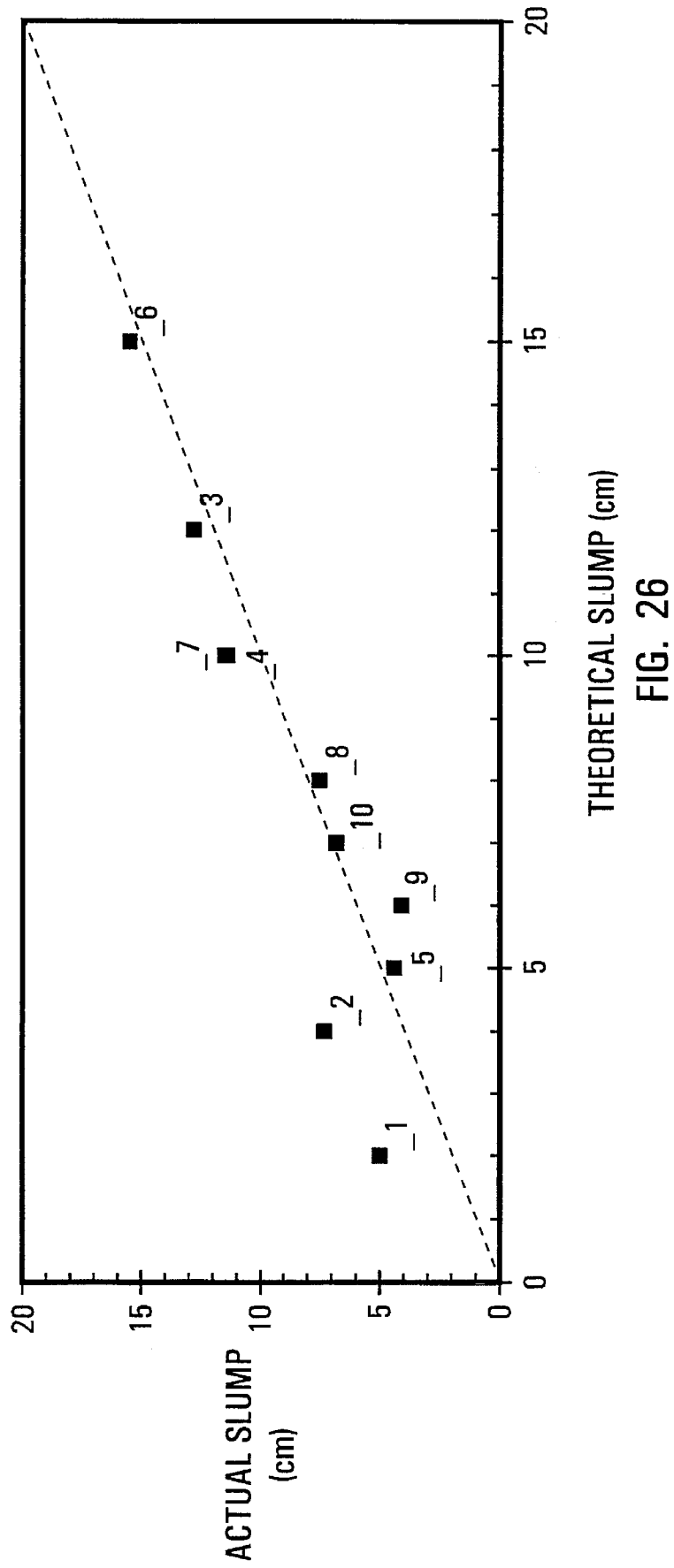
FIG. 26 shows the correlation between the actual slump and the designed slump for the mixtures in Example 6.

After the mixing of each mix, the theoretical water for the actual slump was estimated and plotted in FIG. 24. The increase in the number of points increases the precision in estimating the actual slump. Similarly, the actual air content was plotted in FIG. 25 to increase the precision in estimating the air content. Also shown is a plot of actual slump vs. designed slump in FIG. 26. As can be seen from FIG. 26, the actual slumps fall fairly close to the designed slumps in most of the mixes.

The result is again a concrete (with water reducer) with the correct strength, air content and slump at the lowest materials cost.

EXAMPLE 7

A contractor requested concrete to be transported to a building site with a slump loss of no more than 5.0 cm in a ½ hour period. The concrete was to be of a 35 MPa strength with a slump on site of 10.0 cm.

The concrete was designed according to Example 6, however instead of using a maximum superplasticizer of 2% WRDA-19, a combination of normal water reducer and superplasticizer was used to reduce the slump loss. According to the following mix design, the maximum recommended dosage of 1.0% of normal plasticizer (WRDA-79) was used together with 1.0% of superplasticizer (WRDA-19) which was added to achieve the total maximum design concentration of 2.0%.

| | |
|---|---|
| Cement | 414 kg/m3 |
| WRDA-19 | 4.1 kg/m3 |
| WRDA-77 | 4.1 kg/m3 |
| Sand | 967 kg/m3 |
| Pea gravel | 660 kg/m3 |
| Water | 142 kg/m3 |
| Slump | 15.5 cm |
| Air | 10.3% |

When received on site, within a ½ hour the concrete had a slump of 11.5 cm, which compared to a mix with only superplasticizer which had a slump of 8.5 cm.

The example demonstrates the predictability of the slump behavior with the use of both normal water reducers and high range water reducers.

EXAMPLE 8

A concrete mixture was designed according to the ACI 211.1.89 standard, "Recommended Practice for Selecting Proportions for Normal, Heavyweight and Mass Concrete" for a compressive strength of 25 MPa and a slump of 5 cm. The cost of the materials used was:

| | |
|---|---|
| Cement | 74.96 $/Ton |
| Sand | 5.60 $/Ton |
| Coarse aggregate | 11.02 $/Ton |

The coarse aggregate had a maximum size of 10 mm and the sand a fineness modules of 2.34–2.4.

The following mix was designed according to ACI recommendations:

| | |
|---|---|
| Cement | 330 kg/m$^3$ |
| Sand | 954 kg/m$^3$ |
| Coarse aggregate | 762 kg/m$^3$ |
| Water | 205 kg/m$^3$ |
| Air | 3% |
| Slump | 3–5 cm |
| Price | 38.39 $/m$^3$ |

According to the system described above, the following mix was designed:

| | |
|---|---|
| Cement | 303 kg/m$^3$ |
| Sand | 1192 kg/m$^3$ |
| Coarse aggregate | 573 kg/m$^3$ |
| Water | 195 kg/m$^3$ |
| Air | 4.0% |
| Slump | 4.7 cm |
| Price | 35.60 $/m$^3$ |

The slump, air and strength results are actual tested results.

As demonstrated, the advantage of using the described method over the ACI standard is that the actual slump and strength is accomplished while simultaneously incurring a cost savings of 2.79 $/m$^3$.

EXAMPLE 9

A concrete mixture was designed according to the ACI 211.1.89 standard, "Recommended Practice for Selecting Proportions for Normal, Heavyweight and Mass Concrete" for a compressive strength of 25 MPa and a slump of 10 cm. The cost of materials used was:

| | |
|---|---|
| Cement | 74.96 $/Ton |
| Sand | 5.60 $/Ton |
| Coarse aggregate | 11.02 $/Ton |

The coarse aggregate has a maximum size of 10 mm and the sand a fineness modules of 2.34 2.4.

The following mix was designed according to ACI recommendations:

| | |
|---|---|
| Cement | 362 kg/m$^3$ |
| Sand | 875 kg/m$^3$ |
| Coarse aggregate | 762 kg/m$^3$ |
| Water | 225 kg/m$^3$ |
| Air | 3% |
| Slump | 8–10 cm |
| Price | 40.35 $/m$^3$ |

According to the system described above, the following mix was designed:

| | |
|---|---|
| Cement | 312 kg/m$^3$ |
| Sand | 1174 kg/m$^3$ |
| Coarse aggregate | 565 kg/m$^3$ |
| Water | 212 kg/m$^3$ |
| Air | 4.3% |
| Slump | 11.2 cm |
| Price | 36.11 $/m$^3$ |

The slump, air and strength results are actual tested results.

As demonstrated, the advantage of using the described method over the ACI standard is that the actual slump and strength is accomplished while simultaneously incurring a cost savings of 4.24 $/m$^3$.

EXAMPLE 10

A concrete mixture was designed according to the ACI 211.1.89 standard, "Recommended Practice for Selecting Proportions for Normal, Heavyweight and Mass Concrete" for a compressive strength of 25 MPa and a slump of 15 cm. The cost of materials used was:

| | |
|---|---|
| Cement | 74.96 $/Ton |
| Sand | 5.60 $/Ton |
| Coarse aggregate | 11.02 $/Ton |

The coarse aggregate has a maximum size of 10 mm and the sand a fineness modules of 2.34—2.4.

The following mix was designed:

| | |
|---|---|
| Cement | 387 kg/m$^3$ |
| Sand | 816 kg/m$^3$ |
| Coarse aggregate | 762 kg/m$^3$ |
| Water | 240 kg/m$^3$ |
| Air | 3.0% |
| Slump | 15–18 cm |
| Price | 41.90 $/m$^3$ |

According to the algorithms described above, the following mix was designed:

| | |
|---|---|
| Cement | 303 kg/m$^3$ |
| Sand | 1192 kg/m$^3$ |
| Coarse aggregate | 573 kg/m$^3$ |
| Water | 195 kg/m$^3$ |
| Air | 4.0% |
| Slump | 4.7 cm |
| Price | 35.6 $/m$^3$ |

The slump, air and strength results are actual tested results.

As demonstrated, the advantage of using the described method over the ACI standard is that the actual slump and strength is accomplished while simultaneously incurring a cost savings of 6.30 $/m$^3$.

EXAMPLE 11

A ready mix concrete plant was producing a pumpable pea gravel foundation mix with a slump of 10 cm and a compressive strength of 13.8 MPa with the following mix design:

| | |
|---|---|
| Cement | 329 kg/m$^3$ |
| Sand | 1224 kg/m$^3$ |
| Pea gravel | 530 kg/m$^3$ |
| Water | 214 kg/m$^3$ |
| Cost | 37.24 $/m$^3$ |

The concrete was redesigned according to the above system for a slump of 10 cm and a strength of 16.6 MPa. The strength was slightly over designed as a safety precaution.

| | |
|---|---|
| Cement | 242 kg/m$^3$ |
| Sand | 1165 kg/m$^3$ |
| Pea Gravel | 602 kg/m$^3$ |
| Water | 234 kg/m$^3$ |
| Cost | 31.20 $/m$^3$ |

With the design approach, $6.04 was saved per m$^3$ of concrete.

EXAMPLE 12

A ready mix concrete plant was producing a pumpable pea gravel foundation mix with a slump of 10 cm and a compressive strength of 17.2 MPa with the following mix design:

| | |
|---|---|
| Cement | 368 kg/m$^3$ |
| Sand | 1205 kg/m$^3$ |
| Pea gravel | 517 kg/m$^3$ |
| Water | 214 kg/m$^3$ |
| Cost | 39.93 $/m$^3$ |

The concrete was designed according to the above system for a slump of 10 cm and a strength of 20.0 MPa (an increase of 2.8 MPa). The strength was slightly over designed as a safety precaution.

| | |
|---|---|
| Cement | 277 kg/m$^3$ |
| Sand | 1172 kg/m$^3$ |
| Pea Gravel | 574 kg/m$^3$ |
| Water | 231 kg/m$^3$ |
| Cost | 33.60 $/m$^3$ |

With the design approach, $6.33 was saved per m³ of concrete as well as assuring a good quality of concrete.

EXAMPLE 13

A ready mix concrete plant was producing a pumpable pea gravel foundation mix with a slump of 10 cm and a compressive strength of 20.7 MPa with the following mix design:

| | |
|---|---|
| Cement | 368 kg/m³ |
| Sand | 1188 kg/m³ |
| Coarse aggregate | 513 kg/m³ |
| Water | 214 kg/m³ |
| Air | 1.5% |
| Price | 41.73 $/m³ |

The concrete was redesigned according to the above system for a slump of 10 cm and a strength of 23.5 MPa. The strength was slightly over designed as a safety precaution.

| | |
|---|---|
| Cement | 307 kg/m³ |
| Sand | 1177 kg/m³ |
| Coarse aggregate | 547 kg/m³ |
| Water | 229 kg/m³ |
| Air | 1.5% |
| Price | 35.57 $/m³ |

With the design approach, $6.16 was saved per m³ of concrete as well as assuring a good quality of concrete.

EXAMPLE 14

A ready mix concrete plant was producing a 1" rock mix with a slump of 10 cm and a compressive strength of 13.8 19 MPa. The typical mix was:

| | |
|---|---|
| Cement | 265 kg/m³ |
| Sand | 820 kg/m³ |
| Rock | 972 kg/m³ |
| Water | 211 kg/m³ |
| Air | 1.5% |
| Price | 35.18 $/m³ |

The following mix was designed using the system described above with a slump of 10 cm and a compressive strength of 16.6 MPa. The strength was slightly over designed as a safety precaution.

| | |
|---|---|
| Cement | 224 kg/m³ |
| Sand | 1203 kg/m³ |
| Rock | 642 kg/m³ |
| Water | 210 kg/m³ |
| Air | 1.5% |
| Price | 32.00 $/m³ |

With the design approach, $3.18 was saved per m³ of concrete as well as assuring a good quality of concrete.

EXAMPLE 15

A ready mix concrete plant was producing a 1" rock mix with a slump of 10 cm and a compressive strength of 17.2 MPa. The typical mix was:

| | |
|---|---|
| Cement | 294 kg/m³ |
| Sand | 814 kg/m³ |
| Rock | 968 kg/m³ |
| Water | 206 kg/m³ |
| Air | 1.5% |
| Price | 37.08 $/m³ |

The following mix was designed using the algorithms described above with a slump of 10 cm and a compressive strength of 20.0 MPa. The strength was slightly over designed as a safety precaution.

| | |
|---|---|
| Cement | 252 kg/m³ |
| Sand | 1211 kg/m³ |
| Rock | 615 kg/m³ |
| Water | 208 kg/m³ |
| Air | 1.5% |
| Price | 33.59 $/m³ |

With the design approach, $3.49 was saved per m³ of concrete as well as assuring a good quality of concrete.

EXAMPLE 16

A ready mix concrete plant was producing a 1" rock mix with a slump of 10 cm and a compressive strength of 20.7 MPa. The typical mix was:

| | |
|---|---|
| Cement | 323 kg/m³ |
| Sand | 810 kg/m³ |
| Rock | 962 kg/m³ |
| Water | 200 kg/m³ |
| Air | 1.5% |
| Price | 39.24 $/m³ |

The following mix was designed using the system described above with a slump of 10 cm and a compressive strength of 23.5 MPa. The strength was slightly over designed as a safety precaution.

| | |
|---|---|
| Cement | 276 kg/m³ |
| Sand | 1204 kg/m³ |
| Rock | 611 kg/m³ |
| Water | 204 kg/m³ |
| Air | 1.5% |
| Price | 35.18 $/m³ |

With the design approach, $4.06 was saved per m³ of concrete as well as assuring a good quality of concrete.

EXAMPLE 17

A ready mix concrete plant was producing a 1" rock mix with a slump of 10 cm and a compressive strength of 27.6 MPa. The typical mix was:

| | |
|---|---|
| Cement | 376 kg/m³ |
| Sand | 783 kg/m³ |
| Rock | 936 kg/m³ |
| Water | 204 kg/m³ |
| Air | 1.5% |
| Price | 42.99 $/m³ |

The following mix was designed using the system described above with a slump of 10 cm and a compressive strength of 30.4 MPa. The strength was slightly over designed as a safety precaution.

| | |
|---|---|
| Cement | 336 kg/m³ |
| Sand | 1168 kg/m³ |
| Rock | 593 kg/m³ |
| Water | 207 kg/m³ |
| Air | 1.5% |
| Price | 38.04 $/m³ |

With the design approach, $4.95 was saved per m³ of concrete as well as assuring a good quality of concrete.

EXAMPLE 18

In conventional concrete batching, the weighing of the individual components has become more and more precise. Using state of the art equipment, the amount of water today can be weighed with a precision of 1 liter of water per m³. However, when recording the slump, large variations are observed from batch to batch of concrete even though all components are weighed very precisely. If too low a slump is recorded then more water is typically added, resulting in too high a water-to-cement ratio and hence, an uncontrolled decrease in the compressive strength. If however, too high a slump is recorded then excessive bleeding and/or segregation may lead to detrimental internal defects and an overall low quality of concrete.

Figure 27:
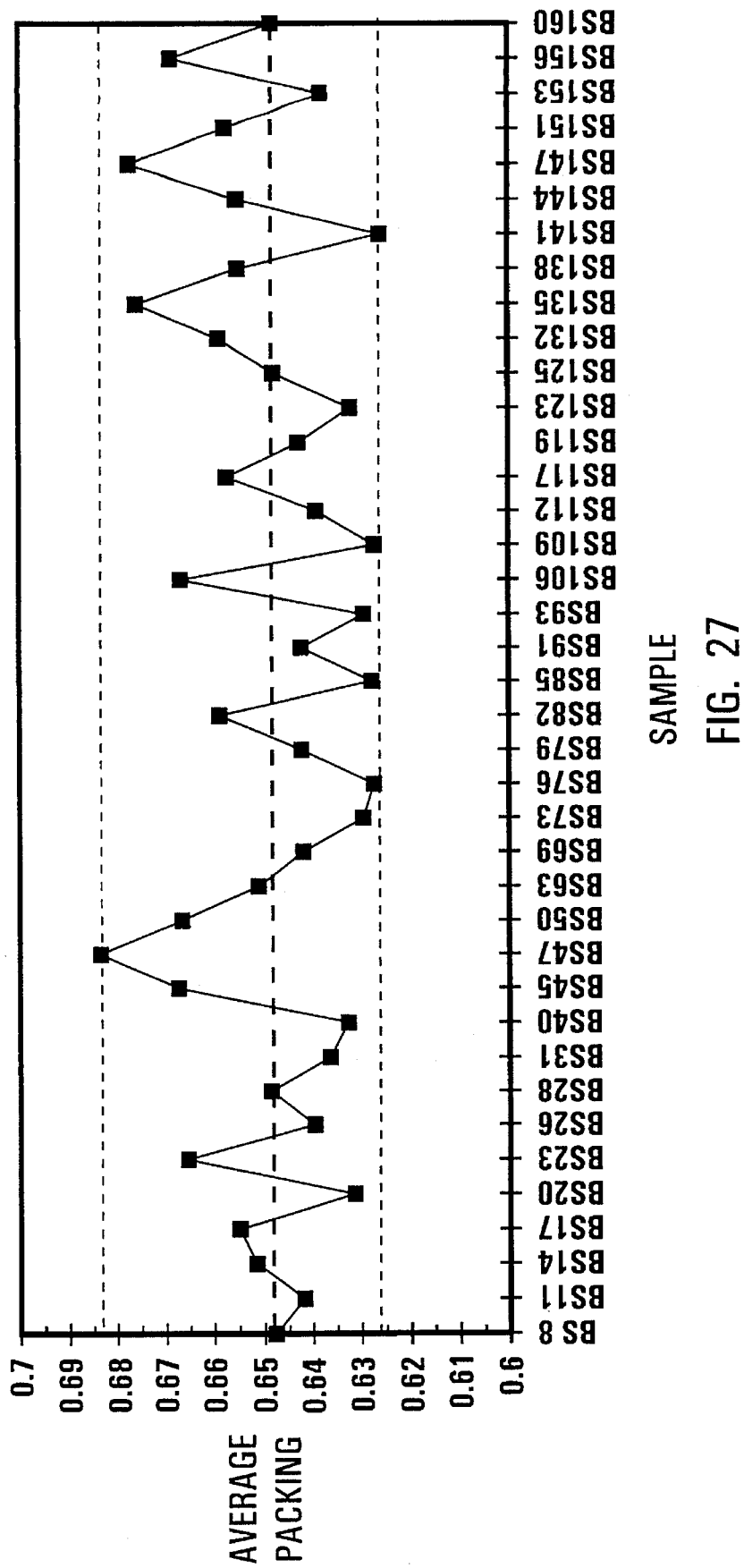
FIG. 27 shows the packing density for the pea gravel of Example 18.
Figure 28:
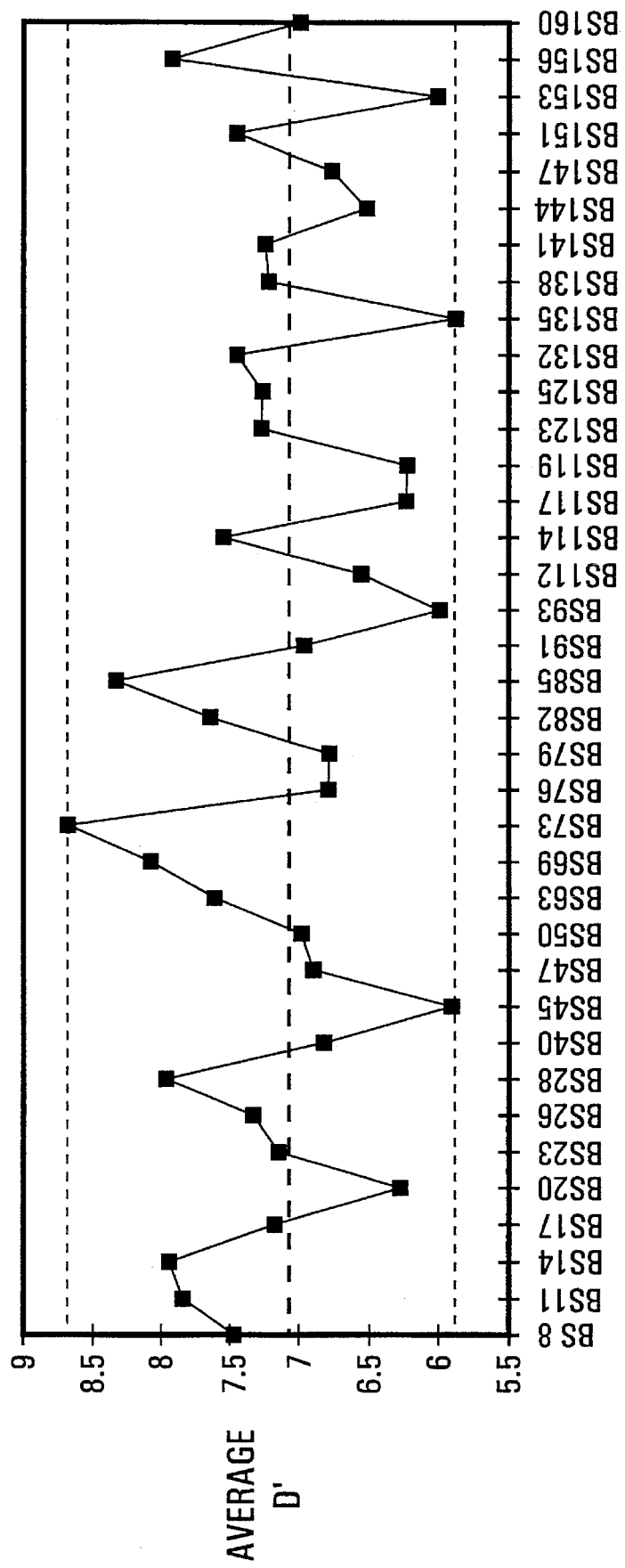
FIG. 28 shows the average diameter of the pea gravel in Example 18.

Series of tests at a ready mix plant have shown that the average particle size, d', and packing density, $\phi$, has a large variation. FIG. 27 shows the packing density for a pea gravel tested once per day. The figure shows lines indicating the average, the minimum and the maximum packing densities. FIG. 28 shows the d' of the same samples of pea gravel as shown in FIG. 27. Again the average, minimum and maximum d' is shown by lines in the figure. Based on FIG. 18 and FIG. 19, it can be concluded that the observed variations in the pea gravel are large and account for the observed variations in slump in the production. The results indicate the need for a continuous control of the materials variation to improve the overall concrete quality.

EXAMPLE 19

Figure 29:
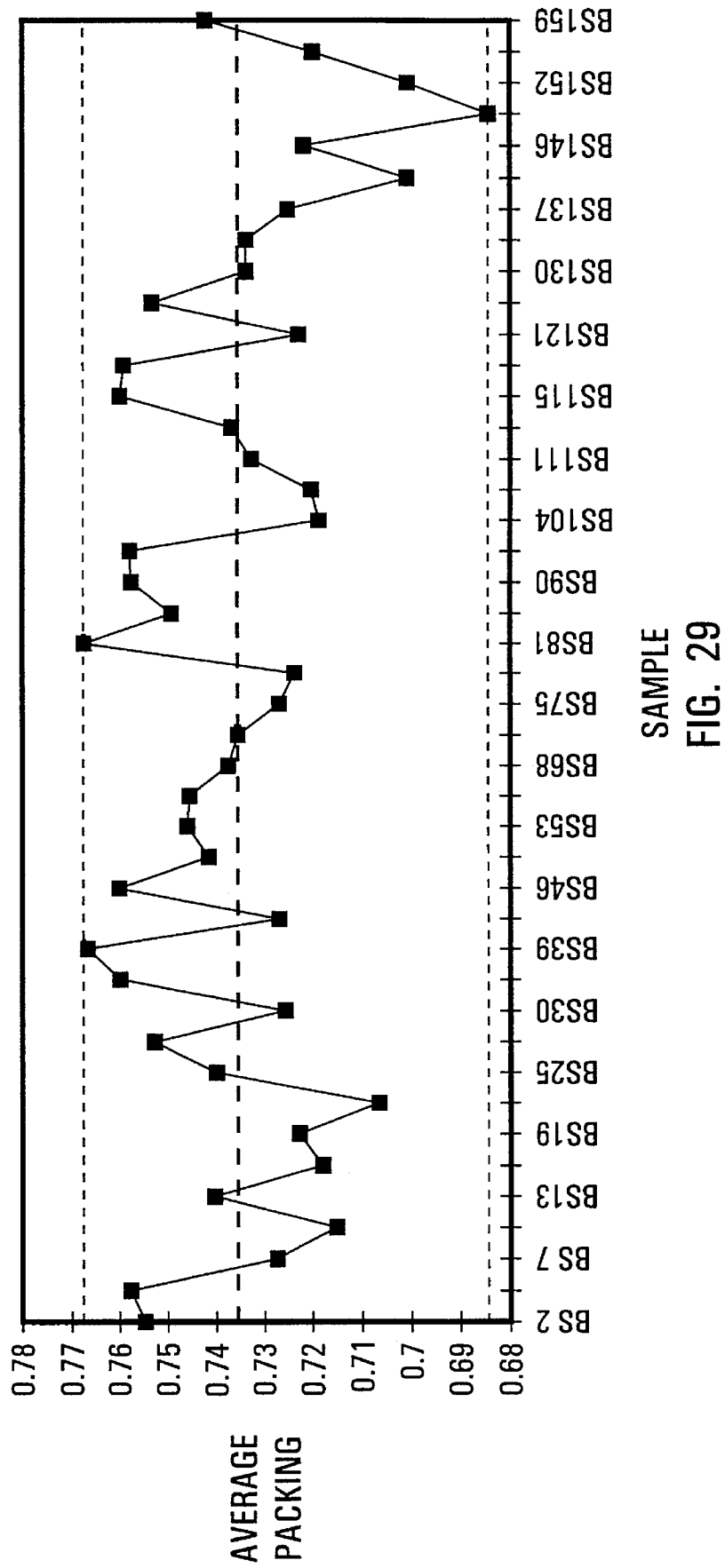
FIG. 29 shows the packing density for the sand in Example 19.
Figure 30:
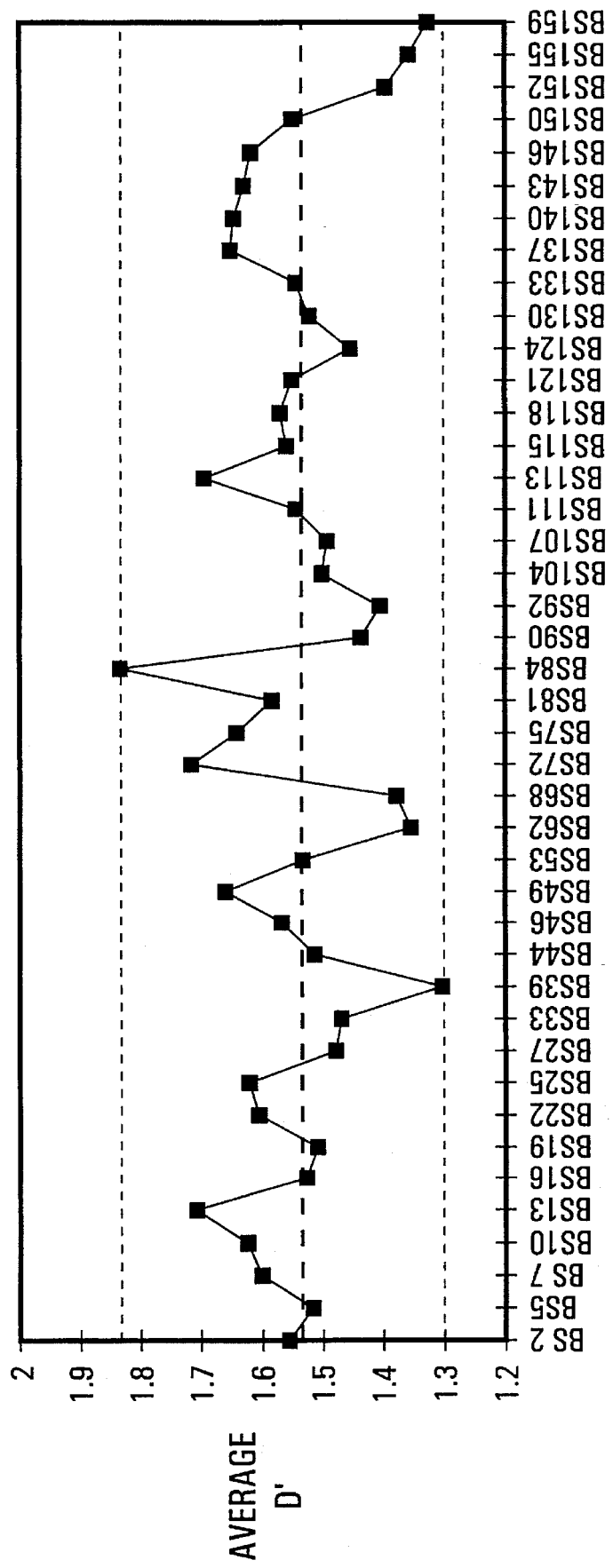
FIG. 30 shows the average diameter of the sand in Example 19.

Similar to Example 18, the variations were tested from day to day for a typical sand. The results are shown in FIGS. 29 and 30. As can be seen from the figures, large variations were found in both d' and the packing density.

The results indicate the need for a continuous control of the materials variation to improve the overall concrete quality.

EXAMPLE 20

Figure 31:
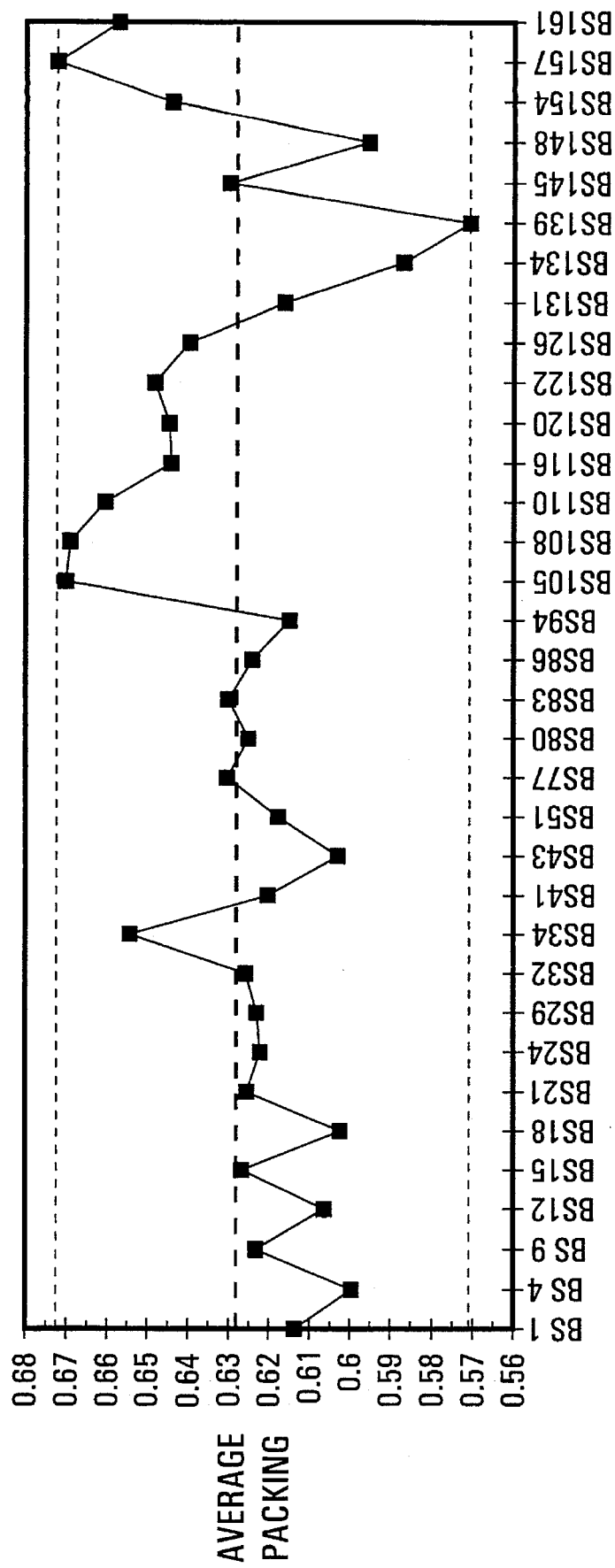
FIG. 31 shows the packing density for a typical 1" rock of Example 20.
Figure 32:
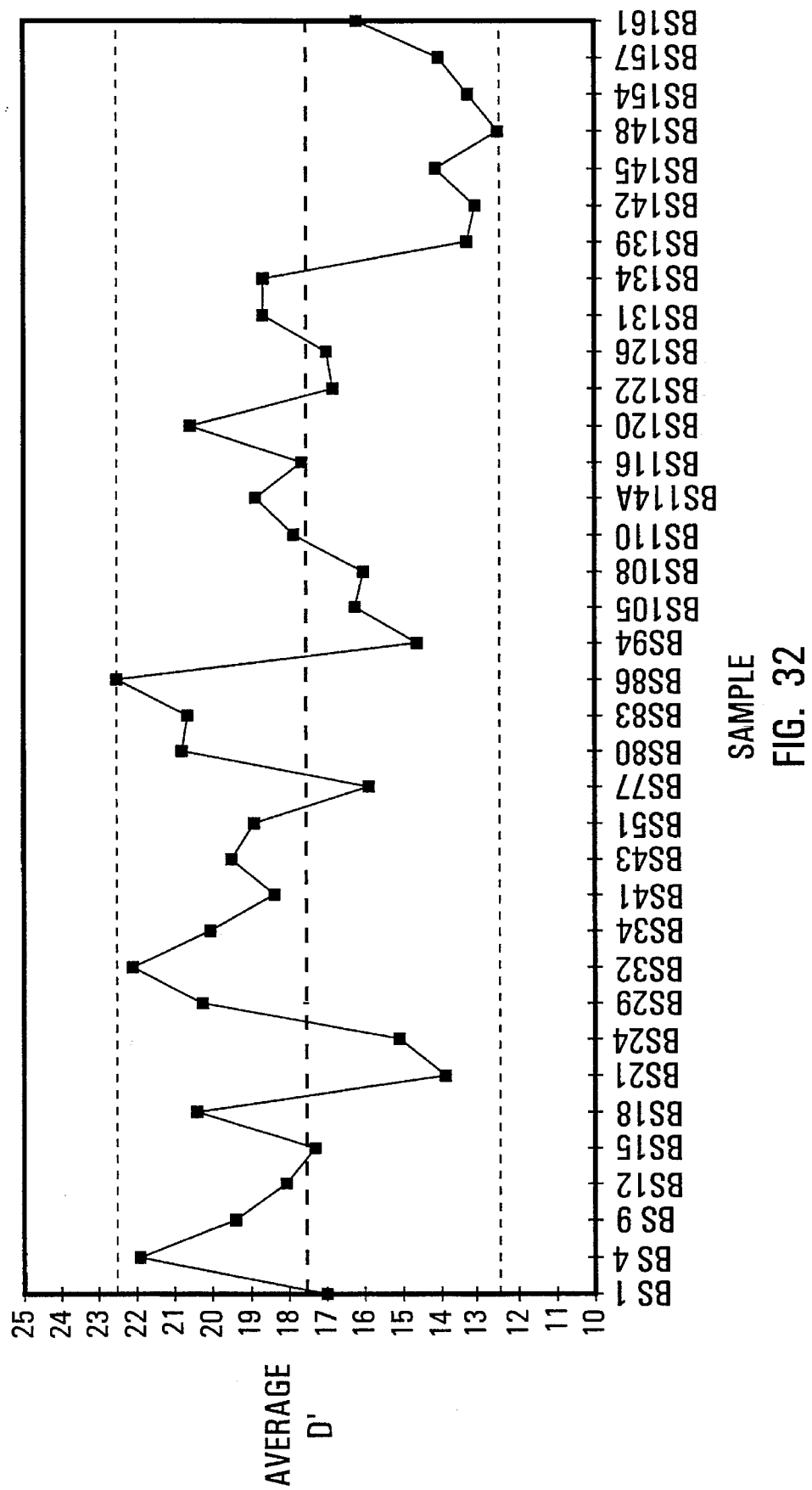
FIG. 32 shows the average diameter of a typical 1" rock in Example 20.

Similar to Example 19, the variations were tested from day to day for a typical 1" rock. The results are shown in FIGS. 31 and 32. As can be seen from the figures, large variations were found in both d' and the packing density.

The results indicate the need for a continuous control of the materials variation to improve the overall concrete quality.

EXAMPLE 21

The materials variations shown in Examples 18, 19, and 20 have been found to have a dramatic effect on the slump of the actual concrete and therefore also on the necessary amount of water to be added for a given slump and the necessary cement content for a given strength.

In designing the pea gravel mix discussed in Example 11, it was found that if the sand and pea gravel are combined according to the variation shown in FIGS. 27–32, that is combining the highest and lowest packing of the two components, then the designed concrete with a 10 cm slump and a strength of 13.8 MPa would cost:

| | |
|---|---|
| Worst Packing | 32.17 $/m³ |
| Savings Compared to Normal Mix | 5.07 $/m³ |
| Best Packing | 30.47 $/m³ |
| Savings Compared to Normal Mix | 6.77 $/m³ |

The results indicate the economic incentives of designing the concrete with control of the materials properties.

EXAMPLE 22

The materials variations shown in Examples 18, 19 and 20 have been found to have a dramatic effect on the slump of the actual concrete and therefore also on the necessary amount of water to be added for a given slump and hence also on the necessary cement content for a given strength.

In designing the pea gravel mix discussed in Example 12, it was found that if the sand and pea gravel are combined according to the variation shown in FIGS. 27–32, that is combining the highest and lowest packing of the two components, then the designed concrete with a 10 cm slump and a strength of 17.2 MPa would cost:

| | |
|---|---|
| Worst Packing | 34.25 $/m³ |
| Savings Compared to Normal Mix | 5.68 $/m³ |
| Best Packing | 32.16 $/m³ |
| Savings Compared to Normal Mix | 7.77 $/m³ |

The results indicate the economic incentives of designing the concrete with control of the materials properties.

EXAMPLE 23

The materials variations shown in Examples 18, 19 and 20 have been found to have a dramatic effect on the slump of the actual concrete and therefore also on the necessary amount of water to be added for a given slump and hence also on the necessary cement content for a given strength.

In designing the pea gravel mix discussed in Example 13, it was found that if the sand and pea gravel are combined according to the variation shown in FIGS. 27–32, that is combining the highest and lowest packing of the two components, then the designed concrete with a 10 cm slump and a strength of 20.7 MPa would cost:

| | |
|---|---|
| Worst Packing | 36.19 $/m³ |
| Savings Compared to Normal Mix | 5.54 $/m³ |
| Best Packing | 33.78 $/m³ |
| Savings Compared to Normal Mix | 7.95 $/m³ |

The results indicate the economic incentives of designing the concrete with control of the materials properties.

EXAMPLE 24

The materials variations shown in Examples 18, 19 and 20 have been found to have a dramatic effect on the slump of the actual concrete and therefore also on the necessary amount of water to be added for a given slump and hence also on the necessary cement content for a given strength.

In designing the 1" rock mix discussed in Example 14, it was found that if the sand and rock are combined according to the variation shown in FIGS. 27–32, that is combining the highest and lowest packing of the two components, then the designed concrete with a 10 cm slump and a strength of 13.8 MPa would cost:

| Worst Packing | 32.70 $/m$^3$ |
|---|---|
| Savings Compared to Normal Mix | 2.48 $/m$^3$ |
| Best Packing | 31.74 $/m$^3$ |
| Savings Compared to Normal Mix | 3.44 $/m$^3$ |

The results indicate the economic incentives of designing the concrete with control of the materials properties.

EXAMPLE 25

The materials variations shown in Examples 18, 19 and 20 have been found to have a dramatic effect on the slump of the actual concrete and therefore also on the necessary amount of water to be added for a given slump and hence also on the necessary cement content for a given strength.

In designing the 1" rock mix discussed in Example 15, it was found that if the sand and rock are combined according to the variation shown in FIGS. 27–32, that is combining the highest and lowest packing of the two components, then the designed concrete with a 10 cm slump and a strength of 17.2 MPa would cost:

| Worst Packing | 34.40 $/m$^3$ |
|---|---|
| Savings Compared to Normal Mix | 2.68 $/m$^3$ |
| Best Packing | 33.34 $/m$^3$ |
| Savings Compared to Normal Mix | 3.74 $/m$^3$ |

The results indicate the economic incentives of designing the concrete with control of the materials properties.

EXAMPLE 26

The materials variations shown in Examples 18, 19 and 20 have been found to have a dramatic effect on the slump of the actual concrete and therefore also on the necessary amount of water to be added for a given slump and hence also on the necessary cement content for a given strength.

In designing the 1" rock mix discussed in Example 16, it was found that if the sand and rock are combined according to the variation shown in FIGS. 27–32, that is combining the highest and lowest packing of the two components, then the designed concrete with a 10 cm slump and a strength of 20.7 MPa would cost:

| Worst Packing | 36.10 $/m$^3$ |
|---|---|
| Savings Compared to Normal Mix | 3.14 $/m$^3$ |
| Best Packing | 34.82 $/m$^3$ |
| Savings Compared to Normal Mix | 4.42 $/m$^3$ |

The results indicate the economic incentives of designing the concrete with control of the materials properties.

EXAMPLE 27

The materials variations shown in Examples 18, 19 and 20 have been found to have a dramatic effect on the slump of the actual concrete and therefore also on the necessary amount of water to be added for a given slump and hence also on the necessary cement content for a given strength.

In designing the 1" rock mix discussed in Example 17, it was found that if the sand and rock are combined according to the variation shown in FIGS. 27–32, that is combining the highest and lowest packing of the two components, then the designed concrete with a 10 cm slump and a strength of 27.6 MPa would cost:

| Worst Packing | 39.17 $/m$^3$ |
|---|---|
| Savings Compared to Normal Mix | 3.82 $/m$^3$ |
| Best Packing | 37.58 $/m$^3$ |
| Savings Compared to Normal Mix | 5.41 $/m$^3$ |

The results indicate the economic incentives of designing the concrete with control of the materials properties.

EXAMPLE 28

The results disclosed in Examples 21–27 have demonstrated that an on-line monitoring of the variations of d' and the packing density of concrete materials have shown:
More consistent flow properties
More consistent strength properties
More consistent concrete quality
A reduction of materials costs
The results have shown that a dynamic mix design which changes when the materials change, presents a new way to design concrete. In this way the optimal concrete properties are guaranteed as the materials vary.

EXAMPLE 29

The concretes designed with different slumps in Examples 1 to 7 showed excellent cohesion and no visible signs of bleeding or segregation characteristics.

EXAMPLE 30

The concretes designed in Examples 8–10 had good cohesiveness and showed negligible bleeding and segregation when compared to the ACI recommended mix designs.

EXAMPLE 31

The concretes designed in Examples 11–17 showed good cohesiveness and negligible bleeding and segregation when compared to the normal mix designs at the ready mix plant.

EXAMPLE 32

Three types of coarse aggregates: granite in the range of 2–8 mm, granite in the range of 8–16 mm, and granite in the range of 16–32 mm, were to be used for a concrete bridge construction with high durability and an expected life span of 100 years. For this reason the porosity had to be minimized and the concrete had to be workable at the minimum water content.

The aggregates were therefore packing optimized to increase the workability of the concrete. The aggregates had the following packing densities and average particle sizes:

| | | d' | φ |
|---|---|---|---|
| Granite | 2–8 mm | 6.0 mm | 0.601 |
| Granite | 8–16 mm | 13.6 mm | 0.598 |
| Granite | 16–32 mm | 24.7 mm | 0.614 |

Figure 33:
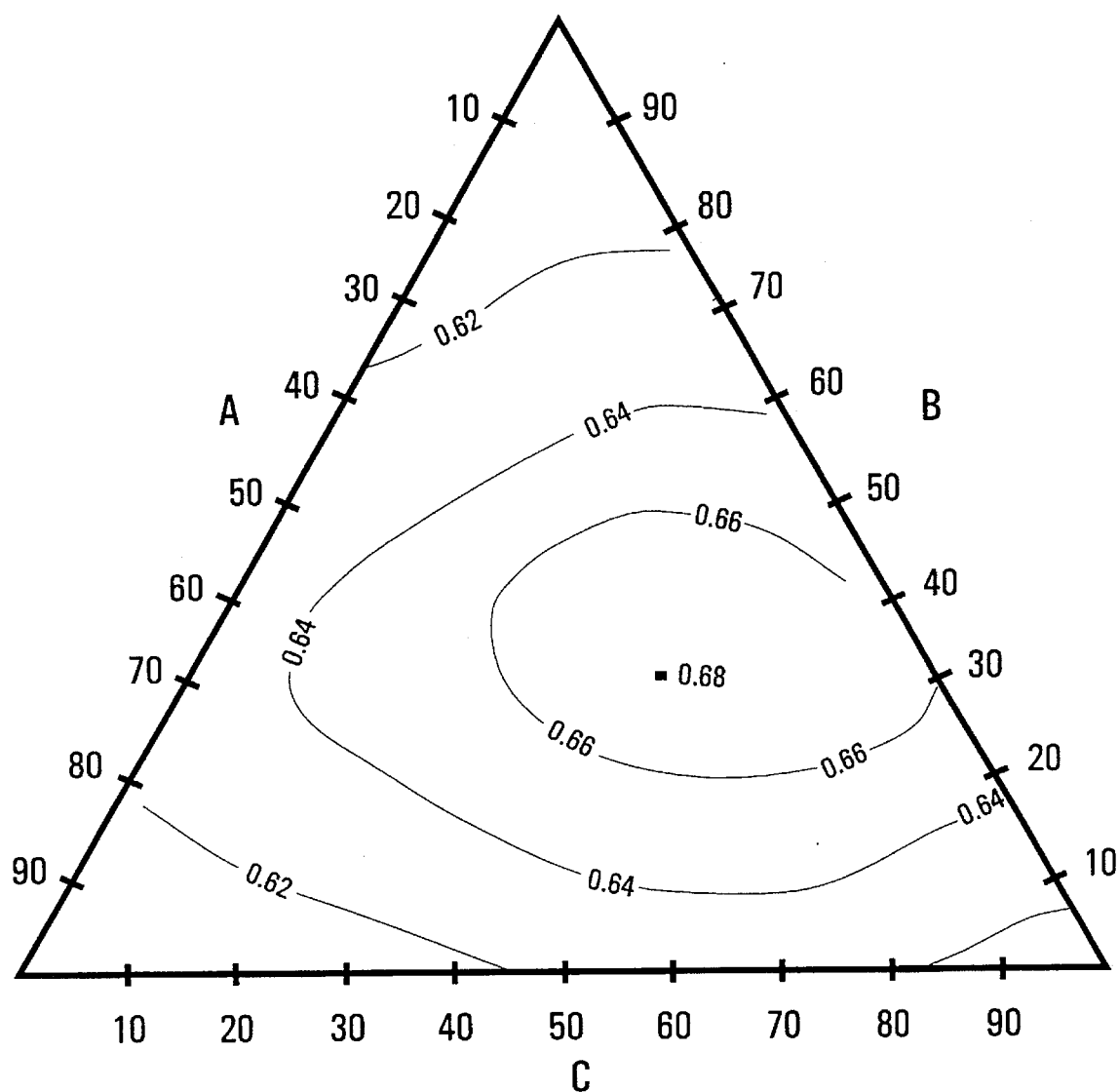
FIG. 33 is a packing density chart for three coarse aggregates of Example 32.

The estimated packing of the three coarse aggregates is illustrated in FIG. 33. As can seen from the figure, the maximum packing is 0.68, which was obtained with the following composition:

| Aggregate | 2–8 mm | 30 vol. % |
| Aggregate | 8–16 mm | 25 vol. % |
| Aggregate | 16–32 mm | 45 vol. % |

With the optimal combination of the aggregates a very workable concrete was obtained within the contractor's specifications with the result that the amount of superplasticizers, as compared to the amount used in the normal mix design by the contractor, could be reduced equivalent to a cost savings of about $400,000.00.

IV. SUMMARY

From the foregoing, it will be appreciated that the present invention provides novel processes and manufacturing techniques for consistently and predictably producing uniform cementitious compositions and products which can be assured to meet predetermined quality characteristics and to meet predetermined performance criteria.

The present invention also provides consistent and predictable novel cementitious composition and products which would meet the predetermined design and performance criteria while minimizing the need to overdesign the cementitious materials and thereby minimizing the cost of manufacture.

The present invention also provides methods to produce consistently and predictably such uniform cementitious compositions and products even though feedstocks (e.g., cement, sand, gravel, aggregates, water, and admixtures) having variable qualities and attributes are utilized.

The present invention also provides novel compositions and processes for producing cementitious compositions and products being assured that the resultant product was such that the truck driver would not need to modify the mix specifications.

Also, the present invention provides methods to produce cementitious compositions and products that have sufficient durability for their intended use.

Further, the present invention provides novel processes for designing concrete such that the cementitious compositions meet the required strength, slump, and durability characteristics.

The present invention also provides novel compositions and processes for designing concrete such that trial and error approximation is eliminated.

Even more, the present invention provides novel compositions and processes for designing concrete such that the mix design for a certain concrete having a variety of components and admixtures will be known to be optimal and at the same time the most cost effective.

Finally, the present invention provides novel processes for modifying in "real time" the manufacturing processes of cementitious compositions and products in response to changes on site of the feedstock materials.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced with their scope.

What is claimed and desired to be secured by United States Letters Patent is:

1. A method for designing a cementitious mixture by means of a computer-implemented design optimization process without trial and error testing of a final hydrated cementitious mixture, the method comprising the steps of:

(a) providing a batch of hydraulic cement and a batch of aggregate to be mixed together to form a final hydrated cementitious mixture, the batch of hydraulic cement including a plurality of individual particles having an average diameter particle size and a particle packing density and the batch of aggregate including a plurality of individual particles having an average diameter particle size and a particle packing density;

(b) selecting a target slump for the final hydrated cementitious mixture prior to hardening and a target strength for the final hydrated cementitious mixture after curing and thereafter inputting to a central processing unit (CPU) the target slump and target strength;

(c) measuring the average diameter particle size of the individual particles in the batch of hydraulic cement and thereafter inputting to the CPU the average diameter particle size of the individual particles in the batch of hydraulic cement;

(d) measuring the particle packing density of the batch of hydraulic cement and thereafter inputting to the CPU the particle packing density of the batch of hydraulic cement;

(e) measuring the average diameter particle size of the individual particles in the batch of aggregate and thereafter inputting to the CPU the average diameter particle size of the individual particles in the batch of aggregate;

(f) measuring the particle packing density of the batch of aggregate and thereafter inputting to the CPU the particle packing density of the batch of aggregate;

(g) designing a dry cementitious mixture from the batch of hydraulic cement and batch of aggregate, the dry cementitious mixture having a concentration ratio of hydraulic cement and aggregate, and thereafter inputting to the CPU the concentration ratio of hydraulic cement and aggregate in the dry cementitious mixture;

(h) the CPU calculating the particle packing density of the designed dry cementitious mixture based on:

(1) the average diameter particle size of the individual particles in the batch of hydraulic cement;

(2) the particle packing density of the batch of hydraulic cement;

(3) the average diameter particle size of the individual particles in the batch of aggregate;

(4) the particle packing density of the batch of aggregate; and (5) the concentration ratio of hydraulic cement and aggregate in the designed dry cementitious mixture;

(i) the CPU calculating, based on the particle packing density of the designed dry cementitious mixture, an amount of water that when mixed with the designed dry cementitious mixture yields a designed hydrated cementitious mixture having the target slump;

(j) the CPU calculating, based on the amount of water calculated in step (i), a calculated strength for the designed hydrated cementitious mixture after curing;

(k) the CPU calculating the difference between the calculated strength for the designed hydrated cementitious mixture after curing and the target strength; and (l) the CPU altering the concentration ratio of hydraulic cement and aggregate in the designed dry cementitious mixture in order to design one or more subsequently designed dry cementitious mixtures and then repeating steps (h)–(k) for each of the one or more subsequently designed dry cementitious mixtures in order to identify one or more optimally designed hydrated cementitious mixtures having a strength after curing within an acceptable range of deviation with respect to the target strength.

2. A method for designing a cementitious mixture as defined in claim 1, the CPU altering the concentration ratio of hydraulic cement and aggregate in a manner such that when designing each of the one or more subsequently designed dry cementitious mixtures in step (l) the difference between the target strength and the strength calculated in each subsequent iteration of step (k) would be predicted to be less than the difference between the target strength and the strength calculated in each immediately previous iteration of step (k).

3. A method for designing a cementitious mixture as defined in claim 1, further including the step of mixing together water and at least a portion of the batch of hydraulic cement and of the batch of aggregate in order to yield a final hydrated cementitious mixture in which the concentration ratio of the hydraulic cement and aggregate is substantially similar to the concentration ratio of hydraulic cement and aggregate in at least one of the one or more optimally designed hydrated cementitious mixtures identified in claim 1.

4. A method for designing a cementitious mixture as defined in claim 1, further including the step of mixing together at least a portion of the batch of hydraulic cement and of the batch of aggregate in order to yield a final dry cementitious mixture in which the concentration ratio of the hydraulic cement and aggregate is substantially similar to the concentration ratio of hydraulic cement and aggregate in at least one of the one or more optimally designed hydrated cementitious mixtures identified in claim 1.

5. A method for designing a cementitious mixture as defined in claim 4, further including the step of mixing water with the final dry cementitious mixture in order to form a final hydrated cementitious mixture having a slump that is substantially similar to the target slump.

6. A method for designing a cementitious mixture as defined in claim 5, the water being included in an amount that is substantially similar to the amount of water calculated by the CPU in step (i) for the designed hydrated cementitious mixture that has a concentration ratio of hydraulic cement and aggregate that most closely corresponds to the concentration ratio of hydraulic cement and aggregate in the final dry cementitious mixture.

7. A method for designing a cementitious mixture as defined in claim 1, wherein the aggregate comprises a fine aggregate.

8. A method for designing a cementitious mixture as defined in claim 7, wherein the fine aggregate includes individual particles having a plurality of diameter particle sizes.

9. A method for designing a cementitious mixture as defined in claim 7, wherein the fine aggregate includes sand.

10. A method for designing a cementitious mixture as defined in claim 7, wherein step (a) further includes providing a batch of coarse aggregate to be mixed into the final hydrated cementitious mixture, the batch of coarse aggregate including a plurality of individual particles having an average diameter particle size and a particle packing density, wherein prior to designing the dry cementitious mixture in step (g) the method further includes the steps of:

A) measuring the average diameter particle size of the individual particles in the batch of coarse aggregate and thereafter inputting to the CPU the average diameter particle size of the individual particles in the batch of coarse aggregate; and B) measuring the particle packing density of the batch of coarse aggregate and thereafter inputting to the CPU the particle packing density of the batch of coarse aggregate, wherein step (g) includes designing the dry cementitious mixture to include at least a portion of the batch of coarse aggregate and thereby have a concentration ratio of hydraulic cement, fine aggregate, and coarse aggregate and thereafter inputting to the CPU the concentration ratio of hydraulic cement, fine aggregate, and coarse aggregate in the designed dry cementitious mixture, and wherein the particle packing density calculated by the CPU in step (h) is further based on:

(1) the average diameter particle size of the individual particles in the batch of coarse aggregate;

(2) the particle packing density of the batch of coarse aggregate; and (3) the concentration ratio of hydraulic cement, fine aggregate, and coarse aggregate in the designed dry cementitious mixture, wherein step (l) includes the CPU altering the concentration ratio of hydraulic cement, fine aggregate, and coarse aggregate in the designed dry cementitious mixture in order to design the one or more subsequently designed dry cementitious mixtures.

11. A method for designing a cementitious mixture as defined in claim 1, wherein the aggregate comprises a coarse aggregate.

12. A method for designing a cementitious mixture as defined in claim 11, wherein the course aggregate includes individual particles having a plurality of diameter particles sizes.

13. A method for designing a cementitious mixture as defined in claim 11, wherein step (a) further includes providing a batch of fine aggregate to be mixed into the final hydrated cementitious mixture, the batch of fine aggregate including a plurality of individual particles having an average diameter particle size and a particle packing density, wherein prior to designing the dry cementitious mixture in step (g) the method further includes the steps of:

A) measuring the average diameter particle size of the individual particles in the batch of fine aggregate and thereafter inputting to the CPU the average diameter particle size of the individual particles in the batch of fine aggregate; and B) measuring the particle packing density of the batch of fine aggregate and thereafter inputting to the CPU the particle packing density of the batch of fine aggregate, wherein step (g) includes designing the dry cementitious mixture to include at least a portion of the batch of fine aggregate and thereby have a concentration ratio of hydraulic cement, fine aggregate, and coarse aggregate and thereafter inputting to the CPU the concentration ratio of hydraulic cement, fine aggregate, and coarse aggregate in the designed dry cementitious mixture, and wherein the particle packing density calculated by the CPU in step (h) is further based on (1) the average diameter particle size of the individual particles in the batch of fine aggregate;

(2) the particle packing density of the batch of fine aggregate; and (3) the concentration ratio of hydraulic cement, fine aggregate, and coarse aggregate in the designed dry cementitious mixture, wherein step (l) includes the CPU altering the concentration ratio of hydraulic cement, fine aggregate, and coarse aggregate in the designed dry cementitious mixture in order to design the one or more subsequently designed dry cementitious mixtures.

14. A method for designing a cementitious mixture as defined in claim 1, wherein the hydraulic cement includes a plurality of different types of hydraulic cement.

15. A method for designing a cementitious mixture as defined in claim 1, wherein the concentration ratio of the hydraulic cement and aggregate is designed in order to maximize the particle packing density of the final hydrated cementitious mixture.

16. A method for designing a cementitious mixture as defined in claim 1, wherein step (g) includes substituting a pozzolan material for a portion of the hydraulic cement when designing the dry cementitious mixture, the calculations by the CPU in steps (i) and (j) being adjusted for the effect of the pozzolan material on the slump and strength, respectively, of the designed hydrated cementitious mixture.

17. A method for designing a cementitious mixture as defined in claim 16, wherein the pozzolan material includes silica fume.

18. A method for designing a cementitious mixture as defined in claim 16, wherein the pozzolan material includes fly ash.

19. A method for designing a cementitious mixture as defined in claim 11, wherein step (g) includes designing the dry cementitious mixture such that a designed hydrated cementitious mixture made therefrom includes a water reducer, the calculations by the CPU in steps (i) and (j) being adjusted for the effect of the water reducer on the slump and strength, respectively, of the designed hydrated cementitious mixture.

20. A method for designing a cementitious mixture as defined in claim 1, wherein step (g) includes substituting a filler for a portion of the hydraulic cement when designing the dry cementitious mixture, the designed dry cementitious mixture thereby having an initial concentration ratio of hydraulic cement, aggregate, and filler, the calculation by the CPU in step (h) being adjusted for the effect of the filler on the particle packing density of the designed dry cementitious mixture.

21. A method for designing a cementitious mixture as defined in claim 1, further including the step of the CPU calculating, based on the amount of water calculated in step (i) and the concentration ratio of hydraulic cement and aggregate for the designed hydrated cementitious mixture, a calculated durability for the designed hydrated cementitious mixture after curing.

22. A method for designing a cementitious mixture as defined in claim 1, wherein the final hydrated cementitious mixture comprises a mortar.

23. A method for designing a cementitious mixture as defined in claim 1, wherein the final hydrated cementitious mixture comprises a plaster.

24. A method for designing a cementitious mixture as defined in claim 1, wherein the final hydrated cementitious mixture comprises concrete.

25. A method for designing a cementitious mixture as defined in claim 1, wherein the hydraulic cement includes portland cement.

26. A method for designing a cementitious mixture as defined in claim 1, further including the step of the CPU comparing the unit cost for each of the one or more optimally designed hydrated cementitious mixtures identified in step (l) in order to identify the optimally designed hydrated cementitious mixture having the lowest unit cost.

27. A method for designing a cementitious mixture as defined in claim 1, further including the step of the CPU comparing the unit cost for each of the dry cementitious mixtures designed in steps (g) and (l) in order to identify the designed dry cementitious mixture having the lowest unit cost.

28. A method for designing a cementitious mixture by means of a computer-implemented design optimization process without trial and error testing of a final hydrated cementitious mixture, the method comprising the steps of:

(a) providing a batch of hydraulic cement, a batch of fine aggregate, and a batch of coarse aggregate to be mixed together in selected proportions to form a final hydrated cementitious mixture, the batch of hydraulic cement including a plurality of individual particles having an average diameter particle size and a particle packing density, the batch of fine aggregate including a plurality of individual particles having an average diameter particle size and a particle packing density, and the batch of coarse aggregate including a plurality of individual particles having an average diameter particle size and a particle packing density, (b) selecting a target slump for the final hydrated cementitious mixture prior to hardening and a target strength for the final hydrated cementitious mixture after curing and thereafter inputting to a central processing unit (CPU) the target slump and target strength;

(c) measuring the average diameter particle size of the individual particles in the batch of hydraulic cement and thereafter inputting to the CPU the average diameter particle size of the individual particles in the batch of hydraulic cement;

(d) measuring the particle packing density of the batch of hydraulic cement and thereafter inputting to the CPU the particle packing density of the batch of hydraulic cement;

(e) measuring the average diameter particle size of the individual particles in the batch of fine aggregate and thereafter inputting to the CPU the average diameter particle size of the individual particles in the batch of fine aggregate;

(f) measuring the particle packing density of the batch of fine aggregate and thereafter inputting to the CPU the particle packing density of the batch of fine aggregate;

(g) measuring the average diameter particle size of the individual particles in the batch of coarse aggregate and thereafter inputting to the CPU the average diameter particle size of the individual particles in the batch of coarse aggregate;

(h) measuring the particle packing density of the batch of coarse aggregate and thereafter inputting to the CPU the particle packing density of the batch of coarse aggregate;

(i) designing a dry cementitious mixture from the batch of hydraulic cement, the batch of fine aggregate, and the batch of coarse aggregate, the dry cementitious mixture having a concentration ratio of hydraulic cement, fine aggregate, and coarse aggregate, and thereafter inputting to the CPU the concentration ratio of hydraulic cement, fine aggregate, and coarse aggregate in the dry cementitious mixture;

(j) the CPU calculating the particle packing density of the designed dry cementitious mixture based on:

(1) the average diameter particle size of the individual particles in the batch of hydraulic cement;

(2) the particle packing density of the batch of hydraulic cement;

(3) the average diameter particle size of the individual particles in the batch of fine aggregate;

(4) the particle packing density of the batch of fine aggregate;

(5) the average diameter particle size of the individual particles in the batch of coarse aggregate;

(6) the particle packing density of the batch of coarse aggregate; and (7) the concentration ratio of hydraulic cement, fine aggregate, and coarse aggregate in the dry cementitious mixture;

(k) the CPU calculating, based on the particle packing density of the designed dry cementitious mixture, an amount of water that when mixed with the designed dry cementitious mixture yields a designed hydrated cementitious mixture having the target slump;

(l) the CPU calculating, based on the amount of water calculated in step (k), a calculated strength for the designed hydrated cementitious mixture after curing;

(m) the CPU calculating the difference between the calculated strength for the designed hydrated cementitious mixture after curing and the target strength; and (n) the CPU altering the concentration ratio of hydraulic cement, fine aggregate, and coarse aggregate in the designed dry cementitious mixture in order to design one or more subsequently designed dry cementitious mixtures and then repeating steps (j)–(m) for each of the one or more subsequently designed dry cementitious mixtures in order to identify one or more optimally designed hydrated cementitious mixture having a strength after curing within an acceptable range of deviation with respect to the target strength.

29. A method for designing a cementitious mixture as defined in claim 28, the CPU altering the concentration ratio of hydraulic cement, fine aggregate, and coarse aggregate in a manner such that when designing each of the one or more subsequently designed dry cementitious mixtures in step (n) the difference between the target strength and the strength calculated in each subsequent iteration of step (m) would be predicted to be less than the difference between the target strength and the strength calculated in each immediately previous iteration of step (m).

30. A method for designing a cementitious mixture as defined in claim 28, further including the step of mixing together relative proportions of the batch of hydraulic cement, of the batch of fine aggregate, and of the batch of aggregate in order to yield a final dry cementitious mixture in which the concentration ratio of the hydraulic cement, fine aggregate, and coarse aggregate is substantially similar to the concentration ratio of hydraulic cement, fine aggregate, and coarse aggregate in at least one of the one or more optimally designed hydrated cementitious mixtures identified in claim 28.

31. A method for designing a cementitious mixture as defined in claim 30, further including the step of mixing water with the final dry cementitious mixture in order to form a final hydrated cementitious mixture having a slump that is substantially similar to the target slump.

32. A method for designing a cementitious mixture as defined in claim 30, the water being included in an amount that is substantially similar to the amount of water calculated by the CPU in step (k) for the designed hydrated cementitious mixture that has a concentration ratio of hydraulic cement and aggregate that most closely corresponds to the concentration ratio of hydraulic cement and aggregate in the final dry cementitious mixture.

33. A method for designing a cementitious mixture as defined in claim 28, further including the step of the CPU comparing the unit cost for each of the one or more optimally designed hydrated cementitious mixtures identified by the CPU in step (n) in order to identify the optimally designed hydrated cementitious mixture having the lowest unit cost.

34. A method for designing a cementitious mixture as defined in claim 28, further including the step of the CPU comparing the unit cost for each of the dry cementitious mixtures designed in steps (i) and (n) in order to identify the designed dry cementitious mixture having the lowest unit cost.

35. A method for manufacturing a final dry cementitious mixture without trial and error testing of a final hydrated cementitious mixture by means of a computer-implemented design optimization process, the method comprising the steps of:

(a) providing a batch of hydraulic cement and a batch of aggregate to be mixed together to form the final dry cementitious mixture, the batch of hydraulic cement including a plurality of individual particles having an average diameter particle size and a particle packing density and the batch of aggregate including a plurality of individual particles having an average diameter particle size and a particle packing density;

(b) selecting a target slump for the final hydrated cementitious mixture prior to hardening and a target strength for the final hydrated cementitious mixture after curing and thereafter inputting to a central processing unit (CPU) the target slump and target strength;

(c) measuring the average diameter particle size of the individual particles in the batch of hydraulic cement and thereafter inputting to the CPU the average diameter particle size of the individual particles in the batch of hydraulic cement;

(d) measuring the particle packing density of the batch of hydraulic cement and thereafter inputting to the CPU the particle packing density of the batch of hydraulic cement;

(e) measuring the average diameter particle size of the individual particles in the batch of aggregate and thereafter inputting to the CPU the average diameter particle size of the individual particles in the batch of aggregate;

(f) measuring the particle packing density of the batch of aggregate and thereafter inputting to the CPU the particle packing density of the batch of aggregate;

(g) designing a dry cementitious mixture from the batch of hydraulic cement and the batch of aggregate, the designed dry cementitious mixture having a concentration ratio of hydraulic cement and aggregate, and thereafter inputting to the CPU the concentration ratio of hydraulic cement and aggregate in the designed dry cementitious mixture;

(h) the CPU calculating the particle packing density of the designed dry cementitious mixture based on:

(1) the average diameter particle size of the individual particles in the batch of hydraulic cement;

(2) the particle packing density of the batch of hydraulic cement;

(3) the average diameter particle size of the individual particles in the batch of aggregate;

(4) the particle packing density of the batch of aggregate; and (5) the concentration ratio of hydraulic cement and aggregate in the designed dry cementitious mixture;

(i) the CPU calculating, based on the particle packing density of the designed dry cementitious mixture, an amount of water that when mixed with the designed dry cementitious mixture yields a designed hydrated cementitious mixture having the target slump;

(j) the CPU calculating, based on the amount of water calculated in step (i), a calculated strength for the designed hydrated cementitious mixture after curing;

(k) the CPU calculating the difference between the calculated strength for the designed hydrated cementitious mixture after curing and the target strength; and (l) the CPU altering the concentration ratio of hydraulic cement and aggregate in the designed dry cementitious mixture in order to design one or more subsequently designed dry cementitious mixtures and then repeating steps (h)–(k) for each of the one or more subsequently designed dry cementitious mixtures in order to identify one or more optimally designed hydrated cementitious mixtures having a strength after curing within an acceptable range of deviation with respect to the target strength; and (m) mixing together at least a portion of the batch of hydraulic cement and of the batch of aggregate in order to yield the final dry cementitious mixture in which the concentration ratio of the hydraulic cement and aggregate is substantially similar to the concentration ratio of hydraulic cement and aggregate in at least one of the one or more optimally designed hydrated cementitious mixtures identified in step (l).

36. A method for designing a final dry cementitious mixture as defined in claim 35, wherein the aggregate comprises a fine aggregate and wherein step (a) further includes providing a batch of coarse aggregate to be mixed into the final hydrated cementitious mixture, the batch of coarse aggregate including a plurality of individual particles having an average diameter particle size and a particle packing density, wherein prior to designing the dry cementitious mixture in step (g) the method further includes the steps of:

A) measuring the average diameter particle size of the individual particles in the batch of coarse aggregate and thereafter inputting to the CPU the average diameter particle size of the individual particles in the batch of coarse aggregate; and B) measuring the particle packing density of the batch of coarse aggregate and thereafter inputting to the CPU the particle packing density of the batch of coarse aggregate, wherein step (g) includes designing the dry cementitious mixture to include at least a portion of the batch of coarse aggregate and thereby have a concentration ratio of hydraulic cement, fine aggregate, and coarse aggregate and thereafter inputting to the CPU the concentration ratio of hydraulic cement, fine aggregate, and coarse aggregate, and wherein the particle packing density of the designed dry cementitious mixture calculated by the CPU in step (h) is further is based on:

(1) the average diameter particle size of the individual particles in the batch of coarse aggregate;

(2) the particle packing density of the batch of coarse aggregate; and (3) the concentration ratio of hydraulic cement, fine aggregate, and coarse aggregate in the designed dry cementitious mixture, wherein step (1) includes the CPU altering the concentration ratio of hydraulic cement, fine aggregate, and coarse aggregate in the designed dry cementitious mixture in order to design the one or more subsequently designed dry cementitious mixtures.

37. A method for manufacturing a final cementitious mixture without trial and error testing of the final hydrated cementitious mixture by means of a computer-implemented design optimization process, the method comprising the steps of:

(a) providing a batch of hydraulic cement and a batch of aggregate to be mixed together to form the final hydrated cementitious mixture, the batch of hydraulic cement including a plurality of individual particles having an average diameter particle size and a particle packing density and the batch of aggregate including a plurality of individual particles having an average diameter particle size and a particle packing density;

(b) selecting a target slump for the final hydrated cementitious mixture prior to hardening and a target strength for the final hydrated cementitious mixture after curing and thereafter inputting to a central processing unit (CPU) the target slump and target strength;

(c) measuring the average diameter particle size of the individual particles in the batch of hydraulic cement and thereafter inputting to the CPU the average diameter particle size of the individual particles in the batch of hydraulic cement;

(d) measuring the particle packing density of the batch of hydraulic cement and thereafter inputting to the CPU the particle packing density of the batch of hydraulic cement;

(e) measuring the average diameter particle size of the individual particles in the batch of aggregate and thereafter inputting to the CPU the average diameter particle size of the individual particles in the batch of aggregate;

(f) measuring the particle packing density of the batch of aggregate and thereafter inputting to the CPU the particle packing density of the batch of aggregate;

(g) designing a dry cementitious mixture from the batch of hydraulic cement and batch of aggregate, the designed dry cementitious mixture having a concentration ratio of hydraulic cement and aggregate, and thereafter inputting to the CPU the concentration ratio of hydraulic cement and aggregate in the designed dry cementitious mixture;

(h) the CPU calculating the particle packing density of the designed dry cementitious mixture based on:

(1) the average diameter particle size of the individual particles in the batch of hydraulic cement;

(2) the particle packing density of the batch of hydraulic cement;

(3) the average diameter particle size of the individual particles in the batch of aggregate;

(4) the particle packing density of the batch of aggregate; and (5) the concentration ratio of hydraulic cement and aggregate in the designed dry cementitious mixture;

(i) the CPU calculating, based on the particle packing density of the designed dry cementitious mixture, an amount of water that when mixed with the designed dry cementitious mixture yields a designed hydrated cementitious mixture having the target slump;

(j) the CPU calculating, based on the amount of water calculated in step (i), a calculated strength for the designed hydrated cementitious mixture after curing;

(k) the CPU calculating the difference between the calculated strength for the designed hydrated cementitious mixture after curing and the target strength; and (l) the CPU altering the concentration ratio of hydraulic cement and aggregate in the designed dry cementitious mixture in order to design one or more subsequently designed dry cementitious mixtures and then repeating steps (h)–(k) for each of the one or more subsequently designed dry cementitious mixtures in order to identify one or more optimally designed hydrated cementitious mixtures having a strength after curing within an acceptable range of deviation with respect to the target strength; and (m) mixing together water, at least a portion of the batch of hydraulic cement, and at least a portion of the batch of aggregate in order to yield the final hydrated cementitious mixture in which the concentration ratio of the hydraulic cement and aggregate is substantially similar to the concentration ratio of hydraulic cement and aggregate in at least one of the one or more optimally designed hydrated cementitious mixtures identified in step (l).

38. A method for designing a final cementitious mixture as defined in claim 37, wherein the aggregate comprises a fine aggregate and wherein step (a) further includes providing a batch of coarse aggregate to be mixed into the final hydrated cementitious mixture, the batch of coarse aggregate including a plurality of individual particles having an average diameter particle size and a particle packing density, wherein prior to designing the dry cementitious mixture in step (g) the method further includes the steps of:

A) measuring the average diameter particle size of the individual particles in the batch of coarse aggregate and thereafter inputting to the CPU the average diameter particle size of the individual particles in the batch of coarse aggregate; and B) measuring the particle packing density of the batch of coarse aggregate and thereafter inputting to the CPU the particle packing density of the batch of coarse aggregate, wherein step (g) includes designing the dry cementitious mixture to include at least a portion of the batch of coarse aggregate and thereby have a concentration ratio of hydraulic cement, fine aggregate, and coarse aggregate and thereafter inputting to the CPU the concentration ratio of hydraulic cement, fine aggregate, and coarse aggregate, and wherein the particle packing density of the designed dry cementitious mixture calculated by the CPU in step (h) is further is based on:

(1) the average diameter particle size of the individual particles in the batch of coarse aggregate;

(2) the particle packing density of the batch of coarse aggregate; and (3) the concentration ratio of hydraulic cement, fine aggregate, and coarse aggregate in the designed dry cementitious mixture, wherein step (l) includes the CPU altering the concentration ratio of hydraulic cement, fine aggregate, and coarse aggregate in the designed dry cementitious mixture in order to design the one or more subsequently designed dry cementitious mixtures.

39. A method for designing a cementitious mixture as defined in claim 28, wherein the fine aggregate includes individual particles having a plurality of diameter particles sizes.

40. A method for designing a cementitious mixture as defined in claim 28, wherein the course aggregate includes individual particles having a plurality of diameter particles sizes.

41. A method for designing a cementitious mixture as defined in claim 28, wherein the hydraulic cement includes a plurality of different types of hydraulic cement.

42. A method for designing a cementitious mixture as defined in claim 28, wherein step (i) includes substituting a pozzolan material for a portion of the hydraulic cement when designing the dry cementitious mixture, the calculations by the CPU in steps (k) and (l) being adjusted for the effect of the pozzolan material on the slump and strength, respectively, of the designed hydrated cementitious mixture.

43. A method for designing a cementitious mixture as defined in claim 42, wherein the pozzolan material includes silica fume.

44. A method for designing a cementitious mixture as defined in claim 42, wherein the pozzolan material includes fly ash.

45. A method for designing a cementitious mixture as defined in claim 28, wherein step (i) includes designing the dry cementitious mixture such that a designed hydrated cementitious mixture made therefrom includes a water reducer, the calculations by the CPU in steps (k) and (l) being adjusted for the effect of the water reducer on the slump and strength, respectively, of the designed hydrated cementitious mixture.

46. A method for designing a cementitious mixture as defined in claim 28, wherein step (i) includes substituting a filler for a portion of the hydraulic cement when designing the dry cementitious mixture, the designed dry cementitious mixture thereby having an initial concentration ratio of hydraulic cement, fine aggregate, course aggregate, and filler, the calculation by the CPU in step (j) being adjusted for the effect of the filler on the particle packing density of the designed dry cementitious mixture.

47. A method for designing a cementitious mixture as defined in claim 28, further including the step of the CPU calculating, based on the amount of water calculated in step (k) and the concentration ratio of hydraulic cement, fine aggregate, and course aggregate for the designed hydrated cementitious mixture, a calculated durability for the designed hydrated cementitious mixture after curing.

48. A method for designing a cementitious mixture as defined in claim 28, wherein the final hydrated cementitious mixture comprises concrete.

49. A method for designing a cementitious mixture as defined in claim 28, wherein the hydraulic cement includes portland cement.

50. A method for designing a final dry cementitious mixture as defined in claim 35, wherein the aggregate comprises a fine aggregate.

51. A method for designing a final dry cementitious mixture as defined in claim 50, wherein step (a) further includes providing a batch of coarse aggregate to be mixed into the final hydrated cementitious mixture, the batch of coarse aggregate including a plurality of individual particles having an average diameter particle size and a particle packing density, wherein prior to designing the dry cementitious mixture in step (g) the method further includes the steps of:

A) measuring the average diameter particle size of the individual particles in the batch of coarse aggregate and thereafter inputting to the CPU the average diameter particle size of the individual particles in the batch of coarse aggregate; and B) measuring the particle packing density of the batch of coarse aggregate and thereafter inputting to the CPU the particle packing density of the batch of coarse aggregate, wherein step (g) includes designing the dry cementitious mixture to include at least a portion of the batch of coarse aggregate and thereby have a concentration ratio of hydraulic cement, fine aggregate, and coarse aggregate and thereafter inputting to the CPU the concentration ratio of hydraulic cement, fine aggregate, and coarse aggregate in the designed dry cementitious mixture, and wherein the particle packing density calculated by the CPU in step (h) is further is based on:

(1) the average diameter particle size of the individual particles in the batch of coarse aggregate;

(2) the particle packing density of the batch of coarse aggregate; and (3) the concentration ratio of hydraulic cement, fine aggregate, and coarse aggregate in the designed dry cementitious mixture, wherein step (1) includes the CPU altering the concentration ratio of hydraulic cement, fine aggregate, and coarse aggregate in the designed dry cementitious mixture in order to design the one or more subsequently designed dry cementitious mixtures.

52. A method for designing a final dry cementitious mixture as defined in claim 35, wherein the aggregate comprises a coarse aggregate.

53. A method for designing a final dry cementitious mixture as defined in claim 52, wherein step (a) further includes providing a batch of fine aggregate to be mixed into the final hydrated cementitious mixture, the batch of fine aggregate including a plurality of individual particles having an average diameter particle size and a particle packing density, wherein prior to designing the dry cementitious mixture in step (g) the method further includes the steps of:

A) measuring the average diameter particle size of the individual particles in the batch of fine aggregate and thereafter inputting to the CPU the average diameter particle size of the individual particles in the batch of fine aggregate; and B) measuring the particle packing density of the batch of fine aggregate and thereafter inputting to the CPU the particle packing density of the batch of fine aggregate, wherein step (g) includes designing the dry cementitious mixture to include at least a portion of the batch of fine aggregate and thereby have a concentration ratio of hydraulic cement, fine aggregate, and coarse aggregate and thereafter inputting to the CPU the concentration ratio of hydraulic cement, fine aggregate, and coarse aggregate in the designed dry cementitious mixture, and wherein the particle packing density calculated by the CPU in step (h) is further is based on (1) the average diameter particle size of the individual particles in the batch of fine aggregate;

(2) the particle packing density of the batch of fine aggregate; and (3) the concentration ratio of hydraulic cement, fine aggregate, and coarse aggregate in the designed dry cementitious mixture, wherein step (1) includes the CPU altering the concentration ratio of hydraulic cement, fine aggregate, and coarse aggregate in the designed dry cementitious mixture in order to design the one or more subsequently designed dry cementitious mixtures.

54. A method for designing a final dry cementitious mixture as defined in claim 35, wherein step (g) includes substituting a pozzolan material for a portion of the hydraulic cement when designing the dry cementitious mixture, the calculations by the CPU in steps (i) and (k) being adjusted for the effect of the pozzolan material on the slump and strength, respectively, of the designed hydrated cementitious mixture.

55. A method for designing a final dry cementitious mixture as defined in claim 35, wherein step (g) includes designing the dry cementitious mixture such that a designed hydrated cementitious mixture made therefrom includes a water reducer, the calculations by the CPU in steps (i) and (k) being adjusted for the effect of the water reducer on the slump and strength, respectively, of the designed hydrated cementitious mixture.

56. A method for designing a final dry cementitious mixture as defined in claim 35, wherein step (g) includes substituting a filler for a portion of the hydraulic cement when designing the dry cementitious mixture, the designed dry cementitious mixture thereby having an initial concentration ratio of hydraulic cement, aggregate, and filler, the calculation by the CPU in step (h) being adjusted for the effect of the filler on the particle packing density of the designed dry cementitious mixture.

57. A method for designing a final dry cementitious mixture as defined in claim 35, further including the step of the CPU calculating, based on the amount of water calculated in step (j) and the concentration ratio of hydraulic cement and aggregate for the designed hydrated cementitious mixture, a calculated durability for the designed hydrated cementitious mixture after curing.

58. A method for designing a final dry cementitious mixture as defined in claim 55, wherein the final hydrated cementitious mixture comprises concrete.

59. A method for designing a final dry cementitious mixture as defined in claim 35, wherein the hydraulic cement includes portland cement.

60. A method for designing a final dry cementitious mixture as defined in claim 35, further including the step of the CPU comparing the unit cost for each of the one or more optimally designed hydrated cementitious mixtures identified by the CPU in step (1) in order to identify the optimally designed hydrated cementitious mixture having the lowest unit cost.

61. A method for designing a final dry cementitious mixture as defined in claim 35, further including the step of the CPU comparing the unit cost for each of the dry cementitious mixtures designed in steps (g) and (l) in order to identify the designed dry cementitious mixture having the lowest unit cost.

62. A method for designing a final cementitious mixture as defined in claim 37, wherein the aggregate comprises a fine aggregate.

63. A method for designing a final cementitious mixture as defined in claim 62, wherein step (a) further includes providing a batch of coarse aggregate to be mixed into the final hydrated cementitious mixture, the batch of coarse aggregate including a plurality of individual particles having an average diameter particle size and a particle packing density, wherein prior to designing the dry cementitious mixture in step (g) the method further includes the steps of:

A) measuring the average diameter particle size of the individual particles in the batch of coarse aggregate and thereafter inputting to the CPU the average diameter particle size of the individual particles in the batch of coarse aggregate; and B) measuring the particle packing density of the batch of coarse aggregate and thereafter inputting to the CPU the particle packing density of the batch of coarse aggregate, wherein step (g) includes designing the dry cementitious mixture to include at least a portion of the batch of coarse aggregate and thereby have a concentration ratio of hydraulic cement, fine aggregate, and coarse aggregate and thereafter inputting to the CPU the concentration ratio of hydraulic cement, fine aggregate, and coarse aggregate in the designed dry cementitious mixture, and wherein the particle packing density calculated by the CPU in step (h) is further is based on:

(1) the average diameter particle size of the individual particles in the batch of coarse aggregate;

(2) the particle packing density of the batch of coarse aggregate; and (3) the concentration ratio of hydraulic cement, fine aggregate, and coarse aggregate in the designed dry cementitious mixture, wherein step (1) includes the CPU altering the concentration ratio of hydraulic cement, fine aggregate, and coarse aggregate in the designed dry cementitious mixture in order to design the one or more subsequently designed dry cementitious mixtures.

64. A method for designing a final cementitious mixture as defined in claim 37, wherein the aggregate comprises a coarse aggregate.

65. A method for designing a final cementitious mixture as defined in claim 64, wherein step (a) further includes providing a batch of fine aggregate to be mixed into the final hydrated cementitious mixture, the batch of free aggregate including a plurality of individual particles having an average diameter particle size and a particle packing density, wherein prior to designing the dry cementitious mixture in step (g) the method further includes the steps of:

A) measuring the average diameter particle size of the individual particles in the batch of fine aggregate and thereafter inputting to the CPU the average diameter particle size of the individual particles in the batch of fine aggregate; and B) measuring the particle packing density of the batch of fine aggregate and thereafter inputting to the CPU the particle packing density of the batch of fine aggregate, wherein step (g) includes designing the dry cementitious mixture to include at least a portion of the batch of fine aggregate and thereby have a concentration ratio of hydraulic cement, fine aggregate, and coarse aggregate and thereafter inputting to the CPU the concentration ratio of hydraulic cement, fine aggregate, and coarse aggregate in the designed dry cementitious mixture, and wherein the particle packing density calculated by the CPU in step (h) is further is based on (1) the average diameter particle size of the individual particles in the batch of fine aggregate;

(2) the particle packing density of the batch of fine aggregate; and (3) the concentration ratio of hydraulic cement, fine aggregate, and coarse aggregate in the designed dry cementitious mixture, wherein step (1) includes the CPU altering the concentration ratio of hydraulic cement, fine aggregate, and coarse aggregate in the designed dry cementitious mixture in order to design the one or more subsequently designed dry cementitious mixtures.

66. A method for designing a final cementitious mixture as defined in claim 37, wherein step (g) includes substituting a pozzolan material for a portion of the hydraulic cement when designing the dry cementitious mixture, the calculations by the CPU in steps (i) and (k) being adjusted for the effect of the pozzolan material on the slump and strength, respectively, of the designed hydrated cementitious mixture.

67. A method for designing a final cementitious mixture as defined in claim 37, wherein step (g) includes designing the dry cementitious mixture such that a designed hydrated cementitious mixture made therefrom includes a water reducer, the calculations by the CPU in steps (i) and (k) being adjusted for the effect of the water reducer on the slump and strength, respectively, of the designed hydrated cementitious mixture.

68. A method for designing a final cementitious mixture as defined in claim 37, wherein step (g) includes substituting a filler for a portion of the hydraulic cement when designing the dry cementitious mixture, the designed dry cementitious mixture thereby having an initial concentration ratio of hydraulic cement, aggregate, and filler, the calculation by the CPU in step (h) being adjusted for the effect of the filler on the particle packing density of the designed dry cementitious mixture.

69. A method for designing a final cementitious mixture as defined in claim 37, further including the step of the CPU calculating, based on the amount of water calculated in step (j) and the concentration ratio of hydraulic cement and aggregate for the designed hydrated cementitious mixture, a calculated durability for the designed hydrated cementitious mixture after curing.

70. A method for designing a final cementitious mixture as defined in claim 37, wherein the final hydrated cementitious mixture comprises concrete.

71. A method for designing a final cementitious mixture as defined in claim 37, wherein the hydraulic cement includes portland cement.

72. A method for designing a final cementitious mixture as defined in claim 37, further including the step of the CPU comparing the unit cost for each of the one or more optimally designed hydrated cementitious mixtures identified by the CPU in step (1) in order to identify the optimally designed hydrated cementitious mixture having the lowest unit cost.

73. A method for designing a final cementitious mixture as defined in claim 37, further including the step of the CPU comparing the unit cost for each of the dry cementitious mixtures designed in steps (g) and (l) in order to identify the designed dry cementitious mixture having the lowest unit cost.

* * * * *

UNITED STATES PATENT AND TRADEMARK OFFICE
CERTIFICATE OF CORRECTION

PATENT NO. : 5,527,387
DATED : June 18, 1996
INVENTOR(S) : Per Just Andersen, Ph.D. and Simon K. Hodson It is certified that error appears in the above-indentified patent and that said Letters Patent is hereby corrected as shown below:

IN THE TITLE PAGES

In Item No. 67, entitled "Related U.S. Application Data" change "20" to --21--.

In Item No. 56, entitled "References Cited", under the subheading "OTHER PUBLICATIONS", at page 2, 1st column, in the Bache reference after "Presented" change "a" to --at--.

At col. 1, line 11, after "Jul." change "20" to --21--.
At col. 2, line 43, before "fresh" change "oft he" to --of the--.
At col. 3, line 21, after "ACI 211 1-81" insert --."--.
At col. 4, line 44, after "empirical" change "table" to --tables--.
At col. 4, line 61, after "Larrard" change "eguation" to --equation--.
At col. 5, line 57, after "A" change "(worse)" to --(worst)--.
At col. 9, line 7, after "usually" change "increase" to --increases--.
At col. 9, line 66, after "and" delete "," and after "thereby" change "minimizing" to --minimize--.
At col. 16, line 47, before "rheology" change "systems" to --system--.
At col. 16, line 49, change both instances of "theology" to --rheology--.
At col. 19, line 24, after "products" change "than" to --that--.
At col. 19, line 51, after "always" change "add" to --adds--.
At col. 21, line 6, change "can-be" to --can be--.
At col. 21, line 31, after "article" insert --by--.
At col. 24, line 52, after "with" insert --the--.

UNITED STATES PATENT AND TRADEMARK OFFICE
CERTIFICATE OF CORRECTION

PATENT NO. : 5,527,387

DATED : June 18, 1996

INVENTOR(S) : Per Just Andersen, Ph.D. and Simon K. Hodson

It is certified that error appears in the above-indentified patent and that said Letters Patent is hereby corrected as shown below:

At col. 25, line 54, after "cement" delete ",".
    At col. 28, line 60, after the second instance of "volume" insert --of--.
    At col. 28, line 62, after "volume" insert --of--.
    At col. 29, line 28, after "price" insert --of the--.
    At col. 30, line 5, change "compositions" to --composition--.
    At col. 31, line 24, after " formulas" insert --,--.
    At col. 32, line 65, after "estimating" delete "of".
    At col. 35, line 47, after "by weight" insert --of--.
    At col. 35, line 53, after "weight" insert --of--.
    At col. 42, line 29, after "previously" delete "&".
    At col. 44, line 22, after "amount" insert --of--.
    At col. 45, line 5, after "each" insert --of--.
    At col. 45, line 52, after "solids in" insert --the--.
    At col. 48, line 47, after "water" insert --content--.
    At col. 50, line 34, after "pea" change "gavel" to --gravel--.
    At col. 50, line 39, after "pea" change "gavel" to --gravel--.
    At col. 53, line 37, after "water" insert --content--.
    At col. 55, line 49, after "water" insert --content--.
    At col. 56, line 39, after "fineness" change "modules" to --modulus--.
    At col. 57, line 14, after "fineness" change "modules" to --modulus--.
    At col. 57, line 57, after "fineness" change "modules" to --modulus--.

UNITED STATES PATENT AND TRADEMARK OFFICE
CERTIFICATE OF CORRECTION

PATENT NO. : 5,527,387
DATED : June 18, 1996
INVENTOR(S) : Per Just Andersen, Ph.D. and Simon K. Hodson It is certified that error appears in the above-indentified patent and that said Letters Patent is hereby corrected as shown below:

```
     At col. 68, line 19, before "based" delete "is".
     At col. 68, line 63, before "based" delete "is".
     At col. 73, line 60, after "further" delete "is".
     At col. 75, line 67, before "aggregate" change "course" to
--coarse--.
     At col. 76, line 32, after "aggregate" change "course" to
--coarse--.
     At col. 76, line 40, after "and" change "course" to --coarse--.
     At col. 77, line 52, before "based" delete "is".
     At col. 79, line 52, before "based" delete "is".
```

Signed and Sealed this

Twenty-fourth Day of September, 1996

Attest:

BRUCE LEHMAN

*Attesting Officer*          *Commissioner of Patents and Trademarks*